(12) United States Patent
Wakashiro et al.

(10) Patent No.: US 6,907,948 B2
(45) Date of Patent: Jun. 21, 2005

(54) CONTROL APPARATUS FOR HYBRID VEHICLES

(75) Inventors: Teruo Wakashiro, Wako (JP); Shigetaka Kuroda, Wako (JP); Shinichi Kitajima, Wako (JP); Kazutomo Sawamura, Wako (JP); Atsushi Izumiura, Wako (JP); Yasuo Nakamoto, Wako (JP); Hideyuki Oki, Wako (JP); Kan Nakaune, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/123,137

(22) Filed: Apr. 17, 2002

(65) Prior Publication Data
US 2002/0108794 A1 Aug. 15, 2002

Related U.S. Application Data

(63) Continuation of application No. 09/665,677, filed on Sep. 20, 2000, now Pat. No. 6,702,052.

(30) Foreign Application Priority Data

Sep. 22, 1999 (JP) .......................................... 11-269502
Oct. 29, 1999 (JP) .......................................... 11-310346

(51) Int. Cl.$^7$ ............................. B60K 1/00; B60L 11/00
(52) U.S. Cl. .................... 180/65.2; 180/65.1; 180/65.3; 180/65.4; 180/65.6; 180/65.8; 701/22
(58) Field of Search ............................. 180/65.2, 65.3, 180/65.4, 65.6, 65.7, 65.8, 65.1; 701/22, 70

(56) References Cited

U.S. PATENT DOCUMENTS 4,335,429 A * 6/1982 Kawakatsu ................. 364/424
4,407,132 A * 10/1983 Kawakatsu ................... 60/716

(Continued)

FOREIGN PATENT DOCUMENTS

| EP | 0 916 547 A2 | 5/1999 |
|---|---|---|
| JP | 50-45239 | 4/1975 |
| JP | 8-223705 | 8/1996 |
| JP | 8-317505 | 11/1996 |
| JP | 11-69507 | 3/1999 |
| WO | WO97/45287 | 4/1997 |

OTHER PUBLICATIONS

Korean Office Action dated Jun. 28, 2002, with Japanese translation of Office Action.
Office action and translation dated Nov. 12, 2003 from the corresponding European application.

*Primary Examiner*—Paul N. Dickson
*Assistant Examiner*—G B Klebe
(74) *Attorney, Agent, or Firm*—Westerman, Hattori, Daniels & Adrian, LLP

(57) ABSTRACT

A control apparatus of a hybrid vehicle is provided, capable of charging the battery device when the state of charge of the battery device tends to decrease and the initial state of charge of the battery device is reduced by a predetermined amount. The present device comprises a lower limit threshold value setting device S060, an upper limit threshold value setting device for setting the lower limit and upper limit threshold values of the discharge amount of the battery device, a mode setting device S054 for increasing the state of charge when the state of charge is reduced to the lower limit threshold value, a mode setting release device S062 for releasing the mode setting changed by the mode setting device, and a discharge depth detecting device S063 for detecting the discharge amount of the present state of charge by comparison with the initial state of charge. The threshold value for determining whether it is necessary for the motor to assist the engine is modified depending upon the discharge depth.

4 Claims, 37 Drawing Sheets

U.S. PATENT DOCUMENTS

| | | | | |
|---|---|---|---|---|
| 5,786,640 A | * | 7/1998 | Sakai et al. | 290/17 |
| 5,789,881 A | * | 8/1998 | Egami et al. | 318/139 |
| 5,806,617 A | * | 9/1998 | Yamaguchi | 180/65.2 |
| 5,945,808 A | | 8/1999 | Kikuchi et al. | 320/132 |
| 6,158,537 A | * | 12/2000 | Nonobe | 180/65.3 |
| 6,209,672 B1 | * | 4/2001 | Severinsky | 180/65.2 |
| 6,314,346 B1 | * | 11/2001 | Kitajima et al. | 701/22 |
| 6,344,732 B2 | * | 2/2002 | Suzuki | 320/132 |

* cited by examiner

CONTROL APPARATUS FOR HYBRID VEHICLES

This application is a continuation of prior application Ser. No. 09/665,677 filed Sep. 20, 2000 now U.S. Pat. No. 6,702,052.

BACKGROUND OF THE INVENTION

1. Field of the Invention

The present invention relates to a control apparatus for a hybrid vehicle, and particularly relates to a control apparatus for hybrid vehicles, which is capable of recovering the charge-discharge balance by activating the motor during the travel when the charge-discharge balance of the battery device shifts to an over-discharge state.

2. Background Art

Hybrid vehicles provided with a motor in addition to an engine are conventionally known. There are two types of hybrid vehicles: series hybrid vehicles and parallel hybrid vehicles. Series hybrid vehicles are driven by a motor which is driven by a generator driven by the engine.

Sine the motor is not connected mechanically to the engine, the engine can be driven at an approximately constant rotation speed within an speed region wherein the engine can be driven at a lower fuel consumption rate and lower emission rate than the case of a conventional engine.

In contrast, in parallel hybrid vehicles, a motor directly connected to the engine assists the engine in rotating the drive shaft, and the motor is used as a generator for charging electric energy into a battery device, and the electric energy generated by the motor is used for a variety of electric equipment in the hybrid vehicle.

Thus, in parallel hybrid vehicles, since the driving load of the engine can be reduced, the fuel consumption rate and the emission rate can be improved.

There are several types of the above-described parallel hybrid vehicle, one is a type in which the motor for assisting the output of the engine is directly connected to the engine axis, and the motor functions as a generator for charging the battery when the hybrid vehicle decelerates, and the other one is a type in which both or either one of the engine and the motor can generates the driving force and a generator is additionally provided.

In hybrid vehicles such as those described above, the demands of the driver can be satisfied by preserving the electric energy of the battery (hereinafter, called "state of charge", that is "remaining battery charge") by carrying out a variety of controls so that the motor assists the engine at the time of acceleration, and the motor charges the battery by deceleration regeneration at the time of deceleration. For example, since a large amount of deceleration regeneration can be obtained after high speed travel, a part of the energy drawn from the battery can be recovered at the time of deceleration. That is, after climbing the uphill, the battery can be charged while travelling downhill (this technique is disclosed in Japanese Unexamined Patent Application, First Publication No. Hei 7-123509).

However, in conventional hybrid vehicles, when driven the hybrid vehicle without sufficient deceleration acceleration, the state of charge gradually decreases while driving the vehicle. Therefore, the problem arises that, when it is necessary to drive the car uphill, and subsequently drive on a flat road, the battery charge consumed at the time of driving the uphill can not be restored because no downhill regeneration is provided.

SUMMARY OF THE INVENTION

It is therefore an object of the present invention to provide a control apparatus for a hybrid vehicle, capable of charging the battery device when the driving conditions are such that the state of charge is decreasing rather than increasing, and when the state of charge has decreased by a predetermined amount from the initially read value.

According to the first aspect, a control apparatus of a hybrid vehicle comprises: an engine (for example, the engine E in the embodiment) for outputting a driving force of the vehicle; a motor (for example, the motor M in the embodiment) for generating an auxiliary driving force for assisting the engine output; a battery device (for example, the battery 3 in the embodiment) for supplying electric power to the motor and for storing regenerative energy obtained by a regenerative operation of the motor during deceleration the vehicle; an assist determination device (for example, step S522 and step S535 in the embodiment) for determining whether it is necessary for the motor to assist the engine output in response to the driving conditions of the vehicle; wherein the control apparatus of the hybrid vehicle further comprises: a start of travel detecting device (for example, step S450 in the embodiment) for detecting the start of travel of the vehicle; a state of charge (for example, SOC in the embodiment) detecting device (for example, the battery ECU 31 in the embodiment) for detecting the state of charge of the battery device; a discharge depth detecting device (for example, the battery ECU 31 in the embodiment) for detecting a discharge amount of the present state of charge by comparison with the initial state of charge (for example, the initial value of the state of charge SOCINT in the embodiment) detected at the time of starting the travel; a lower limit threshold value setting device (for example, step S460 in the embodiment) for setting the lower limit threshold value (for example, the lower limit threshold value SOCLMTL in step S460 in the embodiment) of the discharge amount based on the initial state of charge; an upper limit threshold value setting device (for example, step S461 in the embodiment) for setting the upper limit threshold value (for example, the upper limit threshold value SOCLMTH in step S461 in the embodiment) of the discharge amount based on the initial state of charge; a mode setting device (for example, step S454 in the embodiment) for changing a control mode of the motor when the state of charge of the battery device is reduced to the lower limit threshold value; a mode setting release device (for example, step S462 in the embodiment) for releasing the setting of the motor control mode set by the mode setting release device when the residual capacity of the storage battery reaches the upper limit threshold value; a determination threshold value correction device (for example, steps S503, S511, and S523 in the embodiment) for correcting the determination threshold value (for example, the throttle assist trigger threshold value MAST, the suction pipe assist trigger threshold value MATST, and the suction pipe assist trigger threshold value MATTH in the embodiment) used as the standard for determination by the assist determination device in response to the discharge depth detecting device when the control mode of the motor is changed by the mode setting device; and a determination threshold value state of charge correction device (for example, steps S560, S607, and S657 in the embodiment) for further correcting the determination threshold value corrected by the determination threshold value correction device in response to the initial state of charge of the battery device.

According to the above-described constitution, when driving the hybrid vehicle by repeating sudden acceleration and deceleration or in the case of driving uphill and subsequent driving on a flat road without restoring the state of charge of the battery by regeneration, the state of charge of the battery can be restored when it is detected that the state of charge has decreased by a predetermined amount compared to the initial state of charge at the time of starting travel.

In contrast, the determination threshold value established by the determination threshold value correction device is further corrected by the determination threshold value state of charge correction device, and it is possible to decrease the frequency of the motor assist as the initial state of charge of the battery increases.

According to the second embodiment, the determination threshold value state of charge correction device decreases the correction amount of the determination threshold value as the initial state of charge of the battery increases.

By forming the above construction, it is possible to decrease the incremental value of the determination threshold value as the initial state of charge of the battery increases.

According to the third aspect, a control apparatus for a hybrid vehicle comprising an engine for outputting a driving force of the vehicle, a motor for generating an auxiliary driving force for assisting the engine output, a battery device for supplying electric power to the motor and for storing regenerative energy obtained by a regenerative operation of the motor during deceleration the vehicle, an assist determination device for determining whether it is necessary for the motor to assist the engine output in response to the driving condition of said vehicle, wherein said control apparatus of the hybrid vehicle comprises a start of travel detecting device for detecting the start of travel of the vehicle, a state of charge detecting device for detecting the state of charge of said battery device, a discharge depth detecting device for detecting a discharge amount of the present state of charge from the initial state of charge detected at the time of starting the travel, a step for setting a discharge amount for the initial state of charge (for example, step S060 in the embodiment), a step for setting a charge amount for the initial state of charge (for example, step S061 in the embodiment), a mode setting device for changing a control mode of the motor when the state of charge of the battery device is reduced to the discharge amount, a mode setting release device for releasing the setting of the motor control mode set by the mode setting release device when the state of charge of the battery device reaches the charge amount, a determination threshold value correction device for correcting the determination threshold value used as the standard for determination by the assist determination device in response to the discharge depth detecting device when the control mode of the motor is changed by the mode setting device, and a determination threshold value state of charge correction device for further correcting the determination threshold value corrected by the determination threshold value correction device in response to the initial state of charge of the battery device.

According to the fourth aspect, in the above control apparatus for a hybrid vehicle, the determination threshold value state of charge correction device decreases the determination threshold value as the initial state of charge of the battery device increases.

DETAILED DESCRIPTION OF THE INVENTION

Figure 1:
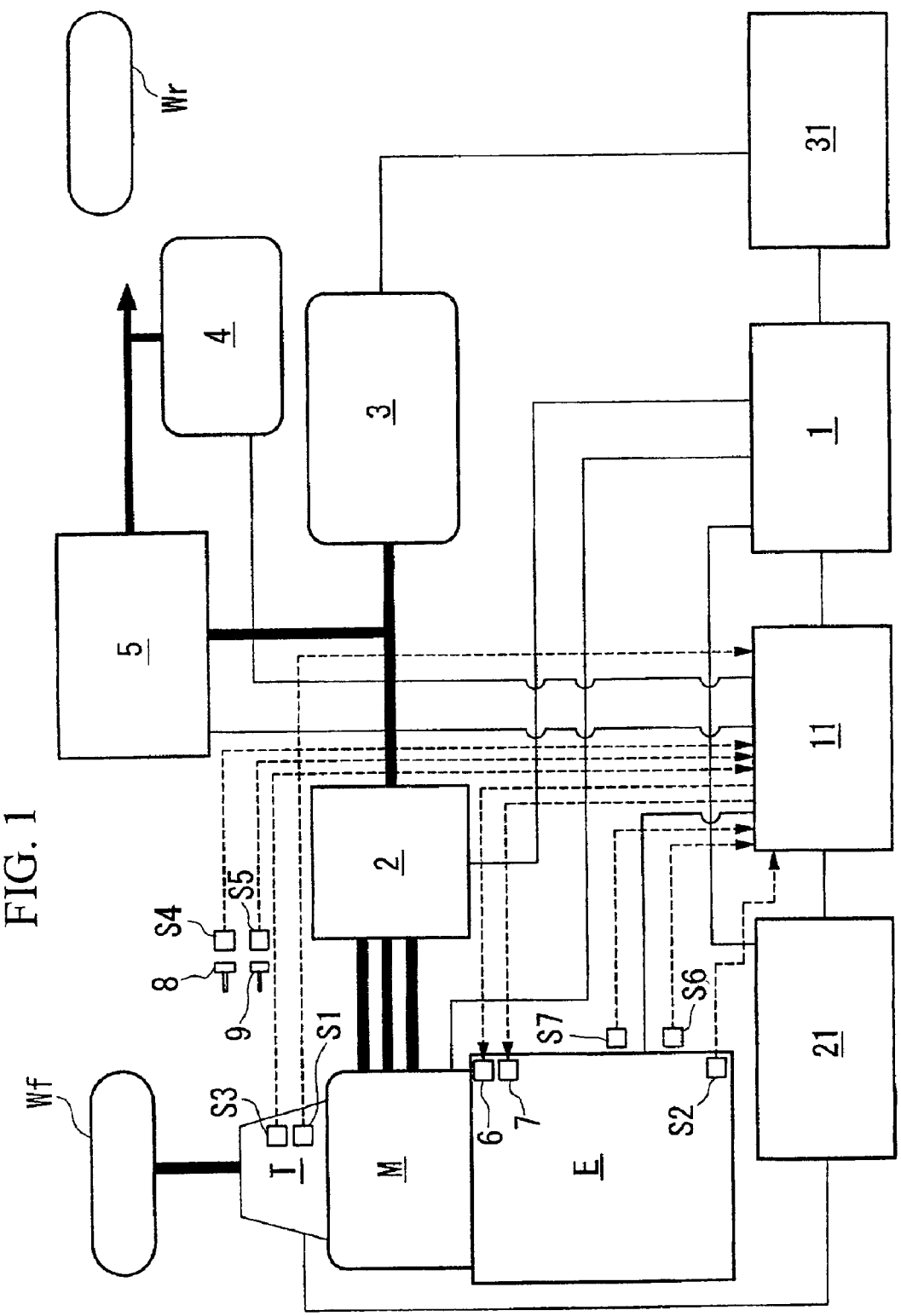
FIG. 1 shows the overall structure of a hybrid vehicle.

Hereinafter, embodiments of the present invention are described with reference to the attached drawings. FIG. 1 shows an embodiment in which the control apparatus of the present invention is applied to a parallel hybrid vehicle, wherein the driving force by both engine E and motor M is transmitted to the driving wheels Wf and Wf through a transmission T comprised of an automatic transmission or a manual transmission. When the driving force is transmitted to the motor M from the front wheels Wf and Wf at the time of deceleration of the hybrid vehicle, the motor M functions as a power generator for generating what is referred to as a regenerative braking force, and the kinetic energy of the vehicle body is collected as electric energy.

The driving and regenerative braking of the motor M is carried out by a power drive unit 2 when receiving control instructions from the motor ECU 1. The power drive unit 2 is connected to a high voltage battery 3 for supplying and receiving electric energy with the motor M, and the battery 3 has, for example, a plurality of modules connected in series, with these modules in turn comprising a plurality of cells connected in series, and serving as a unit, to form a high voltage battery. A 12V supplementary battery 4 is also provided in the hybrid vehicle for driving various accessories and this supplementary battery 4 is connected to the battery 3 through a downverter 5. The downverter 5 controlled by the FIECU 11 reduces the voltage of the battery 3 for charging the supplementary battery 4.

FIECU 11 carries out various operations, in addition to the control of the motor ECU 1 and the downverter 5, such as the activation of the fuel supplying amount control device 6 for controlling the fuel supplying amount to the engine E, actuation of the starter motor 7, and control of the ignition times. The FIECU 11 receives signals from various sensors, such as a car speed sensor S1 for detecting the car speed V based on the rotation speed of the driving shaft of the transmission, an engine rotation speed sensor S2 for detecting the engine rotation speed, a shift position sensor S3 for detecting the shift position of the transmission, a brake switch S4 for detecting operations of the brake pedal 8, a clutch switch S5 for detecting the clutch pedal 9, a throttle opening sensor S6 for detecting the degree of the throttle opening TH, an air intake passage pressure sensor S7 for detecting the air intake passage pressure. Reference numeral 21 in FIG. 1 denotes CVTECU for cotrolling the CVT vehicles, and numeral 31 denotes a battery ECU used for protecting the battery 3 and for computing the state of charge of the battery 3.

The control modes of this hybrid vehicle include the "idle stop mode", "idle mode", "deceleration mode", "acceleration mode", and "cruise mode". In the idle mode, the engine is maintained at the idling state after starting the fuel supply subsequent to the idle stop, and in the idle stop mode, the engine rotation is stopped at, for example, the time of stopping the vehicle. In the deceleration mode, the regenerative braking is carried out by the motor M, and in the acceleration mode, the motor assists the engine driving, and in the cruise mode, the motor is not used, and the vehicle travels by the driving force of the engine.

<Motor Operation Mode Determination>

Figure 2:
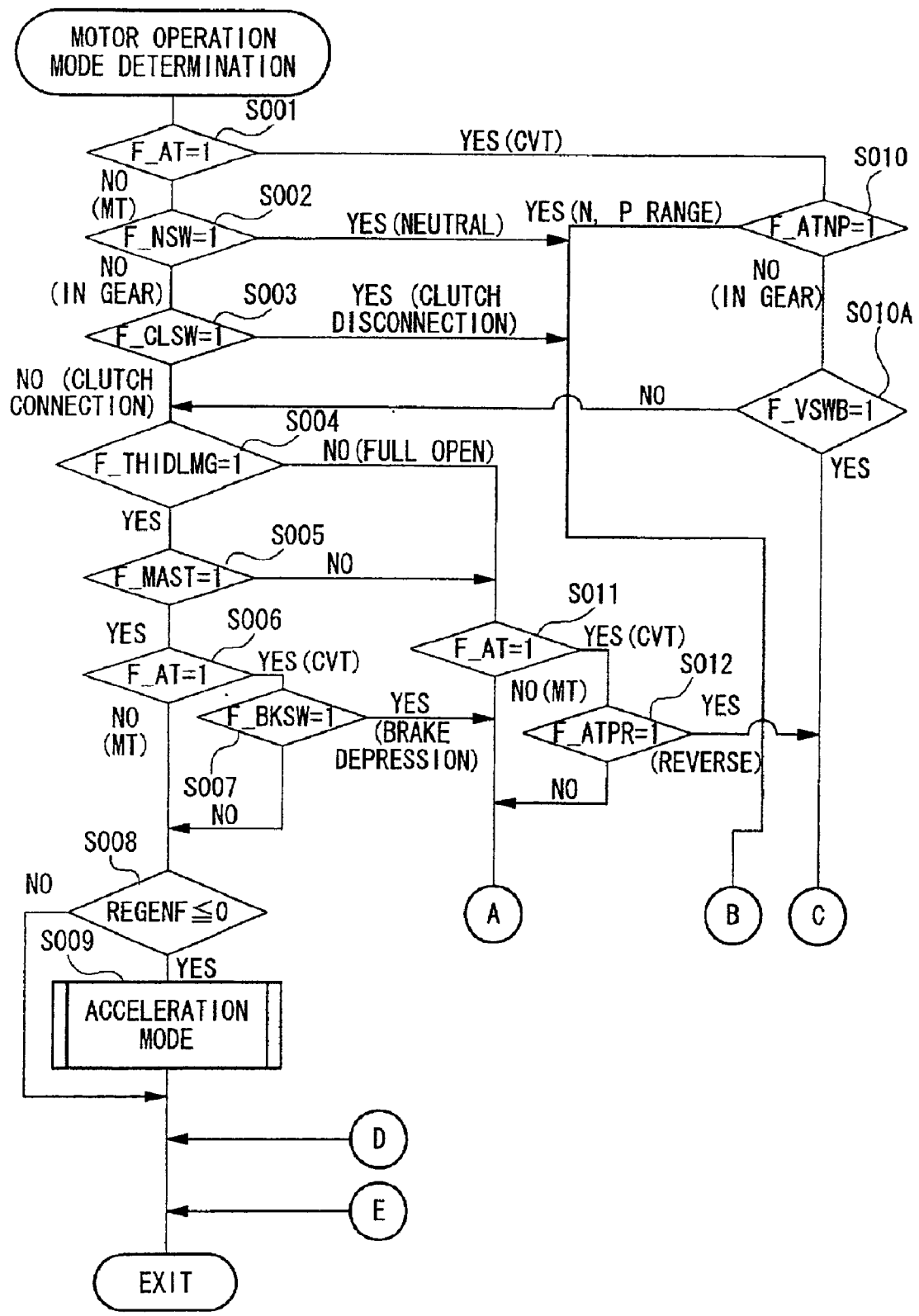
FIG. 2 is a flowchart showing the mode determination of the motor operation mode.
Figure 3:
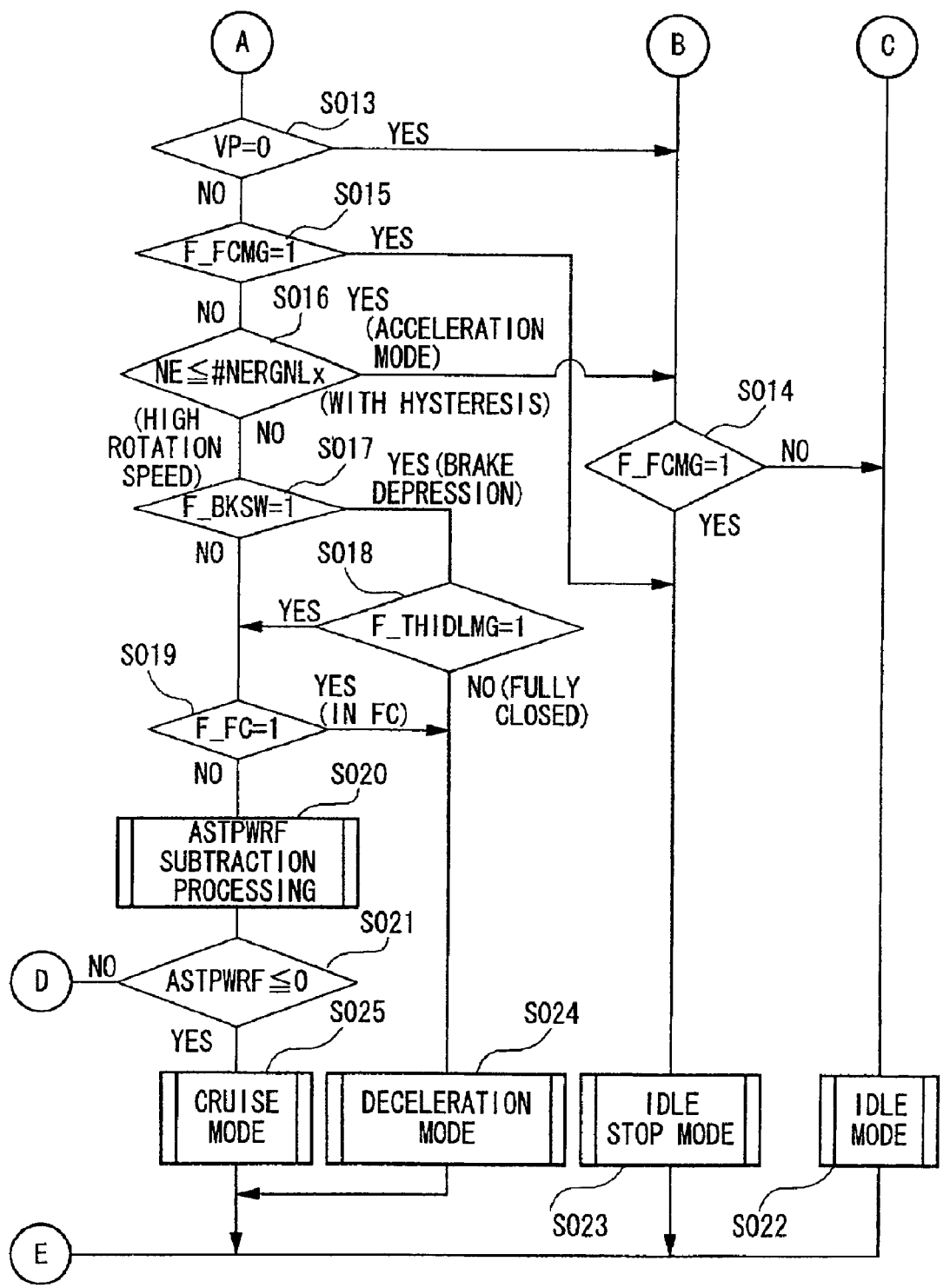
FIG. 3 is a flowchart showing the mode determination of the motor operation mode.

The motor operation mode determination for determining the above-described operation modes is described below with reference to FIGS. 2 and 3.

In step S001, it is determined whether the MT/CVT determination flag, that is, F__AT flag is "1". When the result is "NO", that is, when it is determined that the vehicle is a MT vehicle, the flow proceeds to step S202. When the result of determination at step S001 is "YES", that is, when it is determined that the vehicle is a CVT vehicle, the flow proceeds to step S010, wherein it is determined whether an in-gear determination flag F__ATNP is "1". When the determination result in Step S010 is "NO", that is, the vehicle is in an in-gear state, the flow proceeds to step S010A wherein the switch back flag F__VSWB is determined whether the vehicle is in the way of the switch back operation (in operating the shift lever). When the result in step S010A is "NO", that is, the vehicle is not in the switching back operation, the flow proceeds to step S004. In contrast, if the result in step S010A is "YES", that is, it is determined that the switch back operation is now under the way, the flow proceeds to the "idle mode" of step S022 and the flow is completed. In the "idle mode", the fuel supply is restarted after the fuel cut and the engine E is maintained in the idling state.

When the result of the determination in step S010 is "YES", that is, when the gear positions is N or P, the flow proceeds to step S014, wherein it is determined whether the engine stop control execution flag is "1". When the result of the determination in step S014 is "NO", the flow proceeds to step S022.

When the determination in step S014 is "YES", the flow proceeds to step S023 of the "idle stop mode" and the flow is completed. In the idle stop mode, the engine is stopped under certain conditions at the time of stopping the vehicle.

In step S002, it is determined whether a neutral position determination flag F_NSW is "1". When the result of the step S002 is "YES", that is, when the gear position is neutral, the flow proceeds to step S014. When the result in step S002 is "NO", that is, the pear position is in-gear, the flow proceeds to step S003, wherein it determined whether the value of the clutch connection determination flag F_CLSW is "1". When the result is "YES", that is, it determined that the clutch is "disconnected", the flow proceeds to step S014. When the result in step S003 is "NO", which indicates that the clutch is "connected", the flow proceeds to step S004.

In step S004, it is determined whether the IDLE determination flag F_THIDLMG is "1". When the result is "NO", indicating that the throttle is fully opened, the flow proceeds to step S011. When the result of the determination in step S004 is "YES", indicating that the throttle is not fully opened, the flow proceeds to step S005, wherein it is determined whether a motor assist determination flag F_MAST is "1".

When the result in step S005 is "NO", the step proceeds to step S011. When the result in step S005 is "YES", the flow proceeds to step S006.

In step S011, it is determined whether the MT/CVT determination flag F_AT is "1". If the result is "NO", indicating that the vehicle is a MT vehicle, the flow proceeds to step S013. When the result in step S011 is "YES", indicating that the vehicle is a CVT vehicle, the flow proceeds to step 012, wherein it is determined whether the reverse position determination flag F_ATPR is "1". When the result is "YES", indicating the gear position is the reverse position, the flow proceeds to step S022. When the determination result is "NO", indicating that the gear position is other than the reverse position, the flow proceeds to step S013.

In step S006, it is determined whether the MTICVT determination flag F_AT is "1". When the result is "NO", indicating that the vehicle is a MT vehicle, the flow proceeds to step S008, where it is determined whether the final charging command value REGENF is less than "0", and if the results is less than "0", the flow proceeds to step S009 of the "acceleration mode" and the flow is completed. When it is determined that the final charging command value REGENF is larger than "0", the control is completed.

When the result of the determination in step S006 is "YES", indicating that the vehicle is a CVT vehicle, the flow proceeds to step S007, wherein it is determined whether the brake ON determination flag F_BKSW is "1". If the results in step S007 is "YES", indicating that the brake is depressed, the flow proceeds to step S013. When the result in step S007 is "NO", indicating that the brake is not depressed, the flow proceeds to step S008.

In step S013, it is determined whether the engine controlling vehicle speed VP for controlling the engine is "0". When the result is "YES", indicating that the vehicle speed is 0, the flow proceeds to step S014. If the result in step S013 is "NO", indicating that the car speed is not 0, the flow proceeds to step S015. In step S015, it is determined whether the engine stop control execution flag F_FCMG is "1". When the result in step S015 is "NO", the flow proceeds to step S016. When the result in step S015 indicates that the flag value is "1", the flow proceeds to step S023.

In step S016, a comparison is made between the engine rotation speed NE and the cruise/deceleration mode lower limit engine rotation speed #NERGNLx. Here, the letter x in the cruise/deceleration mode lower limit engine rotation speed #NERGNLx represents a value (including hysteresis) set for each gear position.

When the result in step S016 indicates that the engine rotation speed≦the cruise/deceleration mode lower limit engine rotation speed #NERGNLx, that is, when it is determined that the present rotation speed is in the lower speed range, the flow proceeds to step S014. In contrast, when the result in step S016 shows that the engine rotation speed>the cruise/deceleration mode lower limit engine rotation speed #NERGNLx, that is, when it is determined that the engine speed is in the high speed range, the flow proceeds to step S017. In step S017, it is determined whether the value of the brake ON determination flag F_BKSW is "1". When the result in step S017 is "YES", indicating that the brake is depressed, the flow proceeds to step S018. When the determination in step S017 is "NO", that indicates that the brake is not depressed, then the flow proceeds to step S019.

In step S018, it is determined whether the value of the IDLE determination flag F_THIDLMG is "1". If the result of the determination in step S018 is "NO", that is, when it is determined that the throttle is fully opened, then the flow proceeds to the step S024 of the "deceleration mode", and the control is completed. In the deceleration mode, the regenerative braking by the motor M is executed. When the determination in step S018 is "YES", that is, when it is determined that the throttle is not fully opened, then the flow proceeds to step S019.

In step S019, it is determined whether the value of the fuel cut execution flag F_FC is "1". When the result is "YES", indicating that the fuel cut operation is underway, the flow proceeds to step S024. When the result in step S019 is "NO", the flow proceeds to step S020, wherein it is determined whether the final assist command value ASTPWRF is less than "0". When the final assist command value ASTPWRF is below "0", the determination process proceeds to step S025 of the "cruise mode". In this "cruise mode" operation, the motor M does not rotate, and the vehicle travels by the driving force of engine E. When it is determined in step S021 that the final assist command value ASTPWRF is larger than "0", the control is completed.

<Zoning of the State of Charge of the Battery, SOC>

Next, the zoning of the state of charge of the battery (so-called classification of SOC, the state of charge, into zones) will be described. The calculation of the state of charge of the battery is carried out by the battery ECU 31 by use of, for example, the voltage, the discharge current, and the temperature of the battery.

An example of the classified zones are as follows: the base zone A (SOC is from 40% to 90%), which is the normal application range, is defined at the center, and below the zone A, a temporary application zone B (SOC is from 20% to 40%) is defined and further below, a zone C, which is an over-discharged zone, is defined. In addition, an over-charged zone D (SOC is from 80% or 90% to 100%) is defined above the zone A.

Detection of the state of charge of the battery SOC is carried out by addition of the current values in zones A and B, and by measuring the characteristic voltage of the battery in zone C and D.

The boundary of each zone is defined by a threshold value which includes a hysteresis comprising the upper limit and the lower limit which are respectively used at the time of increasing and reducing the state of charge.

<Discharge Depth Limit Determination>

Figure 4:
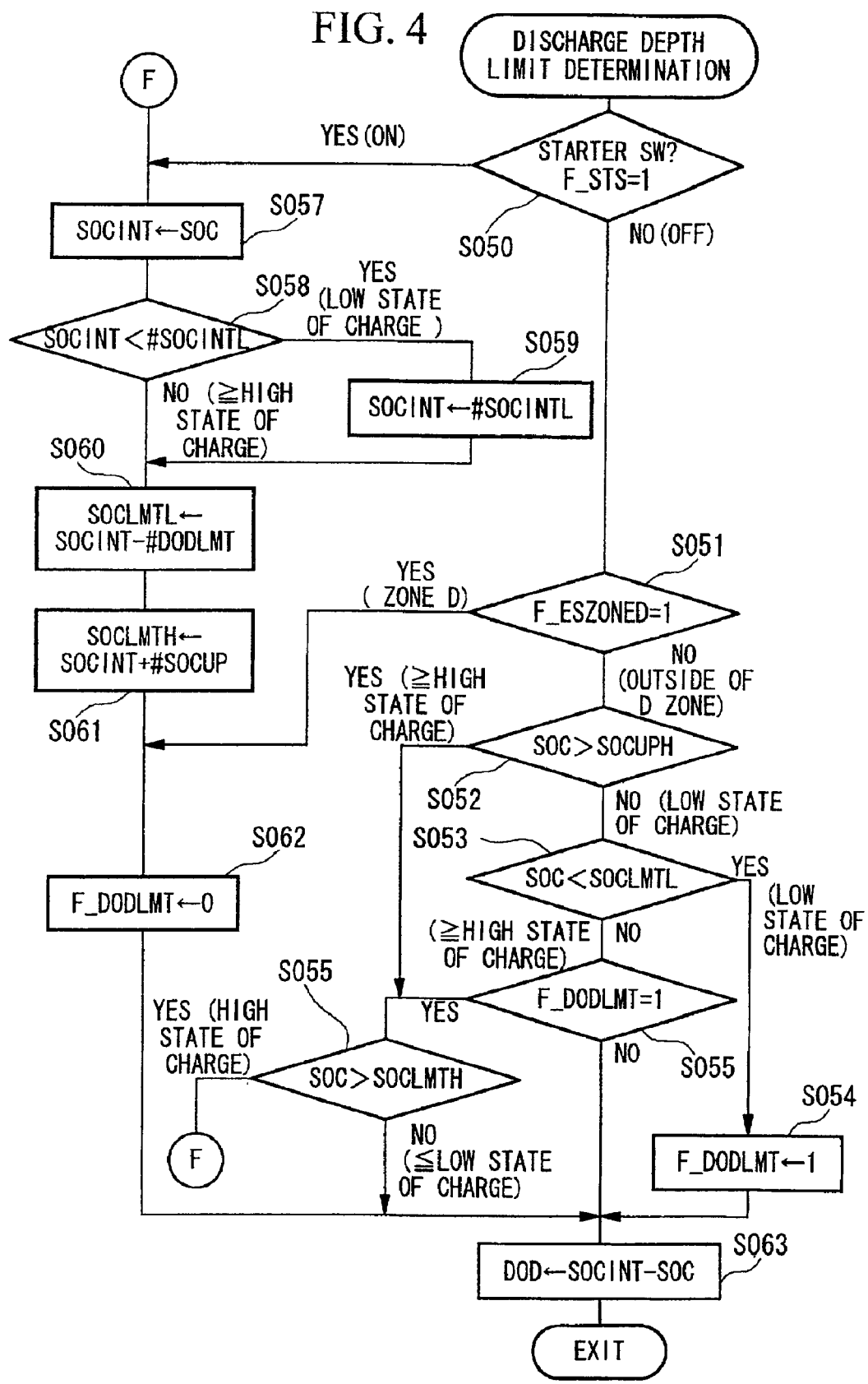
FIG. 4 is a flowchart of a discharge depth limit determination.

FIG. 4 shows a flowchart for carrying out the discharge depth limit determination.

In step S050, it is determined whether a flag value of the start switch determination flag F_STS is "1", that is, whether this is the starting time of the first travel. When the result of the determination is "1", indicating that this is the starting time of the first travel, the initial state of charge of the battery SOCINTL at the time of start of the travel is read in step 057. In step S058, it is determined whether the initial state of charge is smaller than the discharge depth control initial lower limit value #SOCINTL. In the above determination, the discharge depth control initial lower limit value #SOCINTL set is, for example, to 50%.

When the result of the determination in step S058 is "YES", indicating that the initial value SOCINTL of the state of charge of the battery is less than the discharge depth control initial lower limit value #SOCINTL (that is, the batterey residual capacity is low), the flow proceeds to step S059, and after substituting the discharge depth limit initial limit value #SOCINTL as the initial value of the state of charge of the battery SOC, the flow goes to step S060. That is, when the discharge depth limit initial limit lower value #SOCINTL is assumed to be 50%, if the actual state of charge of the battery is less than 50%, then 50% is assigned to the initial value of the state of charge of the battery.

If the judgement result in step S058 is "NO", that is, when it is determined that the initial value SOCINT of the state of charge of the battery SOC is larger than the discharge depth limit initial lower limit value #SOCINTL (when the capacity is low), the flow also proceeds to step S060.

In step S060, the lower limit threshold value SOCLMTL is set based on the initial value SOCINT of the initial value SOCINT of the state of charge SOC and, subsequently, the upper limit threshold value SOCLMTH is set in step S061 (refer to FIG. 5). The discharge depth limiting value #DODLMT, which determines the lower limit threshold value SOCLMTL, corresponds, although depending upon the individual property of the battery 3, to approximately 10% of the state of charge of the battery SOC, and the increasing value #SOCUP of the discharge depth limit value release SOC, which determines the upper limit threshold value SOCLMTH, corresponds to 5% of the state of charge of the battery SOC.

Accordingly, if the initial value SOCINT of the battery residual value is 55%, the lower limit threshold value SOCLMTL is set at 45%, and the upper limit threshold value SOCLMTH is set at 60%. When the initial value of the state of charge of the battery is 40%, since, for example, 50% is assigned as the initial value of the state of charge of the battery, the lower limit threshold value SOCLMTL is 40% and the upper limit threshold value SOCLMTH is 55%.

As shown above, when the initial value of the state of charge of the battery SOC is less than the discharge depth limit initial value lower limit #SOCINTL, the discharge depth to the lower limit threshold value SOCLIML can be made small by raising the initial value by substituting the discharge depth limit initial value lower limit #SOCINTL to the initial value of the state of charge of the battery SOC. Thus, when the initial value is less than the discharge depth limit initial value lower limit #SOCINTL at the starting time, reduction of the time elapsed until entering into the discharge depth limit control or immediate entery into the discharge depth limit control allows rapid restoration of the battery residual value SOC.

Subsequently, in step S062, the previous DOD limit judgement flag F_DODLMT is set to "0", and after the previous setting of the discharge depth limit control mode is released, the flow proceeds to step S063. In step S063, the discharge depth DOD is obtained which represents the amount of discharge of the present value of the state of charge SOC from the initial value SOCINT.

After starting travel, and when the start switch judgement flag F_STS is determined to be "0" in step S050, it is determined in step S051 whether the energy storage zone D determination flag is "1", and when the result is "NO", which indicates that the state of charge is not in the D zone, the flow proceeds to step S052. When the result of the determination in step S051 is "YES", indicating that the state of charge is in the D zone, the flow proceeds to step S062. In step S052, it is determined whether the present state of charge is larger than the discharge depth limit execution upper limit value SOCUPH. When the result is "YES", that is, when the present state of charge SOC>the discharge depth limit execution upper limit SOCUPH (that is, the state of charge is high), the flow proceeds to step S056. When the determination in step S052 is "NO", that is, when the present state of charge≦the discharge depth limit execution upper limit value SOCUPH (that is the state of charge is low), the flow proceeds to step S053. The above-described discharge depth limit execution upper limit value SOCUPH is set to, for example, 70%.

In the next step S053, it is determined whether the battery residual capacity SOC is less than the above-described SOCLMTL. When the result is "YES", that is, when it is determined that the battery residual value<the lower limit threshold value SOCLMTL (when the capacity is low), the DOD limit determination flag F_DODLMT is set to "1" in step S054 for setting the discharge depth limit control mode, and the flow proceeds to step S063. Thereby, as described later, various control operations related to the motor operation mode judgement such as an assist trigger judgement and control operations in the cruise mode are executed depending upon the state of the DOD limit judgement flag F_DODLMT.

Figure 5:
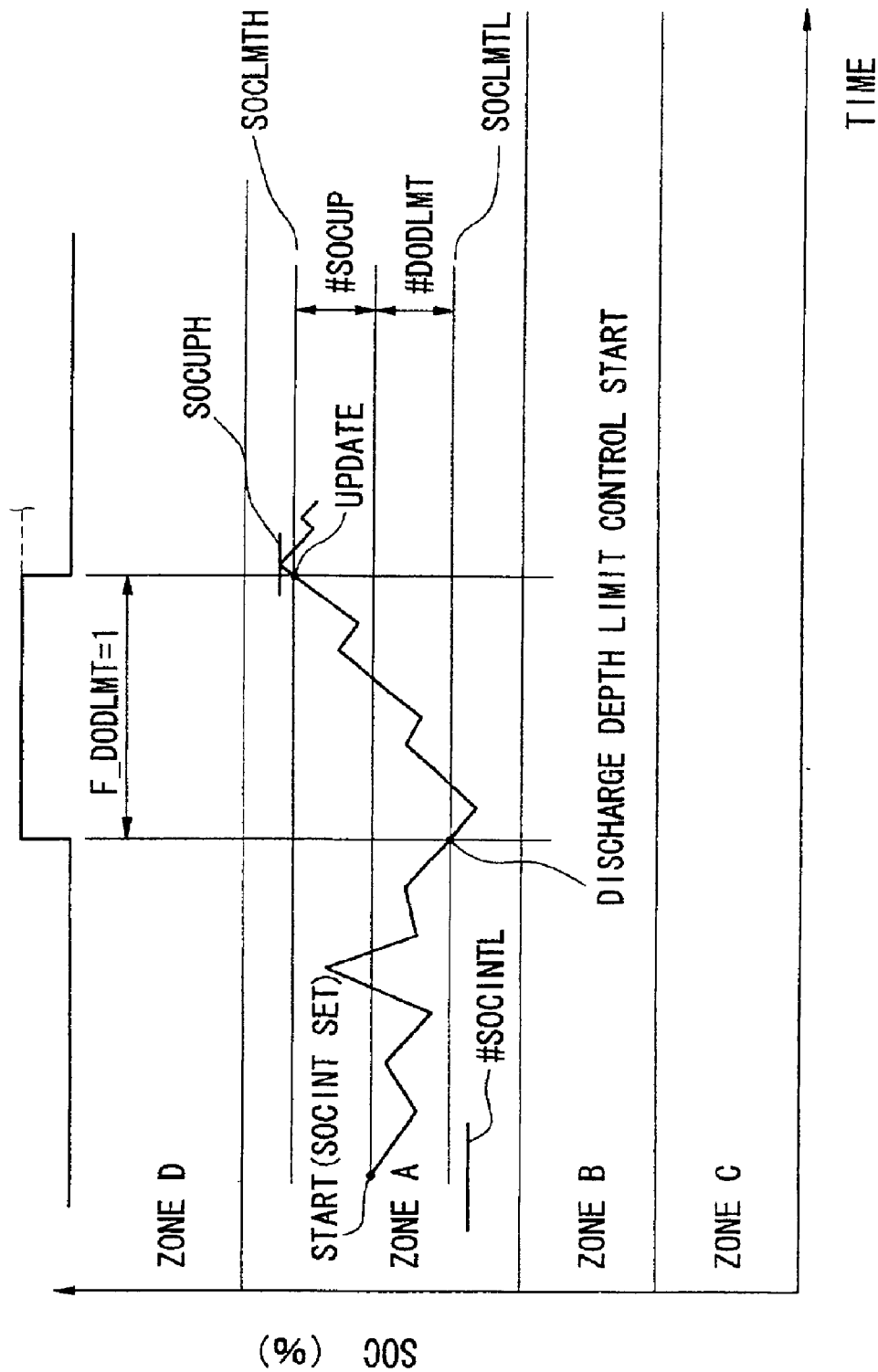
FIG. 5 is a graph showing SOC (the state of charge) in a discharge depth limit control mode.

When entering into the discharge depth limit control mode, the power generation is carried out so as to increase the state of charge of the battery as shown in FIG. 5. When it is determined that the battery residual capacity SOC≧the lower limit threshold value SOCLMTL, that is, the battery residual capacity SOC is higher than the lower limit threshold value SOCLMTL (when the state of charge is high), the state of the DOD limit judgement flag F_DODLMT is judged.

When the result in step S055 is "YES", that is, when it is determined that the discharge depth limit control mode has been set, it is determined in step S056 whether or not the state of charge of the battery SOC>the upper limit threshold value SOCLMTH, that is, the battery residual capacity SOC is larger than the upper limit threshold value SOCLMTH (that is, the state of charge is high), the flow proceeds to step S057. In step S057, the initial value of the state of charge SOCINT, and the following upper threshold value SOCLMTH, and the lower threshold value SOCLMTL are updated. The increase of the state of charge of the battery by this updating continues until the battery residual capacity reaches the D zone. Thus, it is possible to restore the state of charge of the battery rapidly, and to prevent the battery from being excessively charged.

In step S055, when it is determined that the value of the DOD limit judgement flag F_DODLMT is "0", that is, when it is determined that the setting of the discharge depth limit control mode is released, and when, in step S056, it is determined that the battery residual capacity SOC is equal to or less than the upper limit threshold value SOCLMTH (when the state of charge is low), the flow proceeds to step S063.

Next, the practical content of such a discharge depth limit control mode is described. Since the above discharge depth limit control depth is related to the "assist trigger determination", the assist trigger determination will be described hereinafter.

<Assist Trigger Determination>

Figure 6:
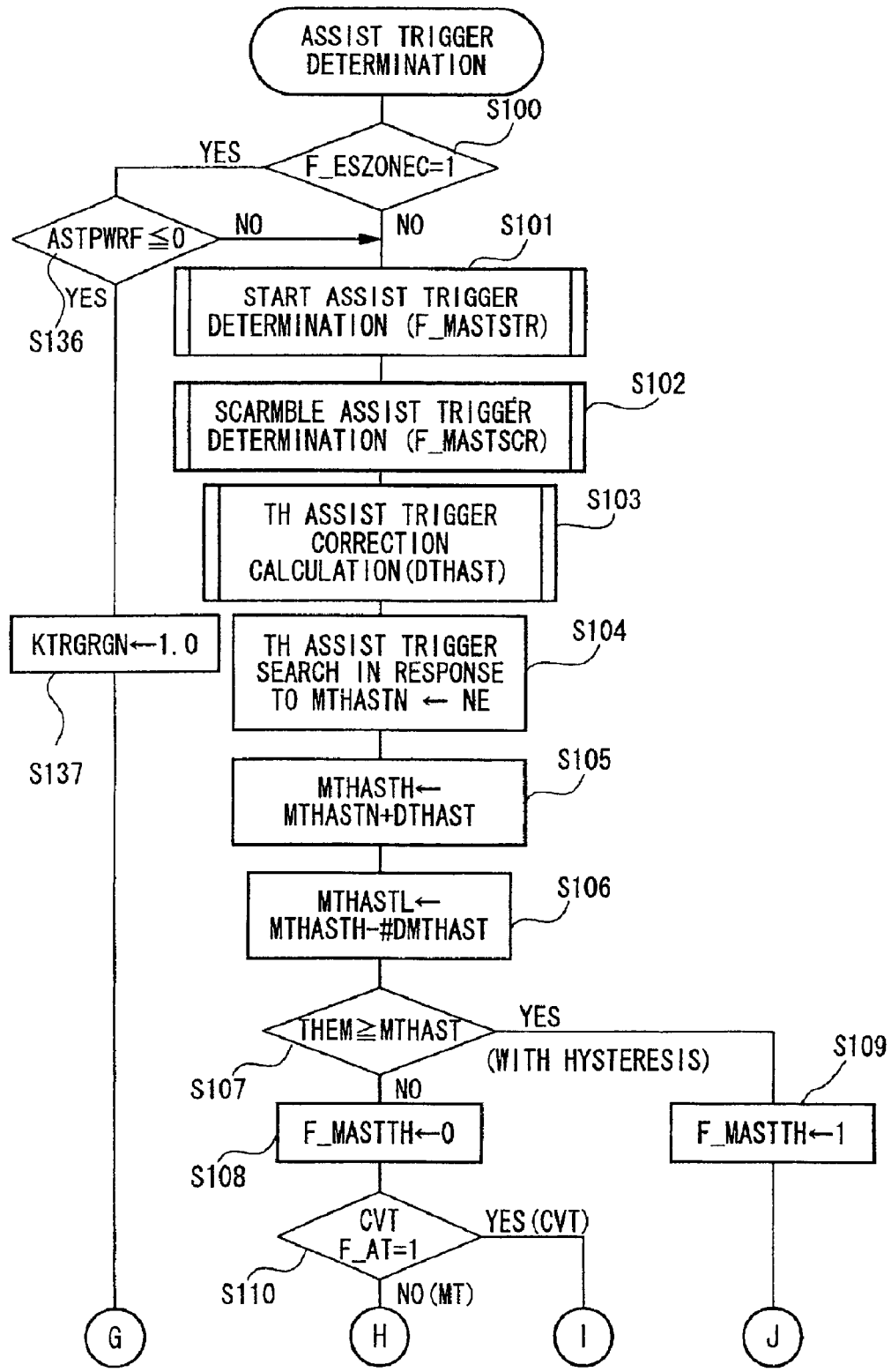
FIG. 6 is a flowchart for the assist trigger determination.
Figure 7:
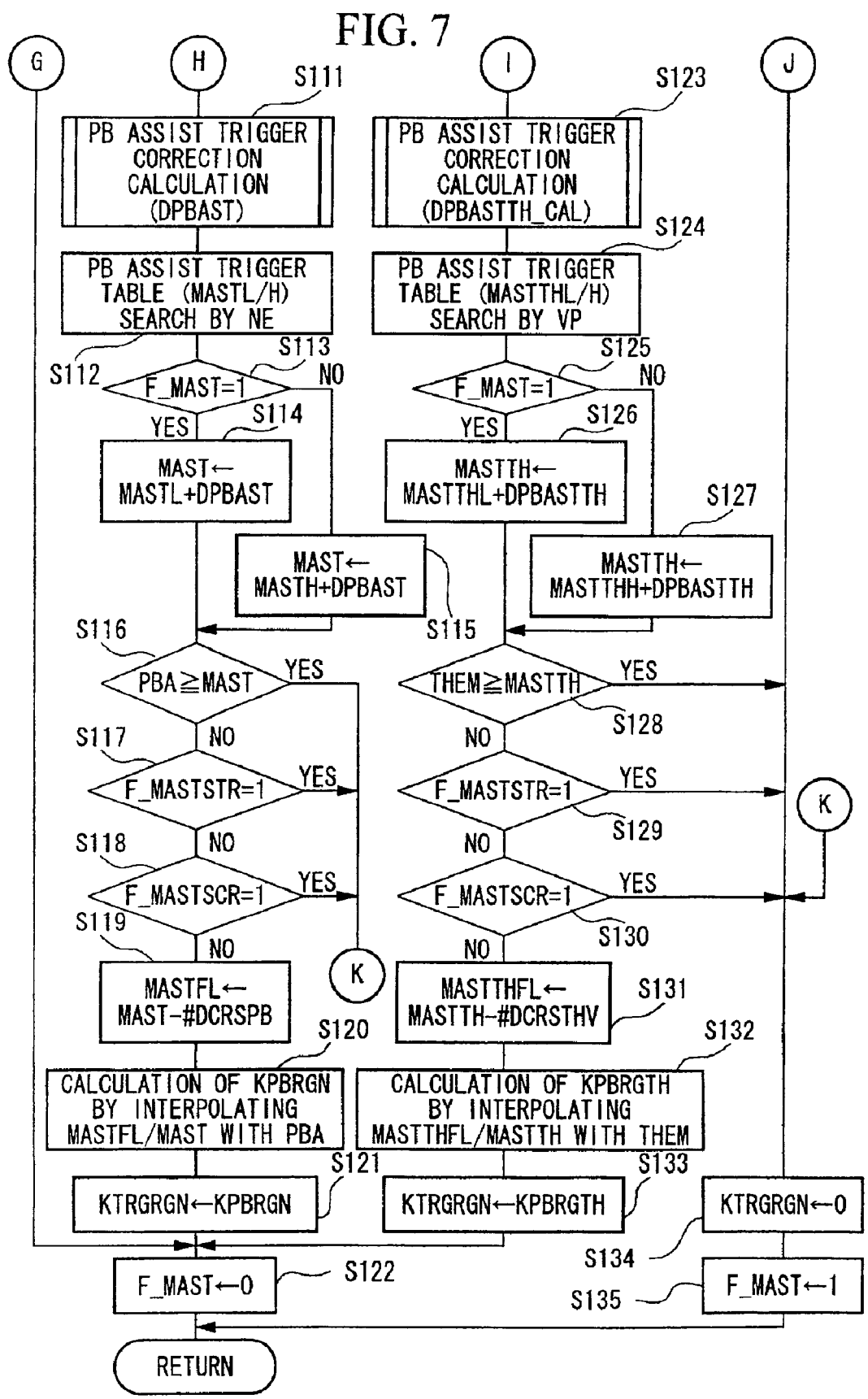
FIG. 7 is a flowchart for the assist trigger determination.

FIGS. 6 and 7 show flowcharts for assist trigger judgement, and more practically, flow-charts for judging the assist/cruise mode by the region.

It is determined in step S100 whether the energy storage zone C flag F_ESZONEC is "1". When the result is "YES", that is, when it is determined that the battery residual capacity SOC is in the C zone, it is further determined in step S136 whether the final assist order value ASTPWRF is equal to or less than 0. When the result in step S136 is "YES", that is, when it is determined that the final assist order value ASTPWRF is less than 0, then, in step S137, 1.0 is set as the cruise generation quantity subtraction factor KTRGRGN, and the routine is returned after setting "0" as the motor assist determination flag F_MAST in step S122.

If the results of the determination in steps S100 and S136 are "NO", a start trigger judgement is executed in step S101. This start assist trigger process has an objective of improving the start performance of vehicles and is a process for calculating an assist trigger value and an assist amount in addition to the normal assist amount when a vehicle is going to start when the negative pressure PB at the suction pipe is higher than the normal negative pressure, and when it is judged that the start assist control, the start assist request flag F_MASTSTR is set to "1".

Subsequently, it is determined at step S102 whether the start assist request flag F_MASTSTR is "1", and when the flag value is "1", the routine goes to step S135 for leaving the normal assist judgement for setting the cruise generation quantity subtraction factor KTRGRGN to "0", and the routine is returned after setting the motor assist judgement flag F_MAST to "1" in step S136.

When the result of the determination in step S102 shows that the start assist request flag F_MASTSTR value is not "1", then the routine goes to the scramble assist trigger judgement in step S103. This scramble assist trigger judgement process is a process for improving the acceleration sensation by temporarily increasing the assisting amount at the time of acceleration and it is defined in advance that, if the variation of the throttle is large, the flag value of the scramble assist request flag F_MASTSCR is set to "1".

In subsequent step S103, a calculation of the throttle assist trigger corrected value DTHAST is executed. The execution of this step is described later.

Figure 8:
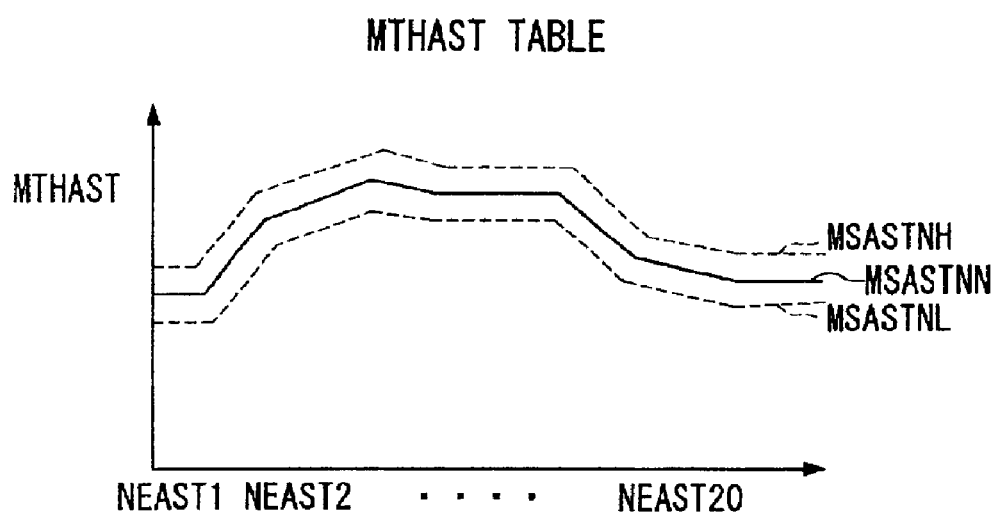
FIG. 8 is a graph showing threshold values of TH assist mode and PB assist mode.

Next, in step S104, a threshold value MTHASTN, which constitutes a standard for the throttle assist trigger, is searched from a throttle assist trigger table. As shown by the solid line in FIG. 8, the throttle assist trigger table provides the threshold MTHASTN of the throttle opening, which determines whether the motor assist is necessary, for the engine rotation speed NE, and a threshold value is determined according to the engine rotation speed NE.

In next steps S105 and S106, a high throttle assist trigger threshold value MTHASTH is obtained by addition of the corrected value DTHAST obtained in the above step S103 to the standard threshold value MTHASTN of the throttle assist trigger obtained in step S104, and a low throttle assist trigger value MTHASTL is obtained by subtracting the difference #DMTHAST for establishing hysteresis from the high throttle assist trigger threshold values MTHASTH. When these high and low throttle assist trigger threshold values are recited superimposing with the standard threshold value line MTHASTN in FIG. 8, these values are shown by two broken lines.

Subsequently, in step S107, it is determined whether or not the present throttle opening THEM is equal to or higher than the throttle assist trigger threshold value MTHAST, obtained in steps S105 and S106. This throttle assist trigger threshold value MTHAST is a value having the above-described hysteresis, a high throttle assist trigger threshold value MTHASTH is referred to when the throttle opening is changing to more open values, and a low throttle assist trigger threshold value MTHASTL is referred to when the throttle opening is changing to more close values.

When the result in step S107 is "YES", that is, when the present value of the throttle opening THEM is higher than the throttle assist trigger threshold values MTHAST (threshold values having high and low hysteresis values), the flow proceeds to step S109; and if the judgement in step S107 is "NO", that is, the present throttle opening THEM is not greater than the throttle assist trigger threshold value MTHAST (threshold values having high and low hysteresis values), the flow proceeds to step S108.

In step S109, the throttle motor assist determination flag F_MASTTH is set to "1", and in step S108, the throttle motor assist determination flag F_MASTTH is set to "0".

The above processing is executed for determining whether the degree of throttle opening TH is such that a motor assist is requested. Thus, when it is determined that the present value THEM of the throttle opening is greater than the throttle assist trigger threshold value MTHAST, it is determined that the motor assist is requested by reading this flag at the time of the above described "acceleration mode" after setting the throttle motor assist judgement flag F_MASTTH to "1".

In contrast, the fact that the throttle motor assist judgement flag F_MASTTH is set to "0" indicates that the vehicle conditions are not in a region where the motor assist determination can be made by the throttle opening. In this embodiment, the assist trigger is determined by use of both the throttle opening TH and the negative pressure at the engine suction pipe PB, so that the assist determination is made by the throttle opening TH when the present value THEM of the throttle opening is higher than the throttle assist trigger threshold value MTHAST, and in the region where the present value THEM of the throttle opening does not exceed the above threshold value MTHAST, the determination is made by the negative pressure at the engine suction pipe PB, which will be described later. In step S109, the flow proceeds to step S134 for leaving the ordinary assist determination, after "1" is set to the throttle motor assist determination flag F_MASTTH, and the flow returns after setting the subtraction coefficient of the cruise generation amount KTRGRGN to "0" in step S134, and setting the motor assist determination flag F_MAST to "1" in step S135.

In step S110, it is determined whether the flag value of a MT/CVT judgement flag F_AT is "1". When the result is "NO", that is, when the vehicle is a MT vehicle, the flow proceeds to S111. When the result in step S110 is "YES", that is, when the vehicle is a CVT vehicle, the flow proceeds to step S123. In step S111, a computing processing is carried out for obtaining an suction pipe negative pressure assist trigger corrected value DPBAST. The content of this processing is described later.

Figure 9:
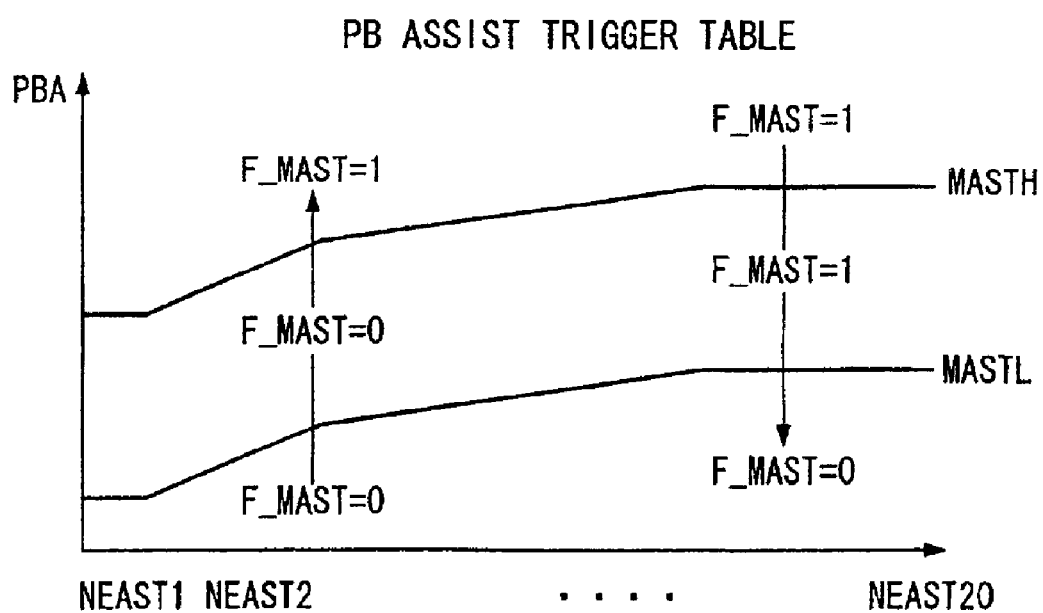
FIG. 9 is a graph showing the threshold value for an MT vehicle in the PB assist mode.

Subsequently, in step S112, a threshold value MASTL/H of the suction pipe negative pressure assist trigger is searched from the suction pipe negative pressure assist trigger table. This suction pipe negative pressure assist trigger table defines, as shown by two solid lines in FIG. 9, a high suction pipe negative pressure assist trigger threshold value MASTH and a low suction pipe negative pressure assist trigger threshold value MASTL for determining whether it is necessary to execute a motor assist depending on the engine speed NE. In the search processing in step S112, when the high threshold value MASTH line in FIG. 9 is crossed from the lower side to the upper side in response to the increase of the suction pipe negative charge PBA or in response to the decrease of the engine speed NE, the setting of the motor assist determination flag F_MAST is changed from "0" to "1", and when crossing the low threshold value MASTL in FIG. 9 from the upper to the lower in response to the decrease of the suction pipe negative charge PBA or in response to the increase of the engine speed NE, the setting of the motor assist judgement flag F_MAST is changed from "1" to "0". Here, a proper value is obtained from a plurality of figures prepared as FIG. 9 corresponding to respective gear positions and respective stoichiometric/lean burn conditions.

In the next step S113, it is determined whether the flag value of the motor assist judgement flag F_MAST is "1", and when the result is "1", the flow proceeds to step S114, and when the result is "0", the flow proceeds to step S115. In step S114, the suction pipe assist trigger threshold value MAST is obtained by addition of the corrected value DPBAST obtained in step S111 to the low threshold value MASTL of the suction pipe negative pressure assist trigger, which is obtained by retrieval in step S112, and in step S116, it is determined whether the present value PBA of the suction pipe negative pressure is higher than the suction pipe assist trigger threshold value MAST. If the result is "YES", the flow proceeds to step S134. When the result is "NO", the flow proceeds to step S117. In step S115, the suction pipe assist trigger threshold value MAST is obtained by addition of the corrected value DPBAST obtained in step S111 to the high threshold value MLASTH of the suction pipe negative pressure assist trigger obtained by the search in step S112. The flow then proceeds to step S116.

In step S117, it is determined whether the start assist request flag F_MASTSTR is "1", and when the result is "YES", the flow proceeds to step S134. When the result of the above step S117 is "NO", the flow proceeds to step S118. In step S118, it is determined whether the scramble assist request flag F_MASTSCR is "1", and when the result is "YES", the flow proceeds to step S134. If the result in step S118 is "NO", the flow proceeds to step S119.

Figure 10:
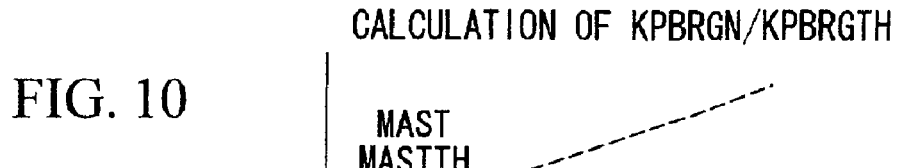
FIG. 10 is a graph for obtaining numerical values in step S119 and step S131.
Figure 11:
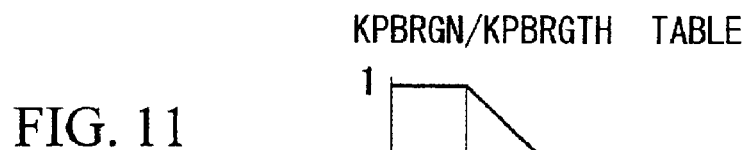
FIG. 11 is a graph for calculating numerical values in step S120 and step S132.

Next, in step S119, as shown in FIG. 10, a final suction pipe negative pressure assist trigger lower limit threshold value MESTFL is obtained by subtracting a predetermined delta value #DCRSPB of the suction pipe negative pressure from the above-described suction pipe negative pressure assist trigger threshold value MAST. Subsequently, in step S120, a cruise generation amount subtraction coefficient is obtained by interpolating the final suction pipe negative pressure assist trigger lower limit threshold value MASTFL and the suction pipe negative pressure assist trigger threshold value MAST using the present value PBA, and in step S121, the cruise generation amount subtraction value KPBRGN is substituted to the cruise generation amount subtraction coefficient KTRGRGN. The flow returns after substituting "0" to the motor assist determination flag F_MAST.

In step S109, a final throttle assist trigger lower limit threshold value MTHASTFL is obtained by subtracting a delta value (for example, 10 degree) of the predetermined throttle opening from the throttle assist trigger threshold value MTHAST. Subsequently, in step S112, cruise generation substraction factor table values KTHRGN are obtained by interpolation calculation of the final throttle assist trigger lower limit threshold value MTHASTFL and the throttle assist trigger threshold value MTHAST by use of the present value THEM of the throttle opening as shown in FIG. 10, and the cruise generation quantity subtraction table value KTHGRN is assigned in the cruise generation quantity subtraction factor KTRGRGN in step S113.

In the above step S110, when the flag value of the MT/CVT determination flag is determined to be "YES", that is, when it is determined that the vehicle is a CVT vehicle, the flow proceeds to step S123 to carry out processing for computing the suction pipe negative pressure assist trigger corrected value DPBASTTH. The detailed processing will be described later.

Figure 12:
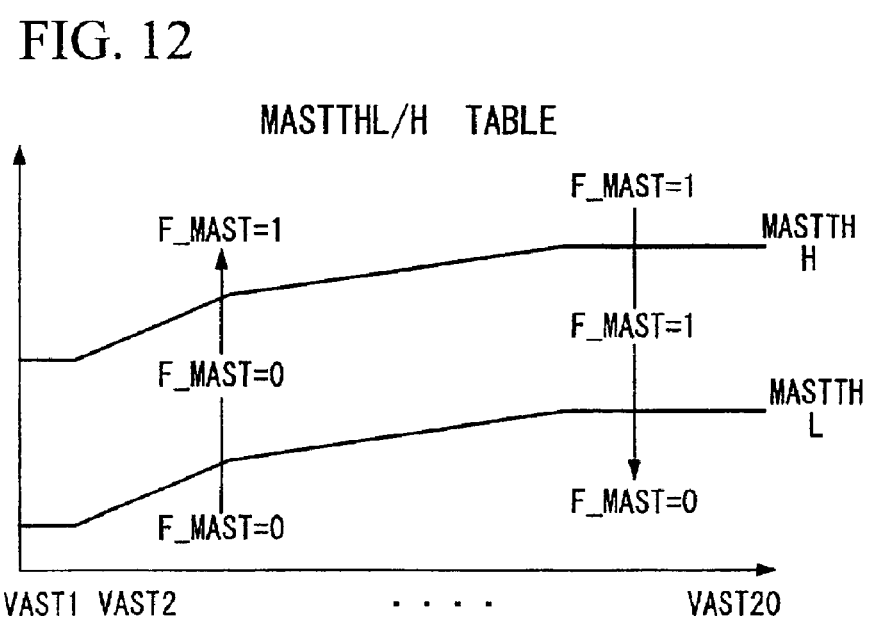
FIG. 12 is a graph showing the threshold value of a CVT vehicle in the PB mode.

Next, in step S124, a threshold value MATTHL/H of the suction pipe negative pressure assist trigger is retrieved from a suction pipe negative pressure assist trigger table. This suction pipe negative pressure assist trigger table determines, as shown by two solid lines in FIG. 12, the high suction pipe negative pressure assist trigger threshold value MASTTHH and the low suction pipe negative pressure assist trigger threshold value MASTTHL, used for determining whether the motor assist is necessary, for the engine controlling vehicle speed VP. In the search processing in step S124, when the high threshold value MASTTHH line is crossed from the lower side to the upper side in response to the increase of the degree of the throttle opening TH or in response to a decrease of the engine controlling vehicle speed VP, the motor assist judgement flag F_MAST is set from "0" to "1", and in contrast, when the low threshold value line MASTTHL is crossed from the upper side to the lower side in response to a decrease of the throttle openings TH or in response to an increase of the engine controlling vehicle speed VP, the setting of the motor assist judgement flag F_MAST is changed from "1" to "0". Here, a suitable value is selected as FIG. 12 which includes a variety of figures corresponding to respective gear positions and stoichiometric/lean burn conditions.

In the next step S125, it is determined whether or not the motor assist judgement flag F_MAST is "1", and when the result of the judgement is "1", the flow proceeds to step S126, and when the result is not "1", the routine goes to step S127. In step S126, the suction pipe assist trigger threshold value MASTTH is calculated by addition of the corrected value DPBASTTH obtained in step S123 to the low threshold value MASTTHL of the suction pipe negative pressure trigger, which was retrieved in S124. In step S128, it is determined whether the present value THEM of the throttle opening is higher than the suction pipe assist trigger threshold value MASTTH obtained in step S126. When the result is "YES", the flow proceeds to step S134, and when the result is "NO", the flow proceeds to step S135.

In step S127, the suction pipe assist trigger threshold value MASTTH is obtained by addition of the corrected value DPBATTH obtained in step S123 to the high threshold value MASTTHH of the suction pipe negative pressure assist trigger, which is retrieved in step S124, and the flow proceeds to step S128.

In step S129, it is determined whether the start assist request flag F_MASTSTR is "1", and when the result is "YES", the flow proceeds to sep S134. When the result is "NO", the flow proceeds to step S130. In step S130, it is determined whether the scramble assist request flag F_MASTSCR is "1", and when the result is "YES", the flow then proceeds to step S134. If the result is "NO", the flow proceeds to step S131.

In step S131, as shown in FIG. 10, the final suction pipe negative pressure assist trigger lowest threshold value MASTTHFL is obtained by subtracting the delta value #DCRSTHV of the predetermined throttle opening from above-described suction pipe negative pressure assist trigger threshold value MASTTH. Subsequently, in step S132, the cruise generation amount subtraction coefficient table value KPBRGTH is calculated by interpolating the final suction pipe negative pressure assist trigger lower limit threshold value MASTTHFL and the suction pipe negative pressure assist trigger threshold value MASTTH by use of the present value THEM of the throttle opening, and the cruise generation amount subtraction coefficient table value KPBRGTH is assigned to the cruise generation quantity subtraction factor KTRGRGN in step S133, and the flow is returned after setting the motor assist judgement flag F_MAST to "0".

[TH Assist Trigger Correction]

Figure 13:
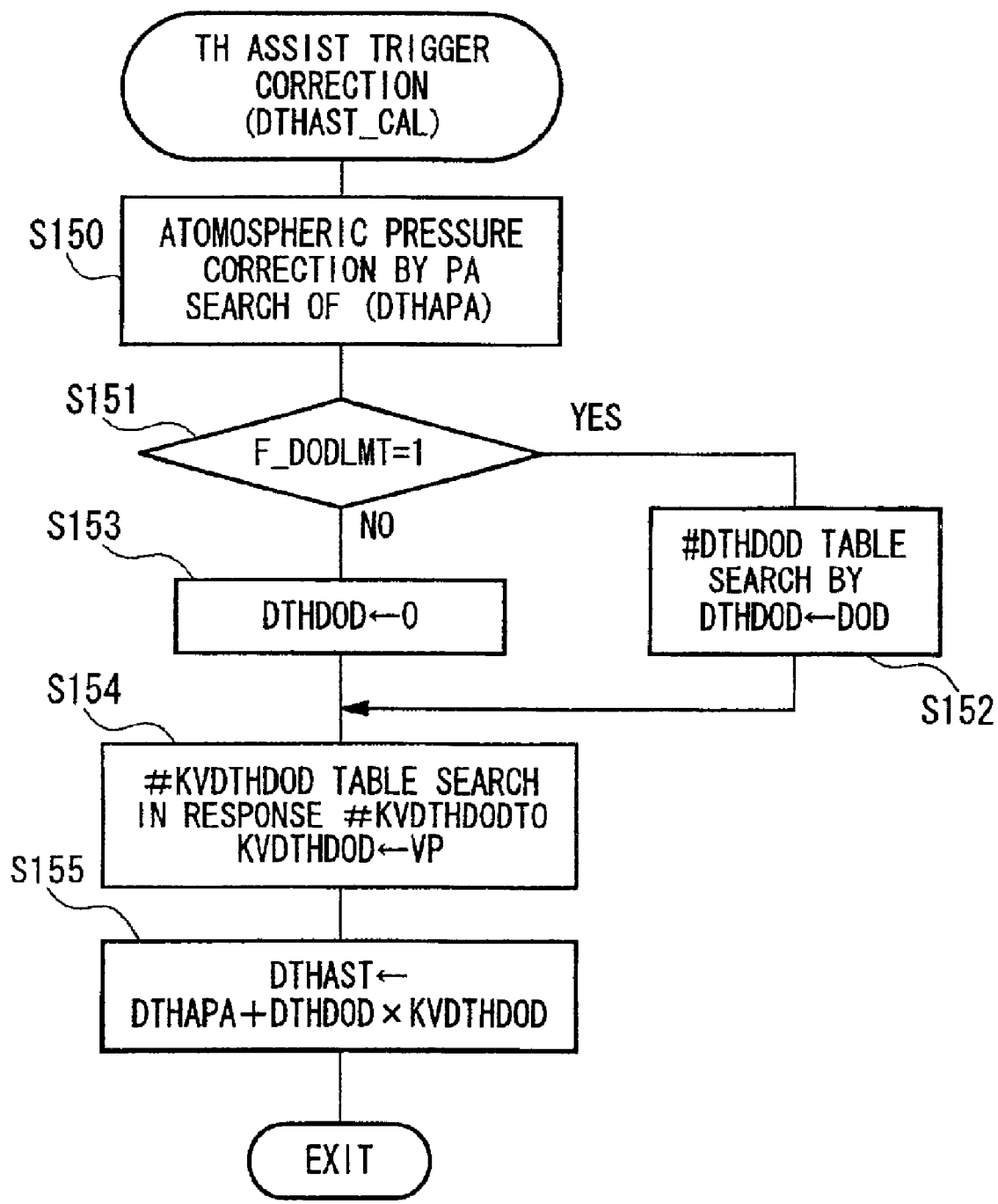
FIG. 13 is a flowchart of the TH assist trigger correction.

FIG. 13 shows a flowchart for executing the throttle assist trigger correction.

In step S150, an atmospheric correction value (DTHAPA) is determined depending on the atmospheric pressure (PA). This correction value is found using the throttle assist trigger PA table shown in FIG. 14 in which the correction value is set so as to decreases as the vehicle's altitude is reduced. By the use of this table, the atmospheric pressure correction value DTHAPA is obtained.

Subsequently, in step S151, it is determined whether the limit processing is in effect for the battery discharge depth DOD by judging whether the DOD limit judgement flag F_DODLMT is "1". When the discharge depth limit control mode is brought into effect, the DOD limit control correction value #DPBDOD is searched in step S152 based on FIG. 17, and the thus obtained value is assigned to the DOD limit control mode correction value DPBDOD.

In contrast, when the discharge depth limit control mode is released, the flow proceeds to step S153, the DOD limit control mode correction value DPBDOD is set to "0" after proceeding to step S166.

In this case, in place of the predetermined value #DPBDOD, an increased value is set for increasing the determination value for the motor assist, and the positive value is used to decrease the frequency of assist when the control operation is in the discharge depth limit control mode.

Figure 16:
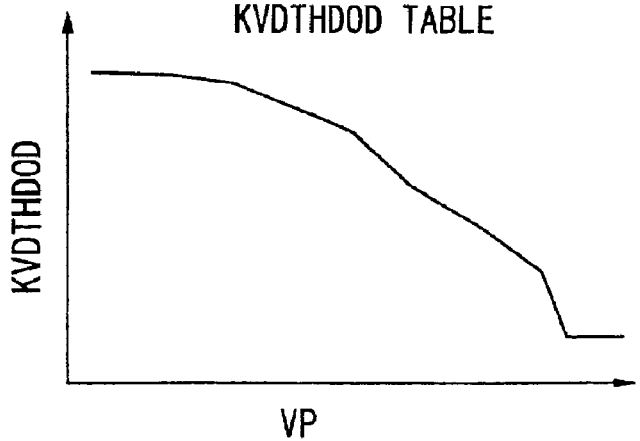
FIG. 16 is a graph showing a relationship between the car speed correction coefficient of the throttle assist trigger DOD corrected value and the car speed of a hybrid vehicle.

Subsequently, in step S154, a value of the throttle assist trigger DOD correction vehicle speed correction coefficient KVDTHDOD for the vehicle speed for control is obtained by a search of the table shown in FIG. 16. The throttle assist trigger DOD correction amount vehicle speed correction coefficient KVDTHDOD is smaller when the vehicle speed for control is higher.

In step S155, the throttle assist trigger correction value is obtained by addition of the atmospheric correction value DTAPA obtained in step 150 and a multiplication product of the DOD limit control mode correction value DTHDOD obtained in step 152 or in step S153 and the throttle assist trigger DOD correction amount vehicle speed correction coefficient KVDTHDOD and the flow is completed.

Consequently, when the vehicle speed is low and when the regeneration cannot be preserved because of repeated starting and stoping, the state of charge of the battery can be restored rapidly in the discharge depth control mode by raising the assist trigger threshold value by increasing the throttle assist trigger DOD correction amount vehicle speed correction coefficient.

<PB Assist Trigger Correction>

Figure 17:
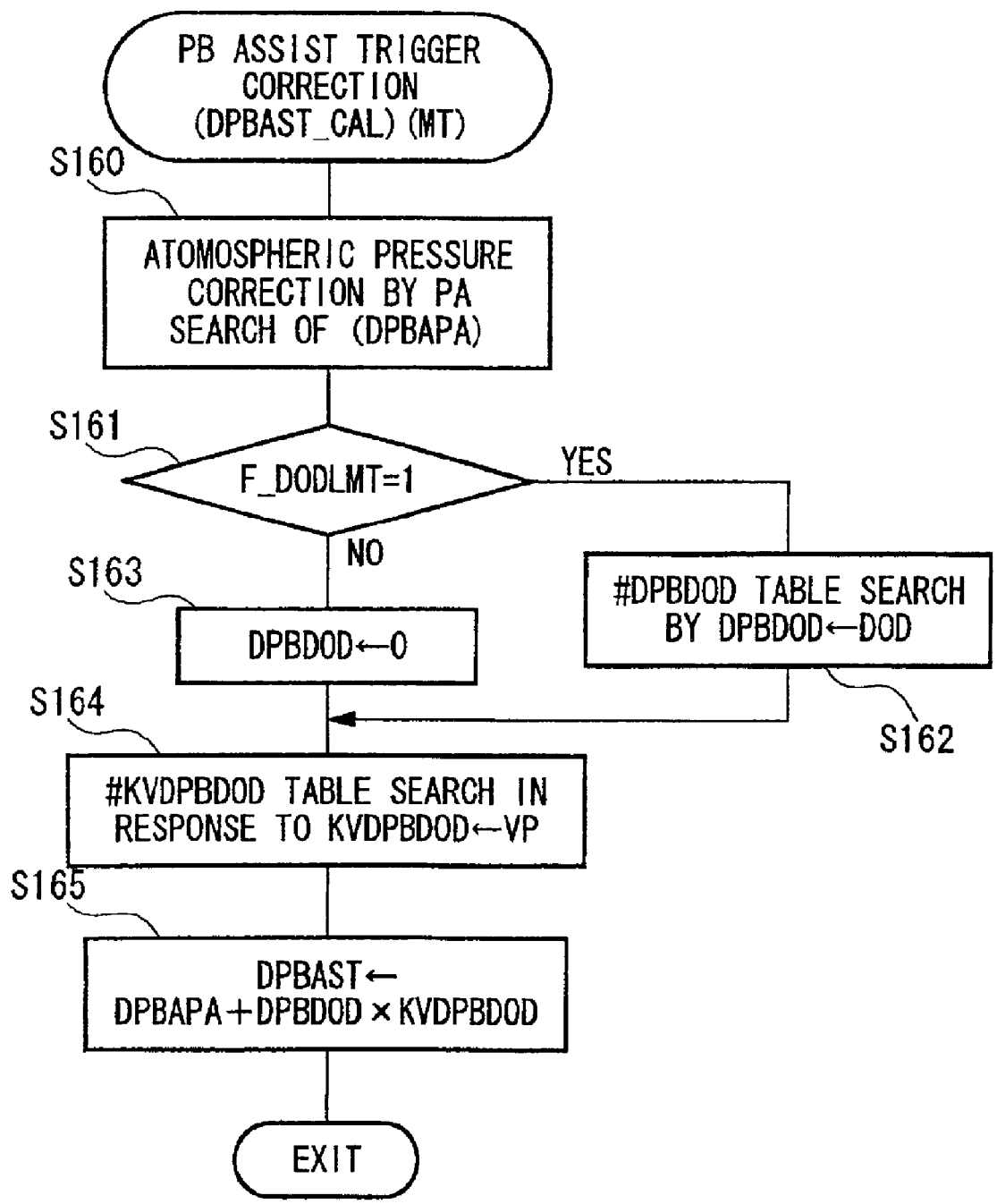
FIG. 17 is a flowchart for carrying out the assist trigger correction.
Figure 18:
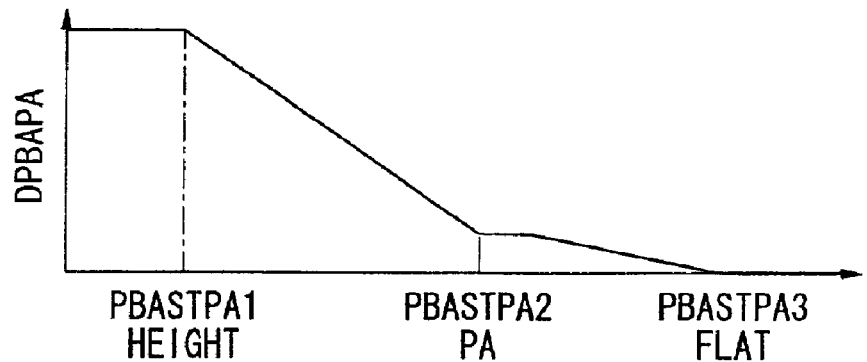
FIG. 18 is a graph of the atmospheric pressure correction.
Figure 19:
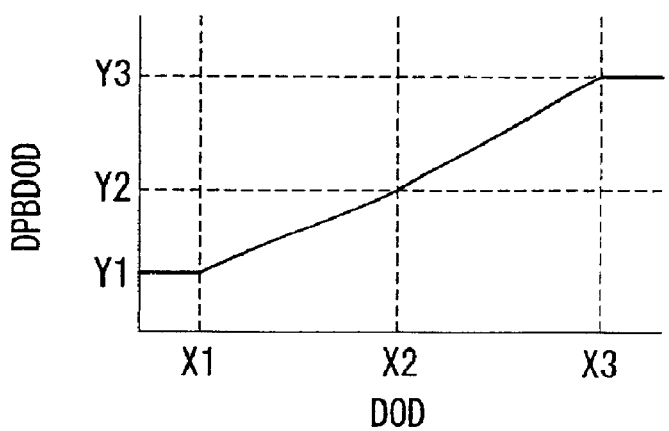
FIG. 19 is a correction table for discharge depth limit control.

FIG. 17 shows a flowchart of the suction pipe negative pressure throttle assist trigger correction executed in the above step S111.

In step S160, the atmospheric pressure correction value (DPBAPATH) is obtained in response to the atmospheric pressure. This correction value is searched from a table in which correction values are set so as to decrease as the vehicle's altitude decreases. The atmospheric pressure correction value DPBAPATH is thus obtained by this table retrieval.

In the next step S161, it is determined whether the limit processing for the battery discharge depth DOD is executed by determining whether the DOD limit judgement flag F_DODLMT is "1". When the control operation is in the discharge depth limit control mode, the DOD limit control mode correction value #DPBDODTH is retrieved from the table shown in Table 19, and the correction value #DPBDODTH is set as the DOD limit control mode correction value DPBDODTH.

In contrast, when the discharge depth limit control mode is released, the flow proceeds to step S163 and the DOD limit control mode correction value DPBDODTH is set to "0".

In this case, an increased value is set for the predetermined value #DPBDODTH in order to raise the judgement value for the motor assist operation and in order to make a correction so as to reduce the frequency of the motor assist operation when the control operation is in the discharge depth limit control mode. Thus, since it is possible to reduce the frequency of the motor assist operation when the control operation is in the discharge depth limit control mode, the state of charge of the battery can be restored rapidly.

Figure 20:
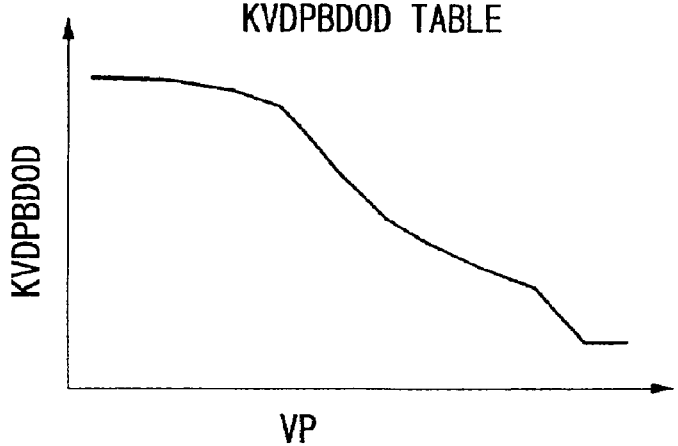
FIG. 20 is a graph showing the relationship between the car speed correction coefficient of the throttle assist trigger DOD corrected value and the car speed of a hybrid vehicle.

In the next step S164, the throttle assist trigger DOD correction amount correction vehicle speed correction coefficient KVDPBDOD is obtained by searching a table as shown in FIG. 20.

In the next step S165, the throttle assist trigger correction value DPBAST is obtained by addition of the atmospheric pressure correction value DPBAPA obtained in step S160 and a multiplication product of the DOD limit control mode correction value DPBDOD obtained in step S162 or in step S163 and the throttle assist trigger DOD correction amount vehicle speed correction coefficient KVDPBDOD and the flow is completed.

Consequently, when the vehicle speed is low and when the regeneration cannot be preserved because of repeated starting and stopping, the battery residual capacity can be restored rapidly in the discharge depth control mode by raising the assist trigger threshold value.

<PB Assist Trigger Correction (CVT)>

Figure 21:
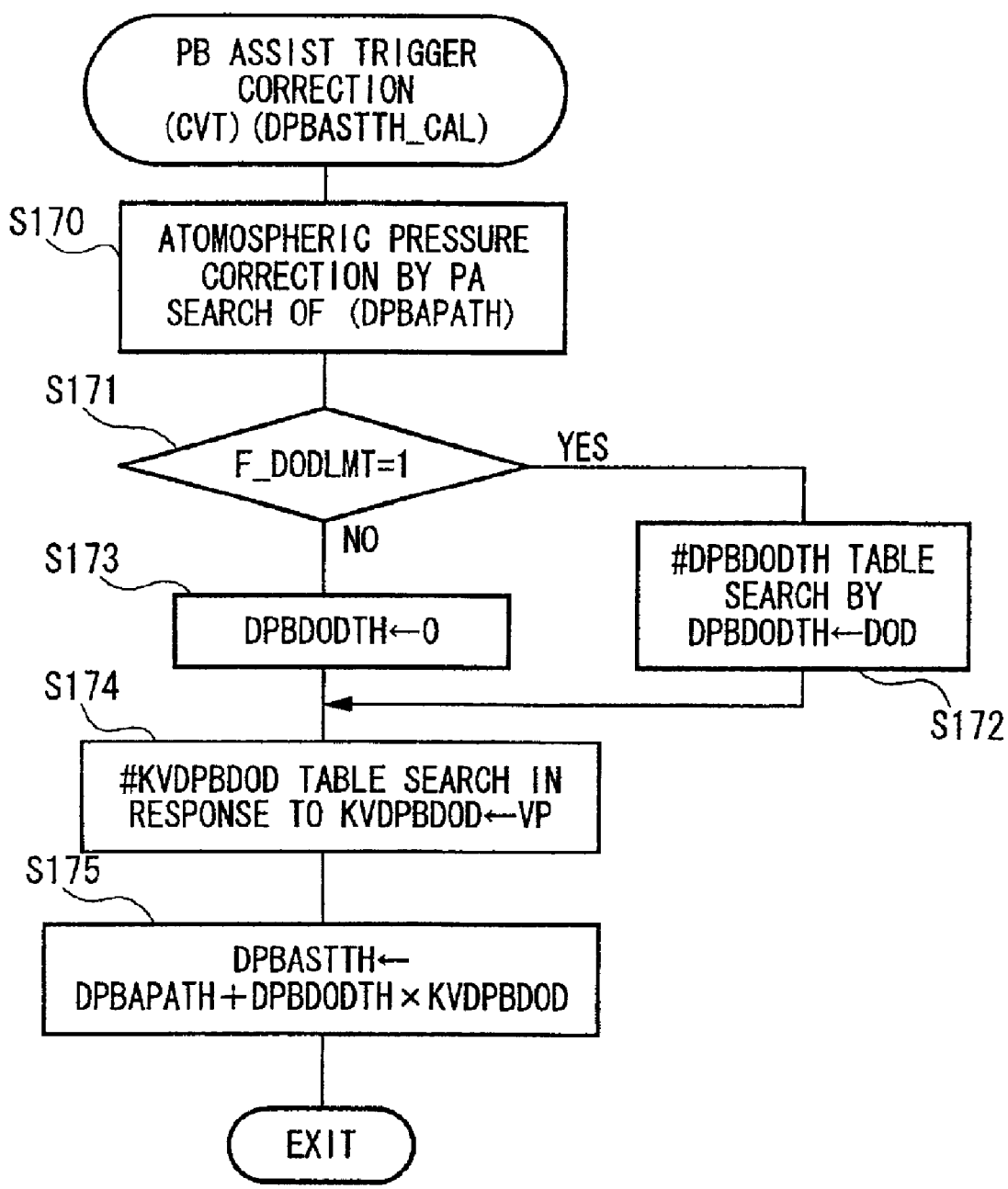
FIG. 21 is a flowchart of the PB assist trigger compensation (CVT vehicle).
Figure 22:
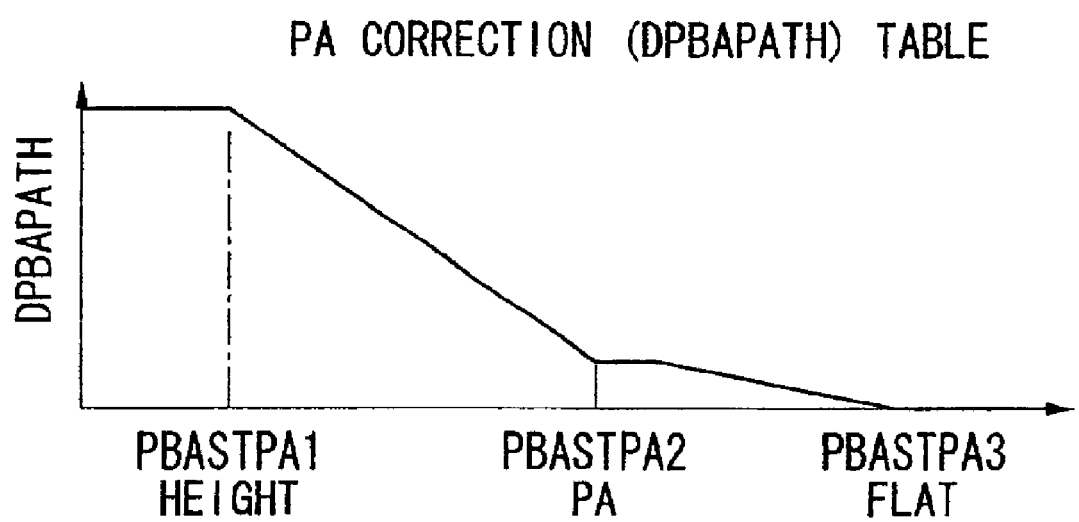
FIG. 22 is a graph showing the atmospheric pressure compensation table.

FIGS. 21 and 22 are flowcharts for the suction pipe negative pressure throttle assist trigger correction.

In step S170, the atmospheric pressure correction value (DPBAPATH) is obtained by table search. This table search is carried out by retrieving the table containing correction values which decrease as the vehicle's altitude decreases. The atmospheric pressure correction value DPBAPATH is obtained by the above table search.

Figure 23:
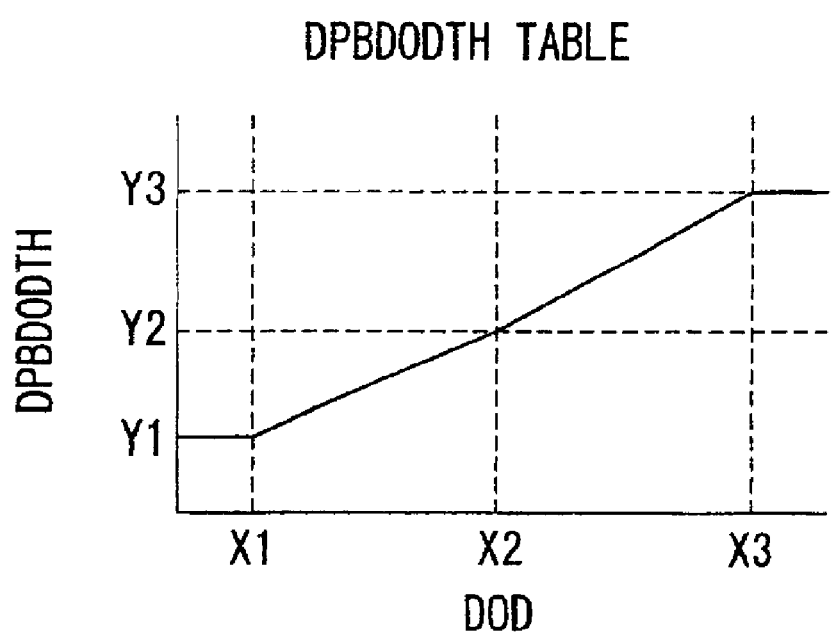
FIG. 23 is a graph showing the discharge depth limit control compensation table.
Figure 24:
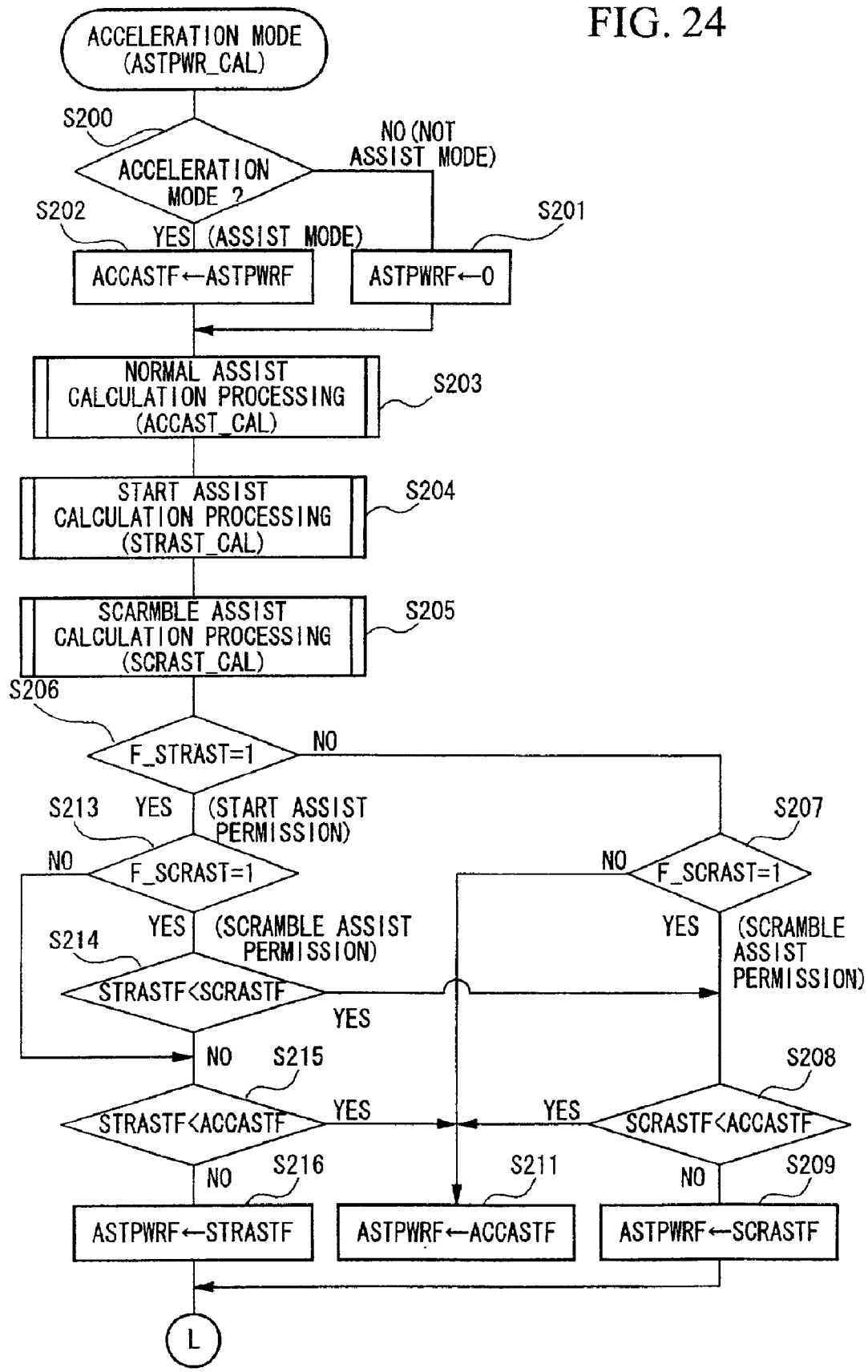
FIG. 24 is a flowchart showing the acceleration mode of the second embodiment.
Figure 25:
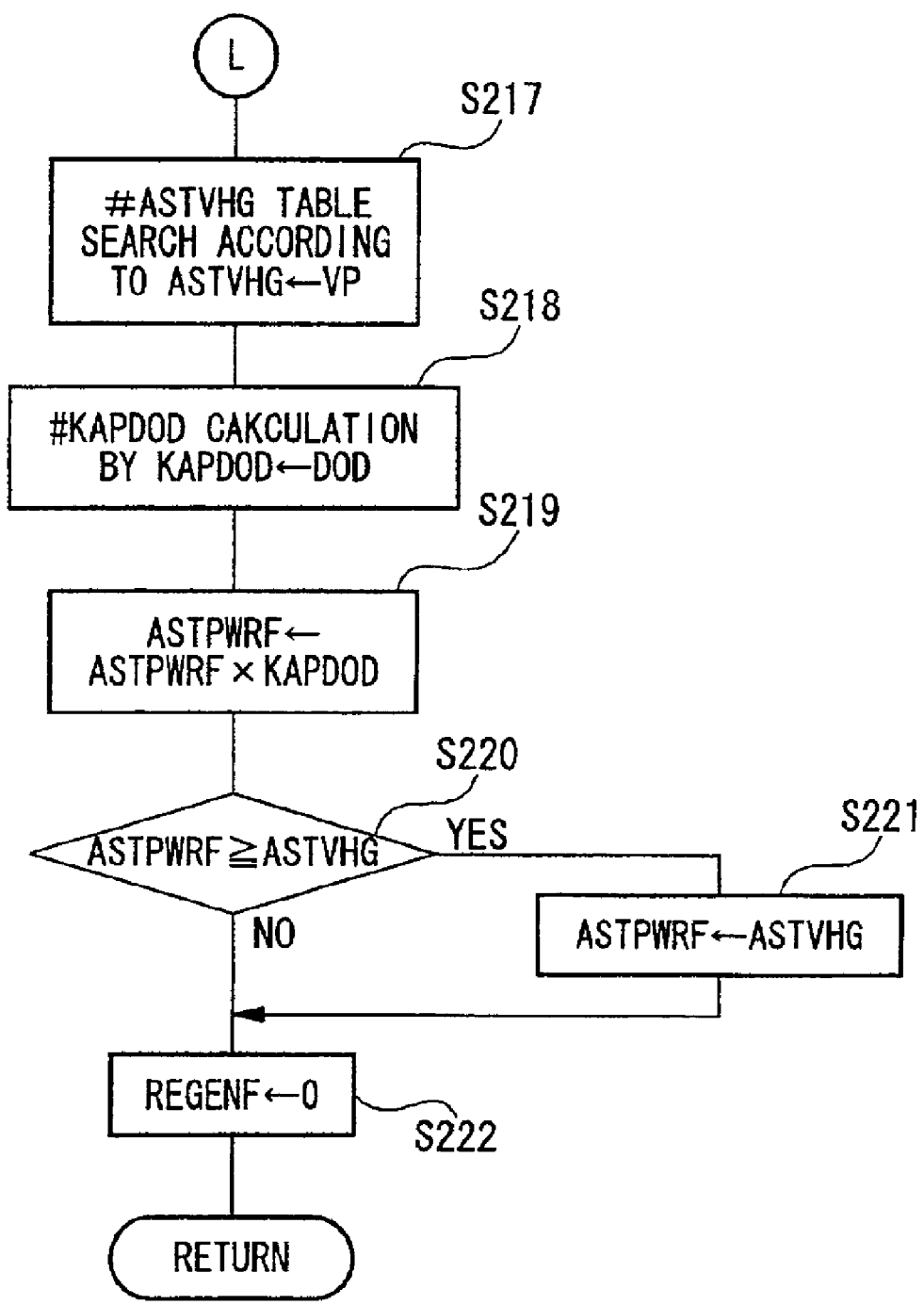
FIG. 25 is a flowchart showing the acceleration mode of the second embodiment.

Next, in step S171, it is determined whether the limit processing for the battery discharge depth DOD is executed by determining whether the DOD limit judgement flag F_DODLMT is "1". When control operation is in the discharge depth limit control mode, the DOD limit control mode correction value #DPBDODTH is obtained by a table search in the table shown in FIG. 23, and the thus obtained value of#DPBDODTH is assigned to the DOD limit control mode correction value DPBDODTH.

In contrast, when the discharge depth limit control mode is released, the flow proceeds to step S173 and "0" is assigned to the DOD limit control mode correction value DPBDODTH.

In this case, an increased value is set in place of the predetermined value #DPBDODTH in order to raise the determination value for the motor assist operation, and in order to make a correction so as to reduce the frequency of the motor assist operation when the control operation is in the discharge depth limit control mode. Thus, since it is possible to reduce the frequency of the motor assist operation when the control operation is in the discharge depth limit control mode, the state of charge of the battery can be restored rapidly.

In the next step S175, the throttle assist trigger correction value DPBASTTH is obtained by addition of the atmospheric pressure correction value DPBAPATH obtained in step S170 and a multiplication product of the DOD limit control mode correction value DPBDODTH obtained in step S162 or in step S163 and the throttle assist trigger DOD correction amount vehicle speed correction coefficient KVDPBDOD and the flow is completed.

Consequently, when the vehicle speed is low and when the regeneration cannot be preserved because of repeated starting and stopping, the battery residual capacity can be restored rapidly in the discharge depth control mode by raising the assist trigger threshold value.

Therefore, according to the present embodiment, especially when the control operation is in the discharge depth limit control mode, the charge of the battery can be restored rapidly by increasing the assist trigger threshold value in response to the discharge dept. In addition, when the assist trigger correction value is established, the correction value is set in response to the vehicle speed (the assist trigger is higher when the vehicle speed is lower), so that the state of charge of the battery can be restored rapidly even when the regeneration cannot be preserved because of the frequent repeating of the starting and stopping or by the high speed travel.

[Second Embodiment]

The second embodiment of the present invention is described with reference to FIGS. 24 to 27.

In this embodiment, when the control operation is in the discharge depth limit mode, that is, when the DOD limit determination flag F_DODLMT is "1", the assisting amount in the acceleration mode is adjusted, instead of correcting the assist trigger threshold value. More concretely, when the operation is in the discharge depth limit mode, the assisting amount is reduced when setting the final assist command value ASTPWRF. Hereinafter the operation is explained with reference mainly to the flowcharts shown in FIGS. 24 and 25.

In step S200, it is determined whether the operation is in the acceleration mode, and when it is determined that the operation is not in the acceleration mode, the flow proceeds to step S203 after setting the final assist command value ASTPWRF to "0" in step S201. When the result in step S200 indicates that the operation is in the acceleration mode, the flow proceeds to step S203 after substituting the final assist command value ASTPWRF for the ordinary assist final calculated value ACCASTF in step S202.

In step S203, a normal assist calculation processing is carried out, in step S204, the start assist calculation processing is carried out, and in step S205, a scramble assist calculation processing is carried out, and each assisting amount is obtained. In step S206, it is determined whether the start assist permission flag F_STRAST is "1". When the result is "YES", the flow proceeds to step S213, wherein it is determined whether the scramble assist permission flag F_SCRAST is "1". When the result in step S213 is "YES", the flow proceeds to step S214, wherein it is determined whether the final scramble assist calculation value SCRASTF is larger than the final start assist calculation value. When the result in step S214 is "YES", the flow proceeds to step S208, and when the result in step S214 is "NO", the flow proceeds to step S215, similar to the case of "NO" in step S213.

When the result in step S206 is "NO", the flow proceeds to step S207, wherein it is determined whether the scramble assist permission flag F_SCRAST is "1". When the result is "YES", the flow proceeds to step S208, and if the result is "NO", the flow proceeds to step S211.

It is determined in step S215 whether the final assist calculation value ACCASTF is larger than the final start assist calculation value STRSTF. when the result is "YES", the flow proceeds to step S211. If the result is "NO", the flow proceeds to step S216.

In step S208, it is determined whether the final ordinary assist calculation value ACCASTF is larger than the final scramble assist calculation value STRASTF. When the result is "YES", the flow proceeds to step S211, and if the result is "NO", the flow proceeds to step S209.

In step S216, the final start assist calculation value STRSTF is substituted for the final assist command value ASTPWRF, in step S211, the final ordinary assist calculation value ACCASTF is substituted for the final assist command value ASTPWRF, and in step S209, the final scramble assist calculation value SCRASTF is substituted for the final assist command value ASTPWRF.

Accordingly, based on the determination in the previous step, the largest numerical value available are selected from the final start assist calculation value STRSTF, the final ordinary assist calculation value ACCASTF, and the final scramble assist calculation value SCRASTF.

Figure 26:
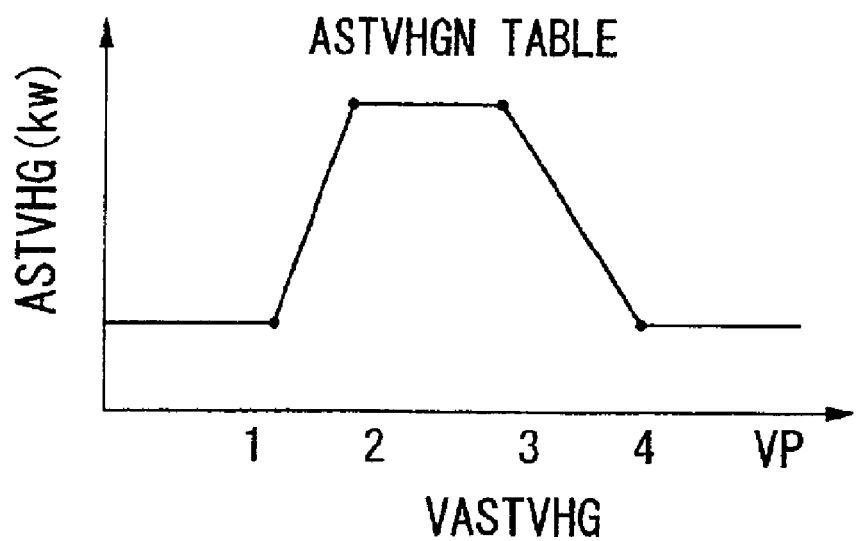
FIG. 26 is a graph for obtaining the upper limit value of the assist amount of the second embodiment.
Figure 27:
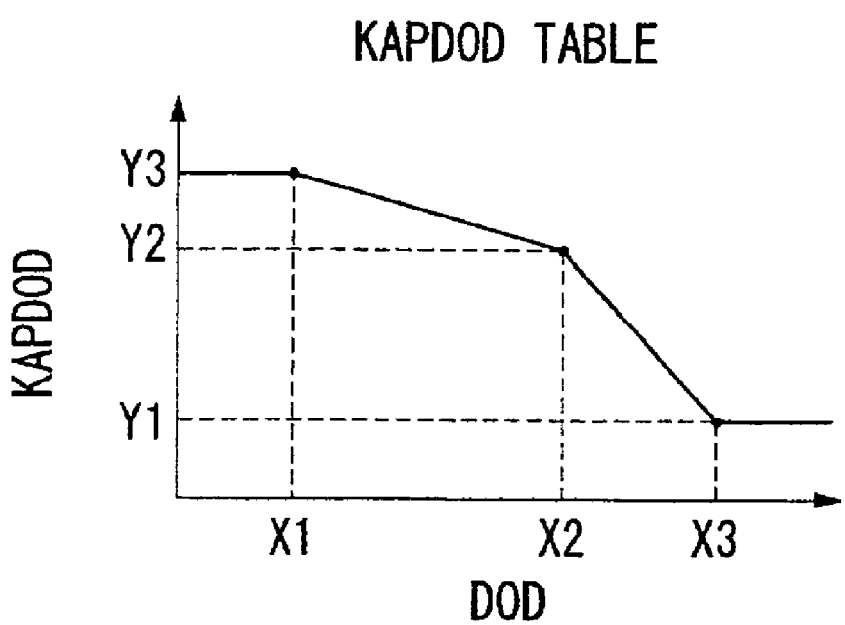
FIG. 27 is a graph for obtaining the DOD compensation coefficient of the final assist command of the second embodiment.

In any of steps S209, S211, and S216, when a prescribed assist amount is set as the final assist command value ASTPWRF, the assist amount upper limit ASTPWRF can be obtained in step S217 by a table search depending on the vehicle speed for control as shown in FIG. 26. Next, in step S218, the DOD correction coefficient #KAPDOD (less than 1) is obtained by table search depending on the engine controlling vehicle speed VP, in step S219, the above DOD correction ceofficient KAPDOD is multiplied by to the final assist command value ASTPERF, and the flow proceeds to step S220.

In step S220, it is determined whether the final assist command value ASTPVVRF is more than the assist amount upper limit, and when the result is "YES", the assist amount upper limit value ASTVHG is set as the final assist command value ASTPWRF in step S221, and the flow is returned after setting the final generation amount to "0" in step S222. When the result in step S220 is "NO", the flow proceeds to step S222 and the flow is returned.

Therefore, in this acceleration mode, when the operation is in the discharge depth limit mode, since it is possible to reduce the final assist command value depending on the discharge depth DOD , the assisting amount becomes small, which contributes to the rapid recovery of the state of charge of the battery. Especially, when the vehicle is repeatedly stopping and starting in the traffic congestion, and when regeneration cannot be expected, it can be expected to restore the state of charge of the battery by reducing the above-described assist amount.

In this embodiment, it is possible to apply an increase of the assist trigger threshold value shown in the first embodiment.

[Third Embodiment]

Next, the third embodiment of the present invention is described with reference to FIGS. 28 to 33.

In this embodiment, when the operation is in the discharge depth limit mode, that is, when the DOD limit determination flag F_DODLMT is "1", the generation amount is adjusted in the cruise mode instead of correcting the trigger threshold as shown in the first embodiment. Practically, in the DOD power generating mode, the generation amount is increased when it is in the discharge depth limit mode by setting the correction factors depending upon the discharge depth DOD. First, the flow-chart shown in FIG. 28 is explained.

Figure 28:
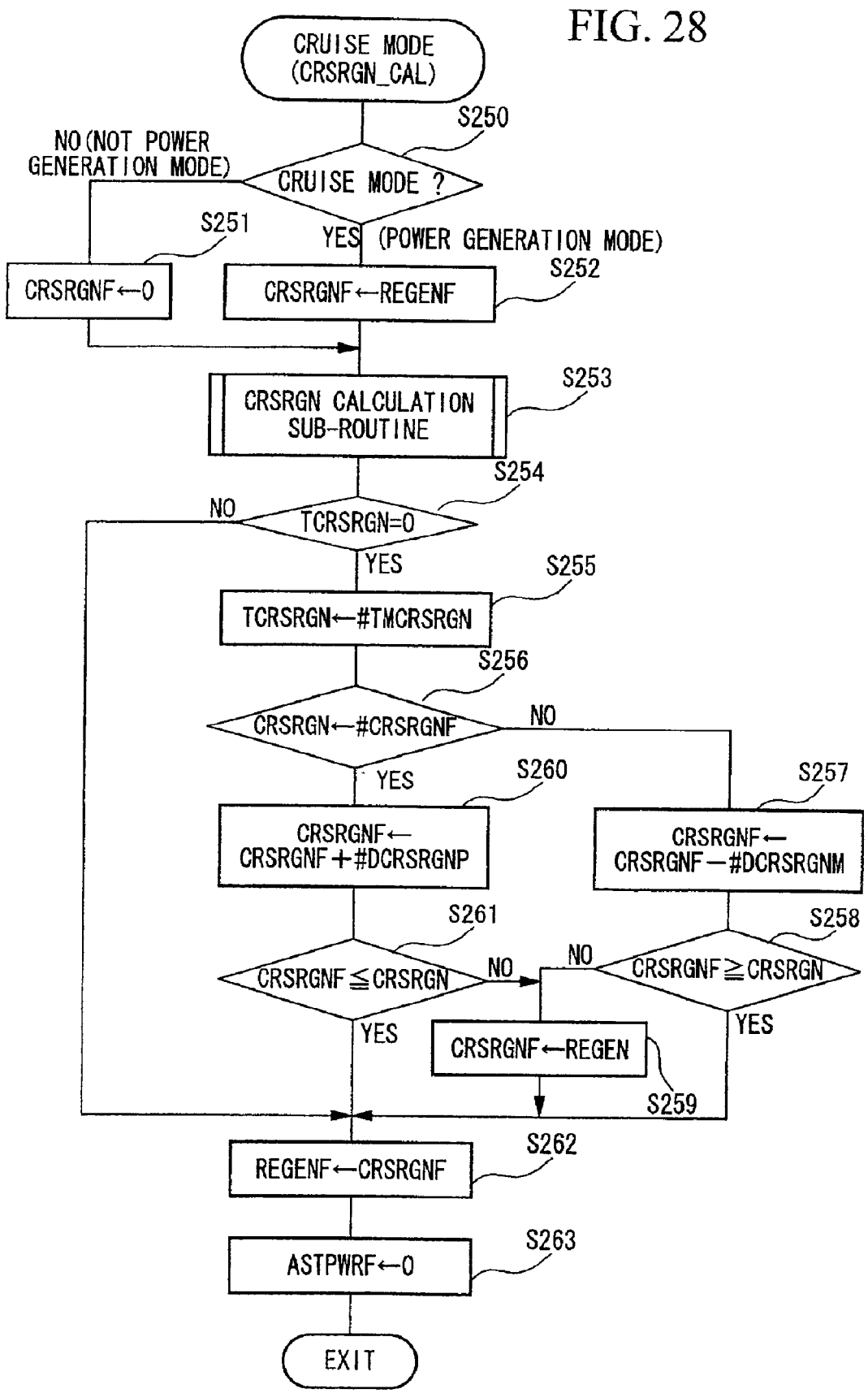
FIG. 28 is a flowchart of the cruise mode of the third embodiment.

In step S250 in FIG. 28, it is determined whether the mode is the cruise mode (power generation mode). When the result indicates that the mode is the other cruise mode than the cruise mode, the flow proceeds to step S253 after setting the final cruise generation amount CRSRGNF to "0" in step S251. If the result of the determination in step S250 shows that the mode is the cruise mode, the flow proceeds to step 253 after setting the final charge command value REGENF to the final cruise generation amount CRSRGNF in step S252.

Figure 29:
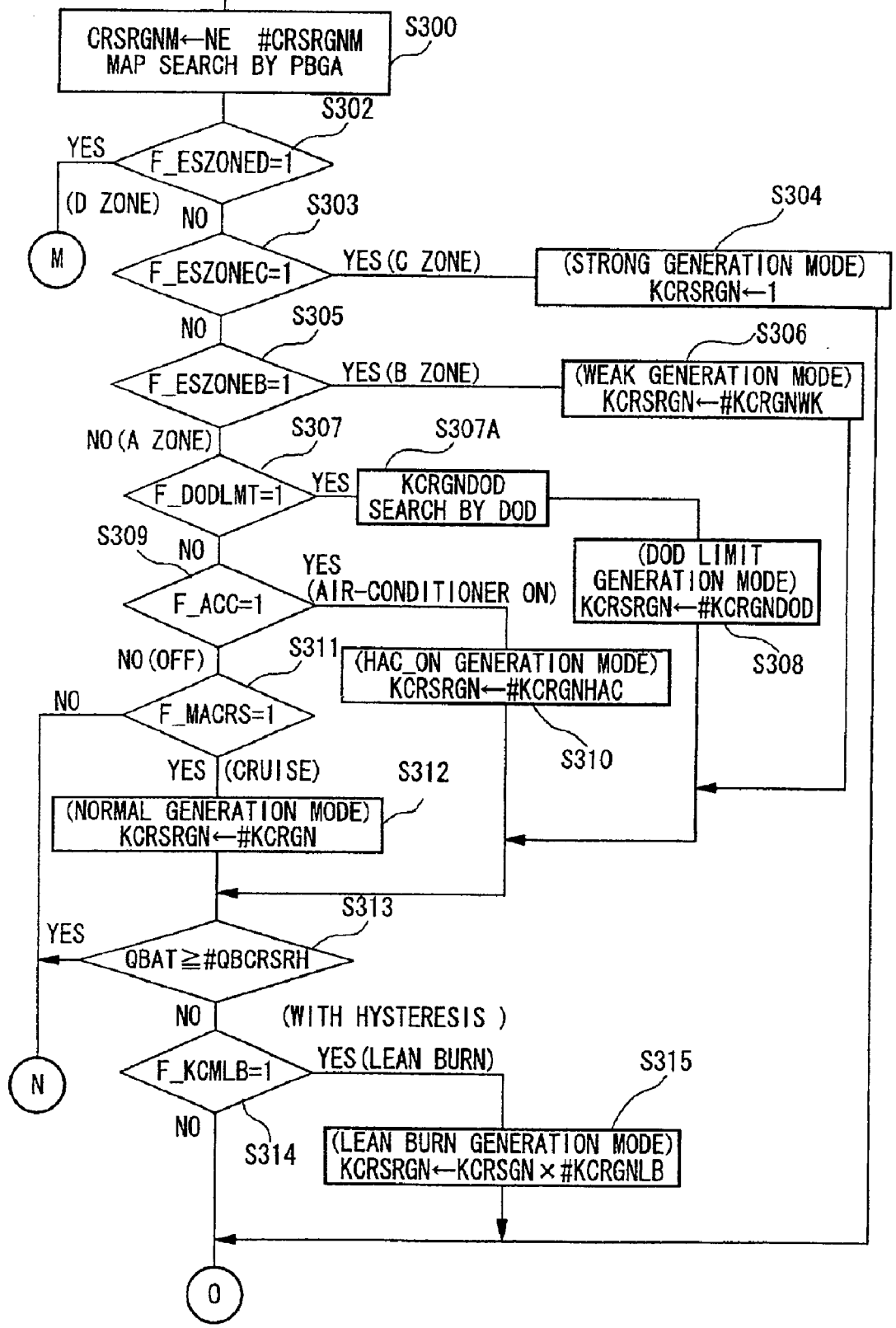
FIG. 29 is a flowchart for calculating the cruise generation amount of the third embodiment.
Figure 30:
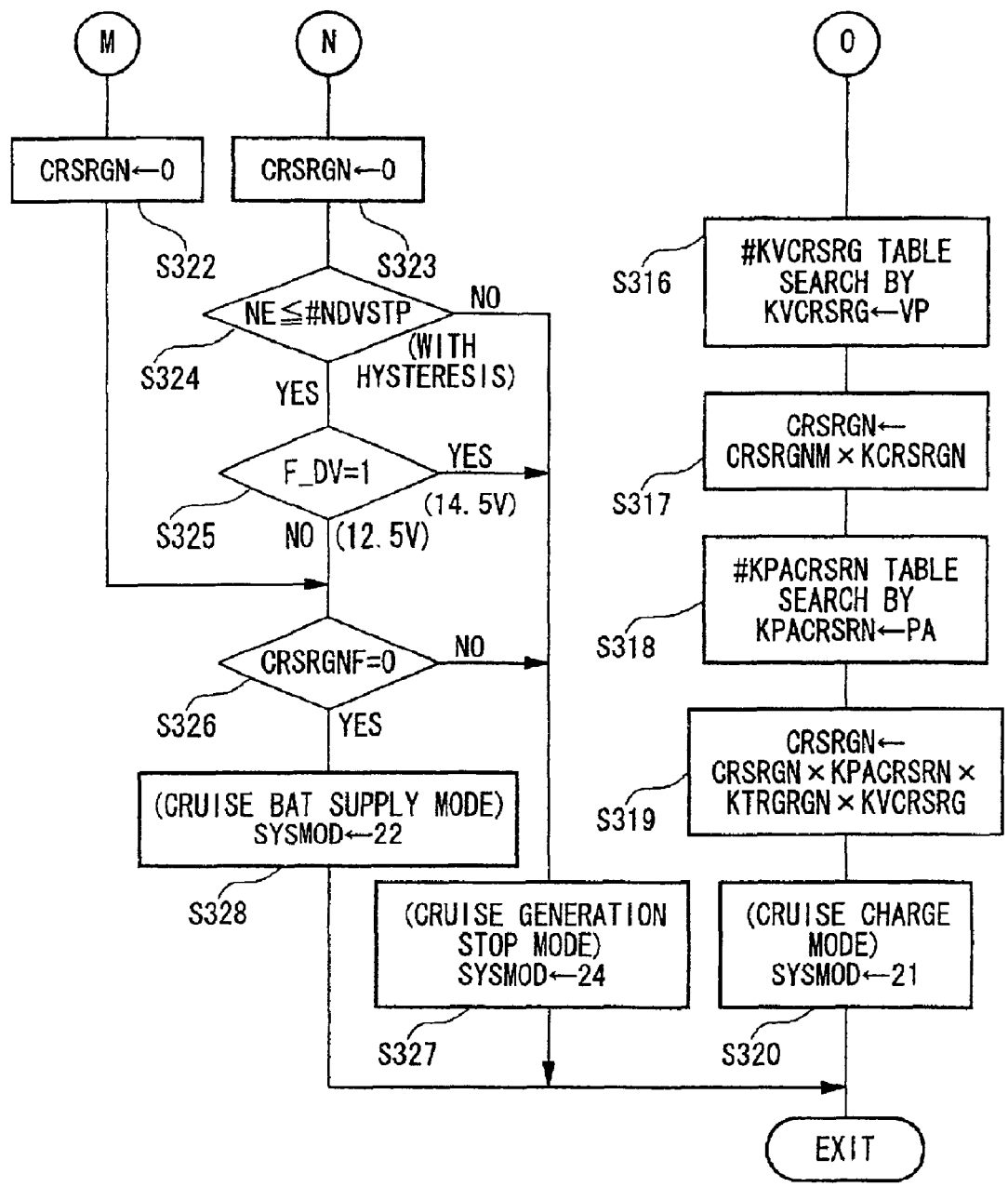
FIG. 30 is a flowchart for calculating the cruise generation amount of the third embodiment.
Figure 31:
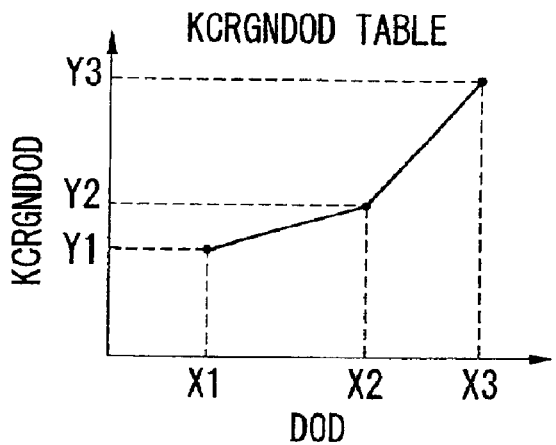
FIG. 31 is a graph for obtaining the cruise generation coefficient #KCRGNDOD.

In step S253, the cruise generation amount calculation processing, shown in FIGS. 29 and 30, and which will be described later, is described. The flow proceeds to step S254, wherein it is determined whether the gradual addition/subtraction timer TCRSRGN is "0", and when the result is "NO", the flow is completed after setting the final cruise generation amount CRSRGNF to the final charge command value REGENF in step S262, and setting "0" to the final assist command value ASTWRF in step S263.

When the result of the determination in step S254 is "YES", the flow proceeds to step S256 after setting a prescribed value to the gradual addition/subtraction timer in step S255. In step S256, it is determined whether the cruise generation amount is equal to or larger than the final cruise generation amount CRSRGNF.

When the result of the determination in Step S256 is "YES", the gradual addition amount #DCRSRGN is gradually added to the final cruise generation amount CRSRGNF in step S260, and in step S261, it is determined again whether the cruise generation amount CRSRGN is larger than the final cruise generation amount CRSRGNF. When the result in step S261 indicates that the cruise generation amount CRSRGN is larger than the final cruise generation amount CRSRGNF, the flow proceeds to step S262.

When the result in step S261 indicates that the cruise generation amount CRSRGN is smaller than the final cruise generation amount CRSRGNF, the flow proceeds to step S259, wherein the cruise generation amount CRSRGN is assigned to the final cruise generation amount CRSRGNF, and further proceeds to step S262.

When the result in step S256 is "NO", the gradual subtraction amount #DCRSRGNM is gradually subtracted from the final cruise generation amount CRSRGNF in step S257, and in step S258, it is determined whether or not the final cruise generation amount CRSRGNF is equal to or larger than the cruise generation amount CRSRGN. When the result of the determination in step S258 indicates that the cruise generation amount CRSRGN is larger than the final cruise generation amount CRSRGNF, the flow proceeds to step S259. When the result in step S258 indicates that the final cruise generation amount CRSRGNF is larger than the cruise generation amount CRSRGN, the flow proceeds to step S262.

Therefore, by the transfer processing in step S254, the operation can be transferred smoothly to the cruise generation mode without suffering any sudden change.

Next, the flow-chart for cruise generation amount calculation executed in step S253 shown in FIG. 28 is explained with reference to FIGS. 29 and 30. In step S300, the cruise generation amount CRSRNM is obtained by searching a map. This map shows a generation amount defined according to the engine speed NE and the suction pipe negative pressure PBGA, and a suitable map is adopted for use after selecting from two maps prepared for CVT and for MT.

In step S302, it is determined whether or not the energy storage zone D judgement flag F_ESZONED is "1". When the result is "YES", that is, when it is determined that the state of charge of the battery SOC is in the D zone, the flow proceeds to step S326 after setting the cruise generation quantity to "0" in step S322. In step S326, it is determined whether or not the final cruise generation command value CRSRGNF is "0". When the result in step S326 is not "0", the flow proceeds to step S327 and the flow is completed after shifting to the cruise generation stop mode. When the result in step S326 is "0", the routine goes to the step S328 and the flow is completed after shifting to the cruise battery supply mode.

When the result in step S302 is "NO", that is, when it is determined that the state of charge of the battery is not in the D zone, the flow proceeds to step S303 for determining whether the energy storage zone C determination flag F_ESZONEC is "1". When the result is "YES", that is, the state of charge of the battery is in the C zone, the flow proceeds to step S304, wherein the correction coefficient of the cruise generation amount KCRSRGN (strong generation mode) is set to "1", and further proceeds to step S316. When the result in step S303 is "NO", that is, the state of charge of the battery is not in the C zone, the flow proceeds to step S305.

In step S305, it is determined whether the energy storage zone B judgement flag is "1". When the result is "YES", that is, when the state of charge is in the B zone, the flow proceeds to step S306. In step S306, a cruise generation quantity coefficient KCRSRGN (weak generation mode) is set as the correction factor of the cruise generation factor KCRSRGN and the flow proceeds to step S313.

In contrast, when the result in step S305 is "NO", that is, the state of charge of the battery is not in the B zone, the flow proceeds to step S307, wherein it is determined whether the DOD limit judgement flag F_DODLMT is "1". When the result instep S307 is "YES", the flow proceeds to step S307, wherein the cruise generation amount coefficient #KCRGNDOD (for DOD limit generation mode) is obtained by a map search from the map shown in FIG. 31 and the flow proceeds to step S313 after the cruise generation amount coefficient #KCRGNDOD (for DOD limit generation mode) is set as the correction factor of the cruise generation quantity KCRSRGN in step S308.

The increased generation amount and incremented generation amount depending on the discharge depth allows rapid restoration of the state of charge of the battery.

In contrast, when the result in step S307 is "NO", the flow proceeds to step S309, and it is determined whether the air-conditioner ON flag F_ACC is "1". When the result is "YES", that is, when it is determined that the air-conditioner is in the ON state, the flow proceeds to step S310, wherein a cruise generation amount coefficient #KCRGNHAC (for HAC_ON generation mode) is assigned to the correction factor of the cruise generation quantity KCRSRGN and the flow proceeds to step S313.

When the result in step S309 is "NO", that is, when it is determined that the air-conditioner is OFF, the flow proceeds to step S311, wherein it is determined whether the cruise mode determination flag F_MACRS is "1". When the result in step 311 is "NO", that is, when it is determined that the operation is not in the cruise mode, the flow proceeds to step S324 after setting the cruise generation amount CRSRGN to "0" in step 323. When the result in step 311 is "YES", that is, when it is determined that the operation is in the cruise mode, the flow proceeds to step S313 after setting the cruise generation amount coefficient #KCRGN (for normal generation mode) as the cruise generation amount CRSRGN in step 313.

In step S324, it is determined whether the engine rotation speed NE is lower than the cruise battery supply mode execution upper limit engine rotation speed #NDVSTP. When the judgement result is "YES", that is, when it is determined that the engine rotation speed NE≦the cruise battery supply mode execution upper limit engine rotation speed #NDVSTP, the flow proceeds to step S325. In step S325, it is determined whether the downverter flag F_DV is "1", and when the result is "YES", the flow shifts to the cruise generation stop mode in step S327. When the result in step S325 is "NO", the flow proceeds to step S326.

When the result in step S324 is "NO", that is, when it is determined that the engine rotation speed NE>the cruise battery supply mode execution upper limit engine rotation speed #NDVSTP, the flow proceeds to step S227. It is noted that the cruise battery supply mode execution upper limit engine rotation speed #NDVSTP is a value having hysteresis.

In step S313, it is determined whether the state of charge of the battery QBAT (identical with SOC) is equal to or higher than the normal generation mode execution upper limit state of charge #QBCRSRH. It is noted that the normal generation mode execution upper limit state of charge #QBCRSRH is a value having hysteresis.

When the result in step S312 is "YES", that is, when it is determined that the state of charge of the battery QBAT≧the normal generation mode execution upper limit state of charge #QBCRSRH, the flow proceeds to step S323.

When it is determined that the battery residual capacity QBAT<the normal generation mode execution upper limit state of charge #QBCRSRH, the flow proceeds to step S314, wherein it is determined whether the value of the lean burn determination flag F_KCMLB is "1". When the result is "YES", that is, when it is determined that the operation is in the lean burn mode, a value obtained by multiplying the cruise generation amount coefficient "KCRGNLB (for lean burn generation mode) by the correction coefficient of the cruise generation amount KCRSRGN is set as the correction coefficient of the cruise generation amount KCRSRGN, and the flow proceeds to step S316. When the result in step S314 is "NO", indicating that the mode is not the lean burn mode, the flow proceeds to step S316.

Figure 32:
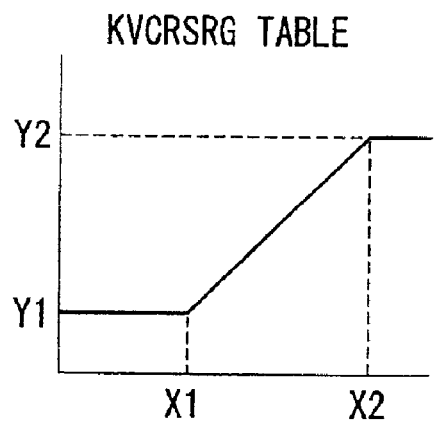
FIG. 32 is a graph for obtaining the cruise generation subtraction coefficient #KVCRSRG.
Figure 33:
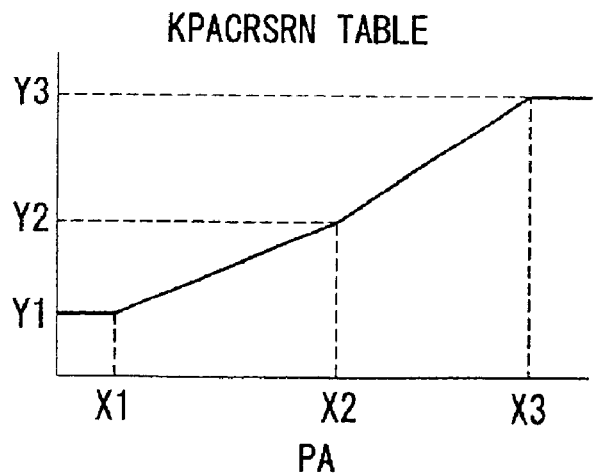
FIG. 33 is a graph for obtaining the cruise generation PA compensation coefficient #KPACRSRN.

In step S316, a cruise generation quantity subtraction factor KVCRSRG shown in FIG. 32 is obtained by a table search in the #KVCRSRG table according to the engine controlling vehicle speed VP. Subsequently, in step S317, a value obtained by multiplying the map value of the cruise generation quantity CRCRGNM by the correction factor of the cruise generation KCRSRGN and the cruise generation quantity subtraction factor KVCRSRG is set as the cruise generation quantity CRSRGN. The flow then proceeds to step S318, wherein a cruise generation quantity PA correction factor KPACRSRN is obtained by searching the #KPACRSRN table.

In step S319, a cruise generation amount CRSRGN is finally obtained by multiplying the cruise generation quantity CRSRGN by the cruise generation quantity PA correction factor KPACRSRN, the cruise generation quantity subtraction factor KTRGRGN, and the operation is shifted to the cruise generation mode in step S320.

The increase of the assist trigger shown in the first embodiment and the reduction of the assisting amount in the acceleration mode shown in the second embodiment can be applied together to this embodiment, and the technique shown in the present embodiment can be used together with both techniques shown in the first and the second embodiment.

Accordingly, in the present embodiment, when the operation is in the discharge depth limit control mode, the generation amount is increased at the time of cruising and the generation amount is increased by increasing the correction coefficient in response to the increasing discharge depth DOD, the state of charge of the battery can be restored.

[Fourth Embodiment]

Figure 34:
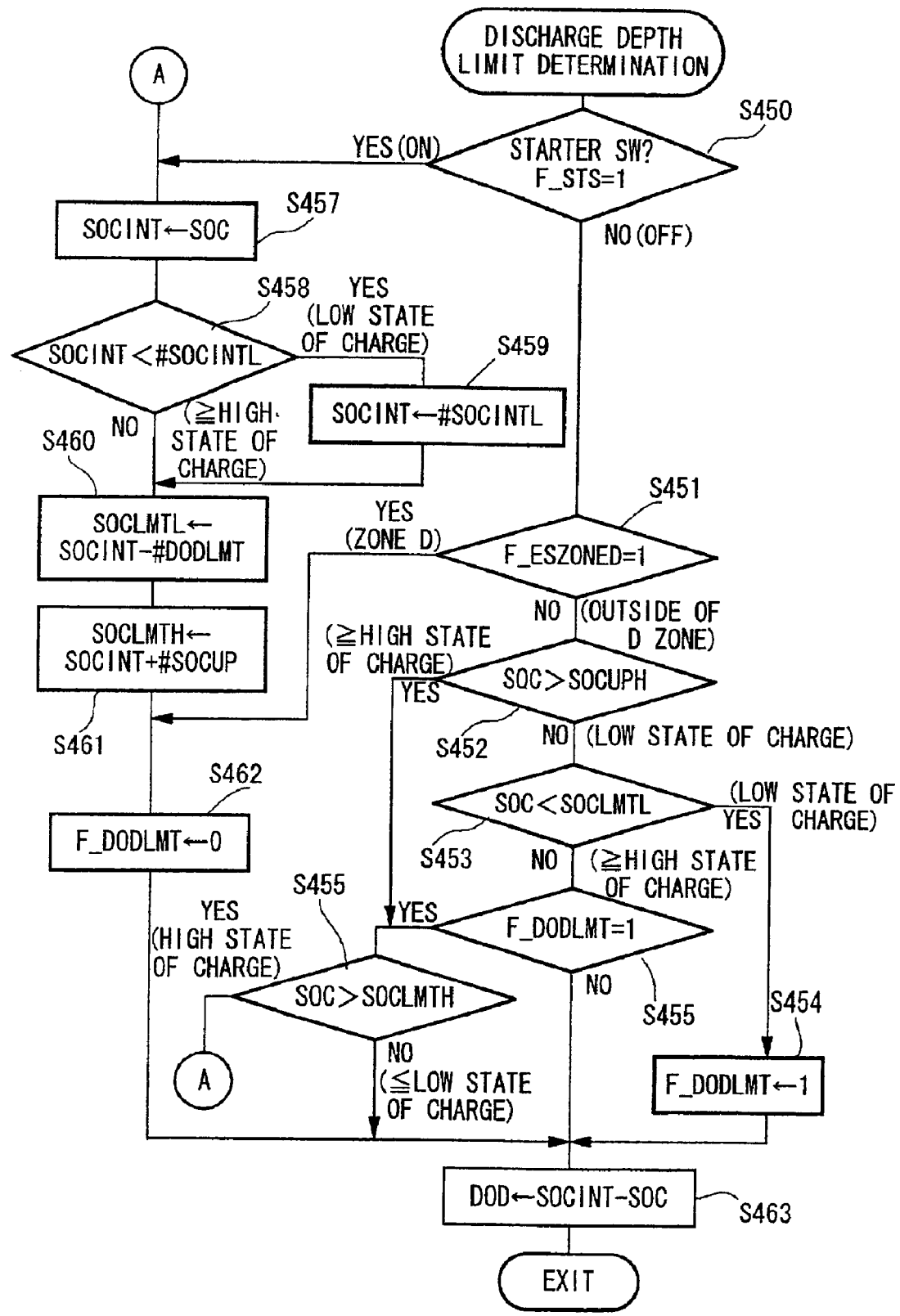
FIG. 34 is a flowchart for the discharge depth restiction determination.
Figure 35:
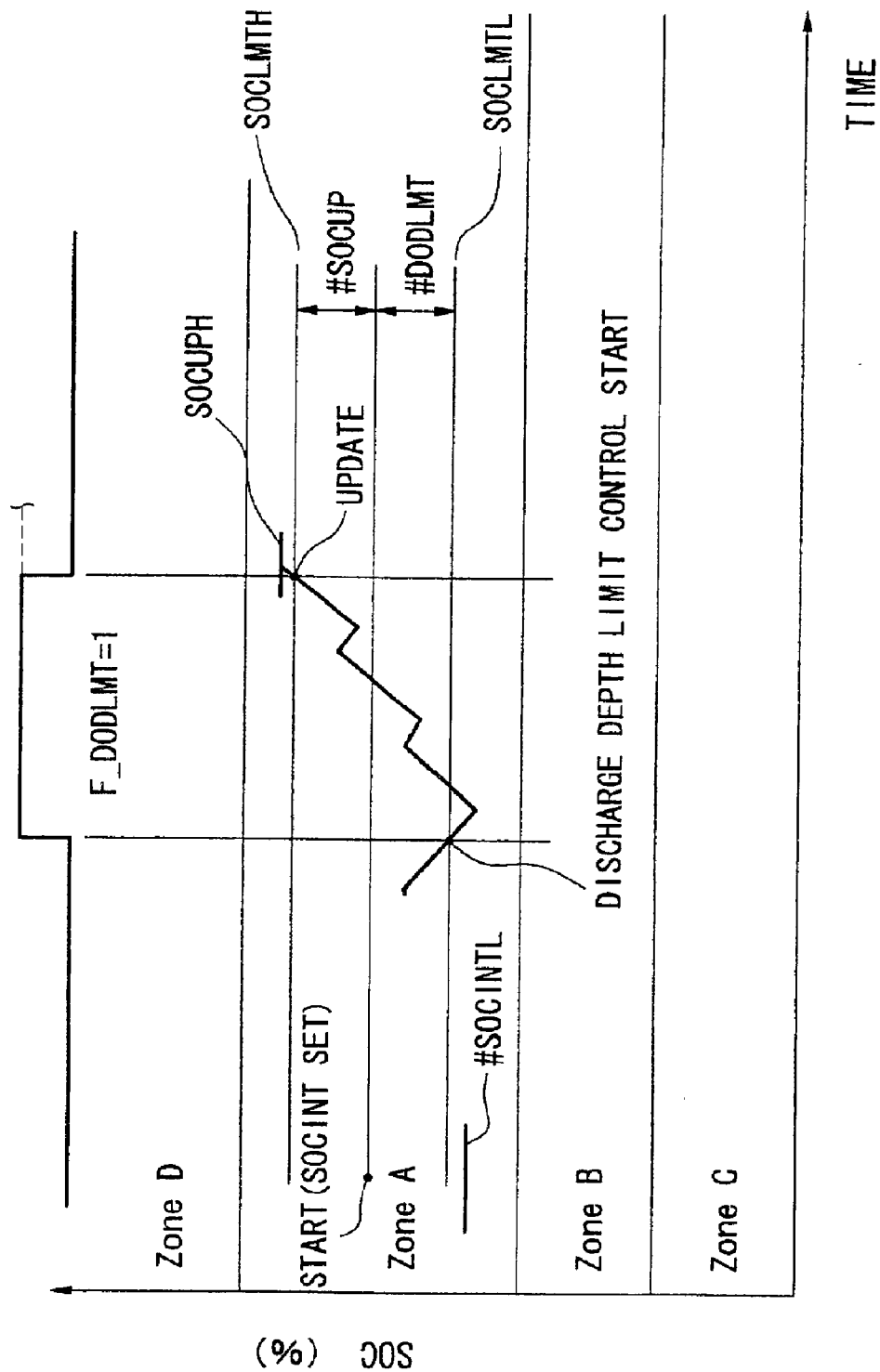
FIG. 35 is a graph showing SOC during the discharge depth limit control mode.

The fourth embodiment of the present invention will now described. Explanation for the same components in the present embodiment as those in the first embodiment will be omitted. FIG. 34 is a flowchart for determining the discharge depth used in the fourth embodiment.

First, in step S450, it is determined whether the value of the start switch determination flag F_STS is "1", that is, it is determined whether this is the start of the first travel. When the result is "1", indicating that this is the first travel, the initial value SOCINT of the state of charge SOC is read in step S457. Next, in step S458, it is determined whether the initial value SOCINT of the state of charge SOC is lower than the discharge depth limit initial lower limit value #SOCINTL. The value of the above discharge depth limit initial lower limit value #SOCINTL is, for example, 50%.

When the result in step S458 is "YES", that is, when the initial value SOCINT of the state of charge SOC<the discharge depth limit initial lower limit value #SOCINTL (the state of charge is low), the flow proceeds to step S460 after the discharge depth limit initial lower limit value #SOCINTL is set as the initial value of the state of charge SOC in step S459. That is, in the case of setting 50% as the discharge depth limit initial lower limit value #SOCINTL, when the state of charge is lower than 50%, 50% is assigned to the initial value of the state of charge.

In contrast, when the result in step S458 is "NO", that is, when it is determined that the initial value SOCINT of the state of charge SOC≧the discharge depth limit initial lower limit value #SOCINTL (the state of charge is high), the flow proceeds to step S460.

Figure 37:
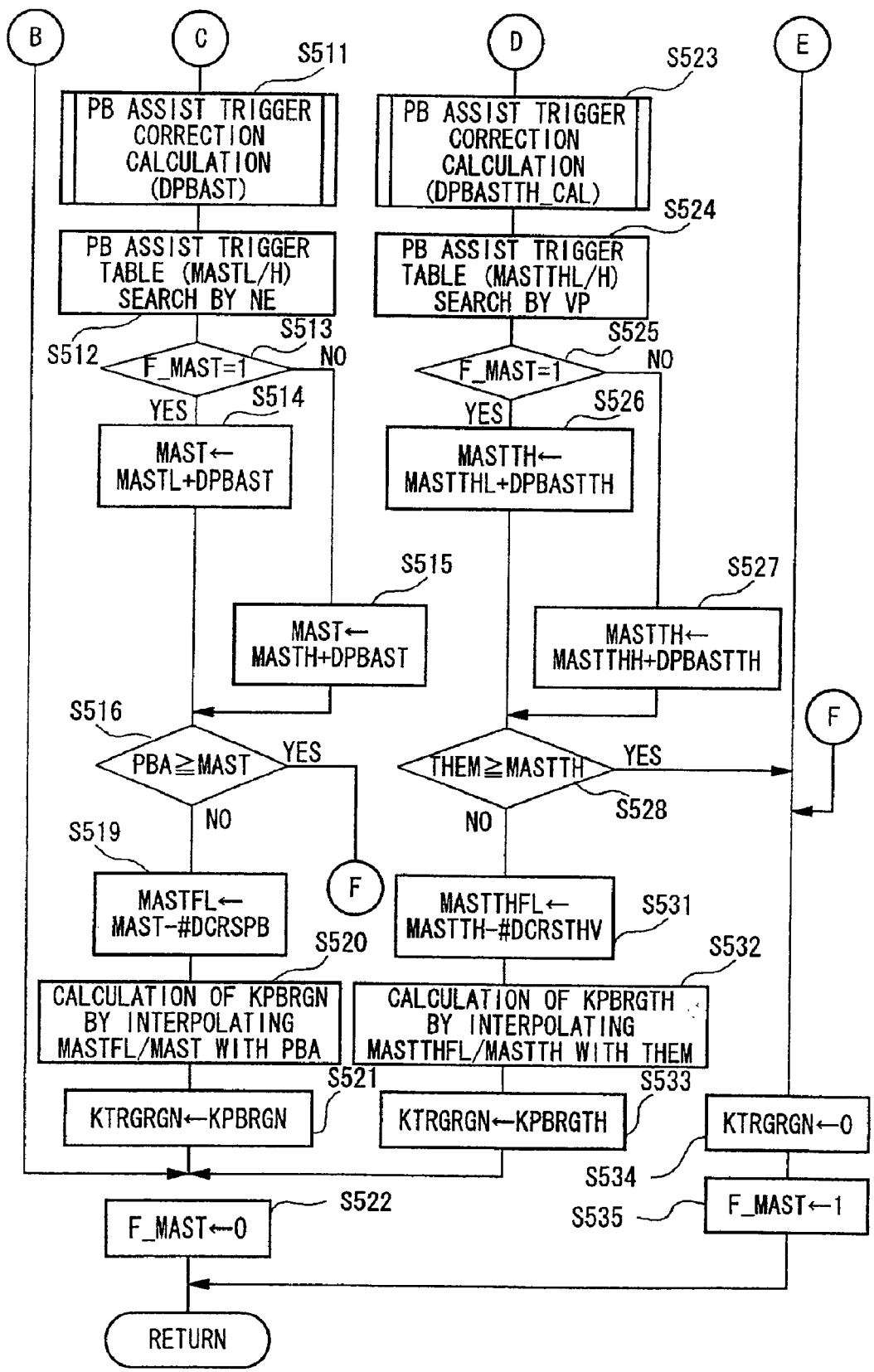
FIG. 37 is a flowchart of the assist trigger determination.

In step S460, the lower limit threshold value SOCLMTL is established based on the initial value of the state of charge of the battery, and the upper limit threshold value SOCLMTH is established in step S461 (shown in FIG. 37). The discharge depth limit value #DODLMT which determines the lower limit threshold value SOCLMT is around 10% of the state of charge of the battery, although it depends on the individual properties of the battery 3. The discharge depth limit value release SOC ascend value #SOCUP which determines the upper limit threshold value SOCLMTH is around 5% of the state of charge of the battery.

Accordingly, when it is assumed that the initial value SOCINT of the state of charge SOC is 55%, the lower limit threshold value SOCLMTL becomes 45% and the upper limit threshold value SOCLMTH becomes 60%. When it is assumed that the initial value of the state of charge SOC is 40%, for example, 50% is set as the initial state of charge SOCINT in step S459, the lower limit threshold value SOCLMTL becomes 40% and the upper limit threshold value SOCLMTH becomes 55%.

In this manner, when the initial value of the state of charge SOC is less than the discharge depth limit initial lower limit value #SOCINTL, it is possible to increase the initial value and to decrease the depth to the lower limit threshold value SOCLMTL by assigning the discharge depth limit initial lower limit value #SOCINTL as the initial value of the state of charge of the battery. Thus, when the initial value of the state of charge is low at the time of start, that is, the initial value of the state of charge is lower than the discharge depth limit initial lower limit value #SOCINTL, the state of charge can be restored rapidly by reducing the time until entering into the discharge depth limit control or by entering into the discharge depth limit control simultaneous with the starting time, depending on the state of charge of the battery.

In step S462, the setting of the previous discharge depth limit control mode is released by setting the previous DOD limit determination flag F_DODLMT to "0", and the flow proceeds to step S463. In step S463, the discharge depth, which indicates the present discharge amount from the initial state of charge SONINT, is obtained and the flow is completed. That is, the discharge depth DOD can be obtained irrespective of the flag value of the DOD limit determination flag F_DODLMT.

When started, and when the start switch determination flag F_STS is set to "0", it is determined in step S451 whether the energy storage zone D determination flag is "1". When the result is "NO", that is, state of charge is not in the D zone, the flow proceeds to step S452. When the result in step S451 is "YES", indicating that the state of charge is in the D zone, the flow proceeds to step S462. In the subsequent step S452, it is determined whether the preset state of charge is higher than the discharge depth limit execution upper limit value SOCUPH. When the result is "YES", that is, when the present state of charge>the discharge depth limit execution upper limit value SOCUPH (the state of charge is high), the flow proceeds to step S456. When the result in step 452 is "NO", indicating that the present state of charge≦the discharge depth limit execution upper limit value SOCUPH (the state of charge is high), the flow proceeds to step S453. The value of the discharge depth limit execution upper limit value SOCUPH is, for example, 70%.

In step S453, it is determined whether the state of charge of the battery SOC is lower than the lower limit threshold value SOCLMT. When the result is "YES", that is, when the state of charge SOC<the lower limit threshold value SOCLMTL (the state of charge is low), the flow proceeds to step S463 after establishing the discharge depth limit control mode by setting the DOD limit determination flag F_DODLMT to "1" in step 454. Thereby, the control operation described later is executed according to the DOD limit determination flag F_DODLMT.

When entering into the discharge depth limit control mode, the power generation is carried out so as to increase the state of charge of the battery. However, when it is determined in step S453 that the state of charge≧the lower limit threshold value SOCLMTL, that is, the state of charge exceeds the lower limit threshold value SOCLMTL (the state of charge is high), it is determined in Step S455 about the state of the DOD limit determination flag F_DODLMT.

When the result in step S455 is "YES", that is, when the operation is in the discharge depth limit control mode, it is determined in step 456 whether the state of charge of the battery>the upper limit threshold value SOCLMTH, that is, whether the state of charge of the battery exceeds the upper limit threshold value SOCLMTH. When it is determined in step S456 that the state of charge of the battery>the upper limit threshold value SOCLMTH, that is, the state of charge of the battery exceeds the upper limit threshold value SOCLMTH (the state of charge is high), the flow proceeds to step S457, wherein the initial value SONINT of the state of charge SOC is updated, and following to this, the upper limit threshold value SCOLMTH and the lower limit threshold value SOCLMTL are updated. The increase of the state of charge of the battery by this updating continues until the state of charge reaches the D zone. Accordingly, the state of charge of the battery can be restored rapidly, and overcharging of the battery can be prevented.

When it is determined in step S455 that the flag value of the DOD determination flag D_DODLMT is "0", that is, when it is determined that the discharge depth limit control mode is released, or when it is determined in step S456 that the state of charge SOC≦the upper limit threshold value SOCLMTH, that is, when it is determined that the state of charge SOC is lower than the upper limit threshold value SOCLMTH (the state of charge is low), the flow proceeds to step S463.

Hereinafter, the discharge depth limit control is explained in more detail.

The discharge depth limit control mode is a control for increasing the state of charge of the battery when the state of charge of the battery is decreasing and the state of charge decreases below the lower limit threshold value SOCLMTL. Thus, the state of charge of the battery is increased by increasing the frequency of the charging operation in the cruising mode and by decreasing the frequency of the acceleration while increasing the assist trigger threshold value for determining whether it is necessary to accelerate the vehicle.

Below, the assist trigger determination is explained.

Figure 36:
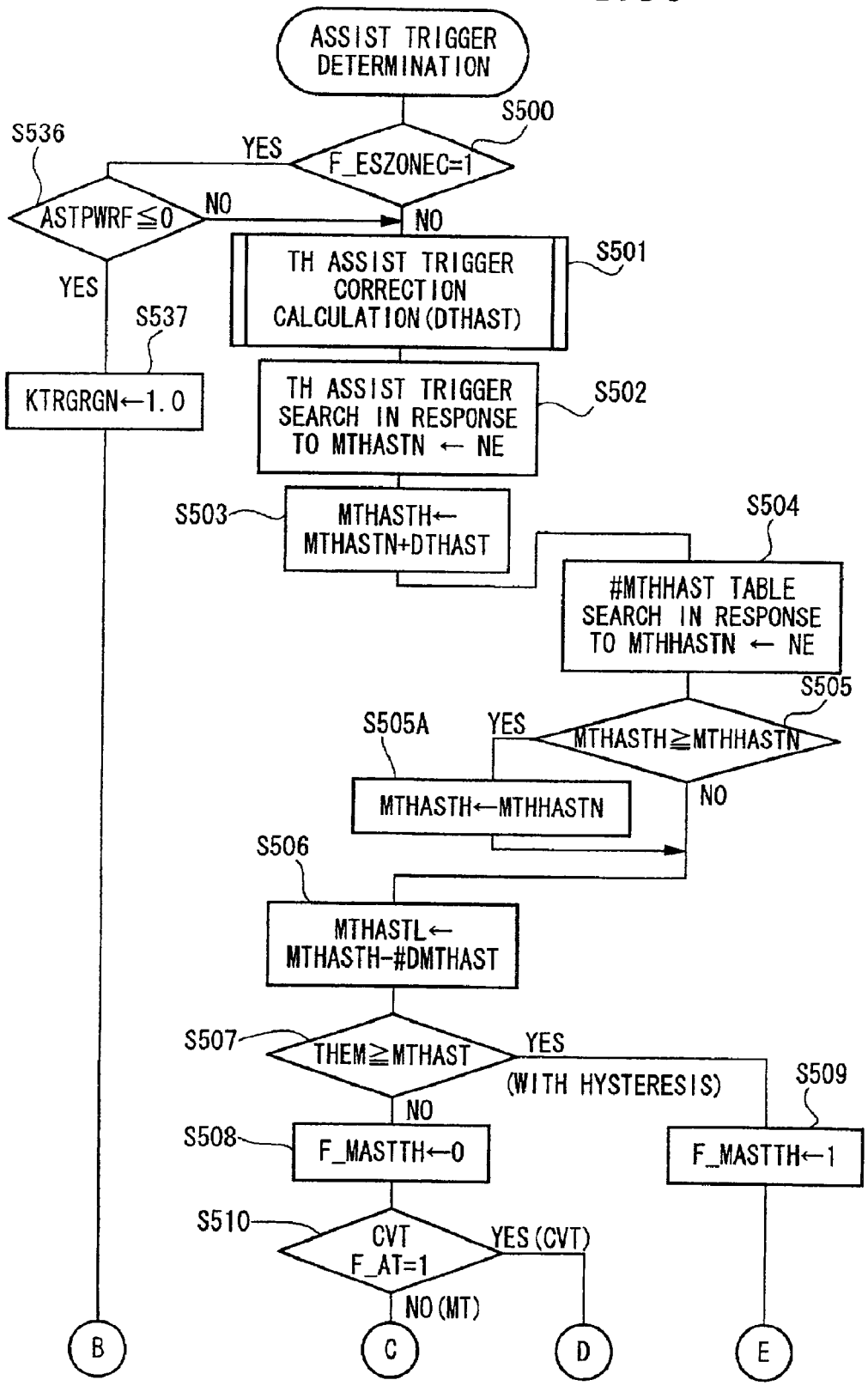
FIG. 36 is a flowchart of the assist trigger determination.

FIGS. 36 and 37 are flowcharts for executing the assist trigger determination, that is, the acceleration/cruise mode is determined according to the energy storage regions.

In step S500, it is determined whether the flag value of the energy storage C flag F_ESZONEC is "1". When the result is "YES", indicating that the state of charge is in the C zone, it is determined in step 536 whether the final assist command value ASTOWRF is less than 0. When the result in step 536 is "YES", indicating that the final assist command value ASTOWRF is less than 0, the flow is returned after setting the cruise generation amount subtraction coefficient KTRGRGN to 1.0 in step S537, and after setting the motor assist determination flag F_MAST to "0".

When the results in step S500 and in step S536 are "NO", then calculation processing of the throttle assist trigger correction value DTHAST is carried out. The details of the calculation processing are described later.

In step S502, a threshold value MTHASTN used as the standard for the throttle assist trigger is obtained by the table search in the throttle assist trigger table. The throttle assist trigger table defines, as shown by the solid line in FIG. 40, the threshold value of the throttle opening MTHASTN, which is a reference value for determining whether the motor assist is necessary for the engine rotation speed NE, and thus, threshold values corresponding to the engine rotation speed NE are set.

Figure 38:
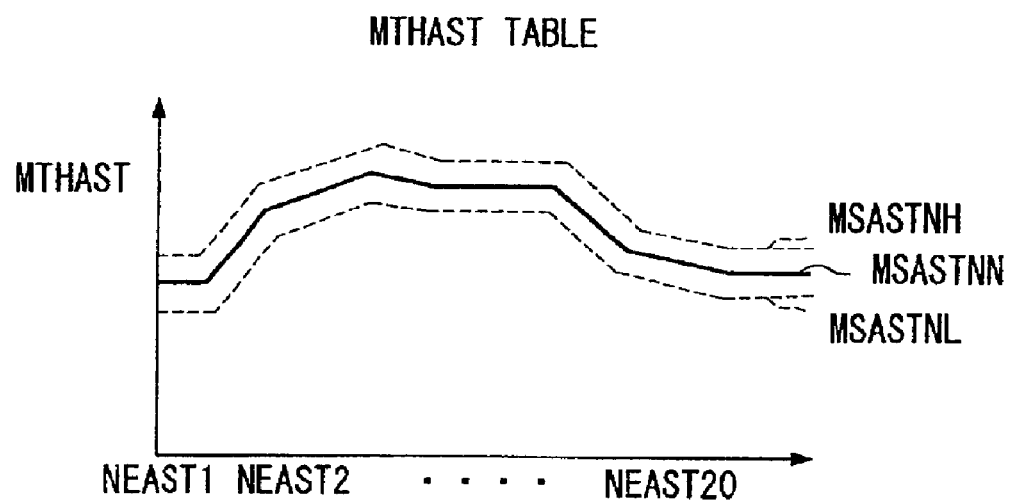
FIG. 38 is a graph showing threshold values of the TH assist mode and PB assist mode.

In the subsequent steps S503 and S506, a high throttle assist trigger threshold value MTHASTH is obtained by addition of the correction value DTHAST obtained in step S501 to a standard threshold value of the throttle assist trigger MTHASTN, and a low throttle assist trigger threshold value MTHASTL is also obtained by subtracting the difference #DMTHAST for establishing the hysteresis from the high throttle assist trigger threshold value MTHASTH. These high and low throttle assist trigger threshold values are illustrated in FIG. 38 by the dotted lines, superposing the throttle assist trigger standard threshold value MTHASTN shown by the solid line.

Figure 43:
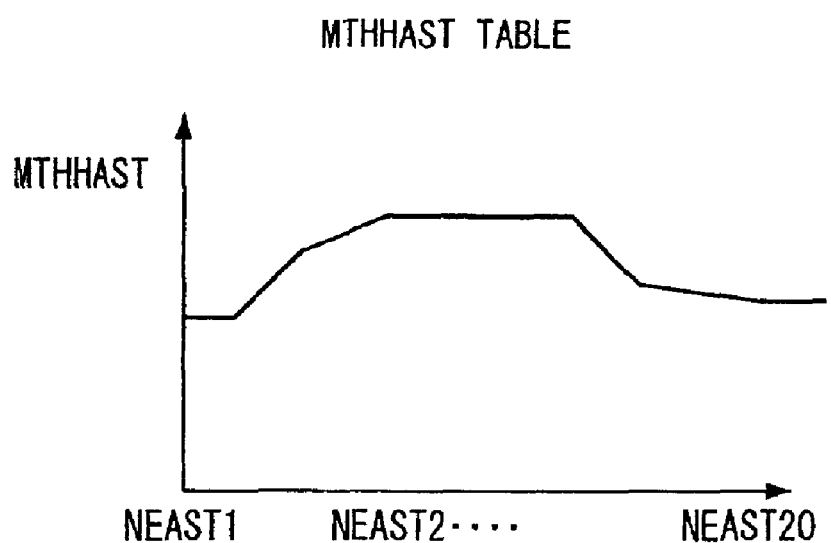
FIG. 43 is a graph showing the upper limit of the TH assist trigger.

In step S504 subsequent to step S503, the throttle assist trigger upper limit value MTHHASTN is obtained by the table search using the throttle assist trigger upper limit table shown in FIG. 43. In step S505, it is determined whether the high throttle assist trigger threshold value MTHASTH exceeds the throttle assist trigger upper limit value MTHHASTN. When the result indicates that the high throttle assist trigger threshold value MTHASTH exceeds the throttle assist trigger upper limit value MTHHASTN, the flow proceeds to step S505A, wherein the throttle assist trigger upper limit value MTHHASTN is set as the high throttle assist trigger threshold value MTHASTH and the flow proceeds to step S506. When the result in step S505 indicates that the high throttle assist trigger threshold value MTHASTH is lower than the throttle assist trigger upper limit value MTHHASTN, the flow proceeds to step S506.

Accordingly, in steps S504, S505, and S505A, the throttle assist trigger threshold value is set so as to not exceed the throttle assist trigger upper limit value MTHHASTN, despite the increase of the assist trigger threshold value in the throttle assist trigger correction calculation in step S501, which will be described later. Thus, it is possible to overcome the unnecessary difficulty in entering into the assist operation by setting the upper limit value for the high throttle assist trigger threshold value MTHASTH according to the engine rotation speed NE.

In step S507, it is determined whether the present throttle opening THEM is equal to or high than the throttle assist trigger threshold value MTHAST, obtained in steps S505 and S506. Since this throttle assist trigger threshold value MTHAST is a value having hysteresis, the high throttle assist trigger threshold MTHASTH is referred to when the throttle opening is going to open, and the low throttle assist trigger threshold MTHASTL is referred to when the throttle opening is going to close.

When the result in step S507 is "YES", that is, when the present throttle opening THEM is equal to or higher than the throttle assist trigger threshold value MTHAST (the threshold value having high and low hysteresis), the flow proceeds to step S509. When the result in step 507 is "NO", that is, the present throttle opening THEM is less than the throttle assist trigger threshold value MTHAST (the threshold value having high and low hysteresis), the flow proceeds to step S508.

In step 509, the throttle motor assist determination flag F_MASTTH is set to "1", and in step S508, the throttle motor assist determination flag F_MASTTH is set to "0".

The above-described processing is carried out in order to determine whether the throttle opening TH is a value which requires a motor assist. That is, when it is determined in step S507 that the present throttle opening exceeds the throttle assist trigger threshold value MTHAST, the throttle motor assist determination flag F_MASTTH is set to "1", which means that a motor assist is required in the "acceleration mode" by reading the above flag.

The fact that the throttle motor assist determination flag F_MASTTH is set to "0" indicates that the throttle opening is in the outside region of the motor assist. In this embodiment, the assist trigger is determined by determining both of the throttle opening TH and the air suction pipe pressure PB of the engine E, and the necessity of the assisting operation is determined when the present throttle opening THEM is equal to or higher than the above-described throttle assist trigger threshold value MTHAST. When the present throttle opening THEM does not exceed the above-described throttle assist trigger threshold value MTHAST, the assist determination is carried out by the air intake pipe pressure PB, which is described later.

In step S509, after setting the throttle motor assist determination flag F_MASTTH to "1", the flow proceeds to step 534 for leaving from the main flow, and the flow is returned after setting the cruise generation amount subtraction coefficient KTRGRGN to "0" in step 534 and after setting the motor assist determination flag F_MAST to "1" in step S535.

In contrast, in step S510, it is determined whether the flag value of the MT/CVT judgement flag is "1". When the result is "NO", that is, when it is determined that the vehicle is a MT (Manual Transmission) vehicle, the flow proceeds to step S511. When the result in step S510 is "YES", indicating that the vehicle is a CVT (Continuously Variable Transmission) vehicle, then the flow proceeds to step S523. In step S511, calculation processing of the air suction pipe negative pressure assist trigger correction value DPBAST is carried out. This calculation processing is explained later in detail.

Figure 39:
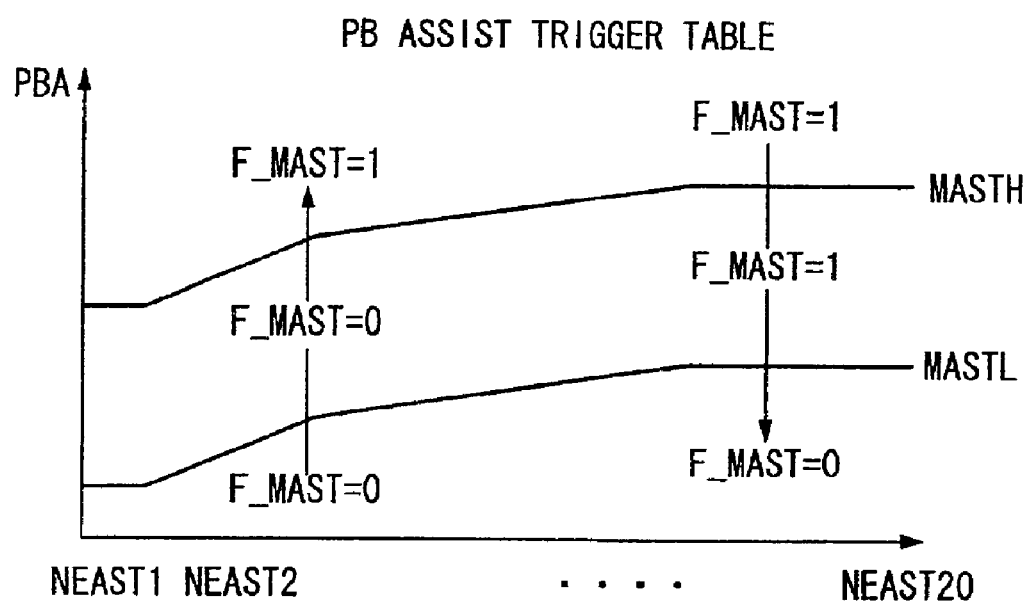
FIG. 39 is a graph of a threshold value of the MT vehicle during the PB assist mode.

Subsequently, in step S512, a threshold MASTL/H of the suction pipe negative pressure assist trigger is obtained by a table search from the suction pipe negative pressure assist trigger table. This suction pipe negative pressure assist trigger table defines, as shown by two solid lines in FIG. 39, a high suction pipe negative pressure assist trigger threshold value MASTH for determining whether or not it is necessary to execute a motor assist according to the engine speed NE, and a low suction pipe negative pressure assist trigger threshold value MASTL. In the retrieval processing in step S512, when the high threshold value MASTH line in FIG. 39 is crossed from the lower side to the upper side in response to the increase of the suction pipe negative charge PBA or in response to the decrease of the engine speed NE, the setting of the motor assist judgement flag F_MAST is changed from "0" to "1", and when crossing the low threshold value MASTL in FIG. 39 from the upper to the lower in response to the decrease of the suction pipe negative charge PBA or in response to the increase of the engine speed NE, the setting of the motor assist judgement flag F_MAST is changed from "1" to "0". Here, various figures are prepared for respective stoichiometric/lean burn conditions as FIG. 39 and an appropriate value corresponding to the present stoichiometric/lean burn condition is selected from those figures.

In the next step S513, it is determined whether the motor assist determination flag is "1", and when the result is "1" the flow proceeds to step S514, and when the result is not "1", the flow proceeds to step S515. In step S514, the suction pipe assist trigger threshold value MAST is obtained by addition of the corrected value DPBAST obtained in step S511 to the low threshold value MASTL of the suction pipe negative pressure assist trigger, which is obtained by the table search in step S512, and in step S516, it is determined whether the present value PBA of the suction pipe negative pressure is higher than the suction pipe assist trigger threshold value MAST. When the result is "YES", the flow proceeds to step S534. When the result is "NO", the flow proceeds to step S519. In step S515, the suction pipe assist trigger threshold value MAST is obtained by addition of the corrected value DPBAST obtained in step S511 to the high threshold value MASTH of the suction pipe negative pressure assist trigger, which is obtained by retrieval in step S512, and the flow then proceeds to step S516.

Figure 40:
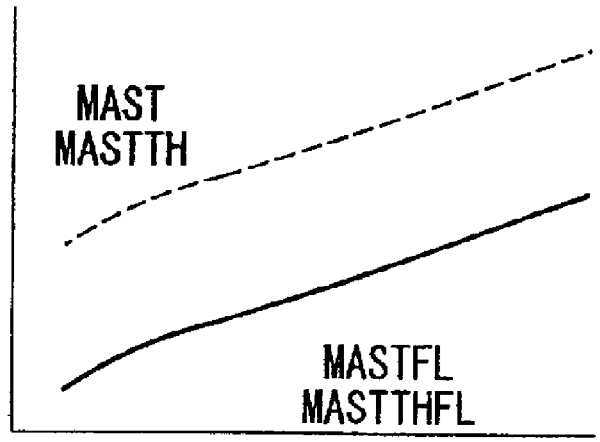
FIG. 40 is a graph for obtaining numerical values in step S519 and step S531.
Figure 41:
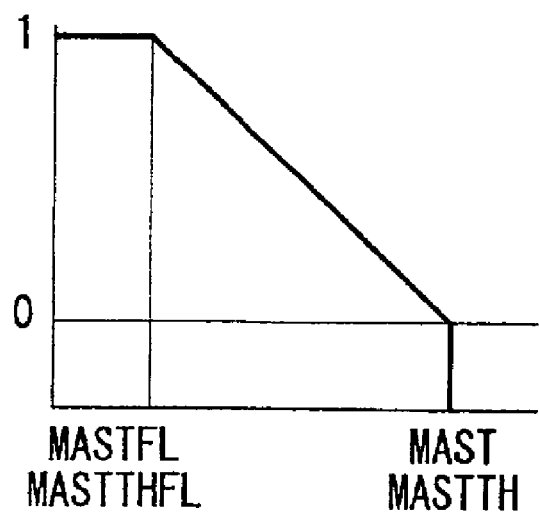
FIG. 41 is a graph for obtaining numerical values in step S520 and step S532.

In step S519, a final suction pipe negative pressure assist trigger lower limit threshold value MASTFL is obtained by subtracting a delta value #DCRSPB of the predetermined suction pipe negative pressure from the above-described suction pipe negative pressure assist trigger threshold value MAST, as shown in FIG. 40. Subsequently, in step S520, the cruise generation quantity subtraction factor table value KPBRGN is obtained by interpolating the final suction pipe negative pressure assist trigger lower limit threshold value MASTFL and the suction pipe negative pressure assist trigger threshold value MAST by the use of the present value PBA of the suction pipe negative pressure as shown in FIG. 41, and in step S521, the cruise generation quantity subtraction factor table value KPBRGN is set as the cruise generation quantity subtraction factor KTRGRGN. And, the routine returns after setting the motor assist judgement flag F_MAST to "0" in step S522.

In the above step S510, when the result of determining the flag value of the MT/CVT determination flag is "YES", that is, when it is determined that the vehicle is a CVD vehicle, the flow proceeds to step S523 to carry out processing for obtaining the suction pipe negative pressure assist trigger corrected value DPBASTTH. The detailed processing will be described later.

Figure 42:
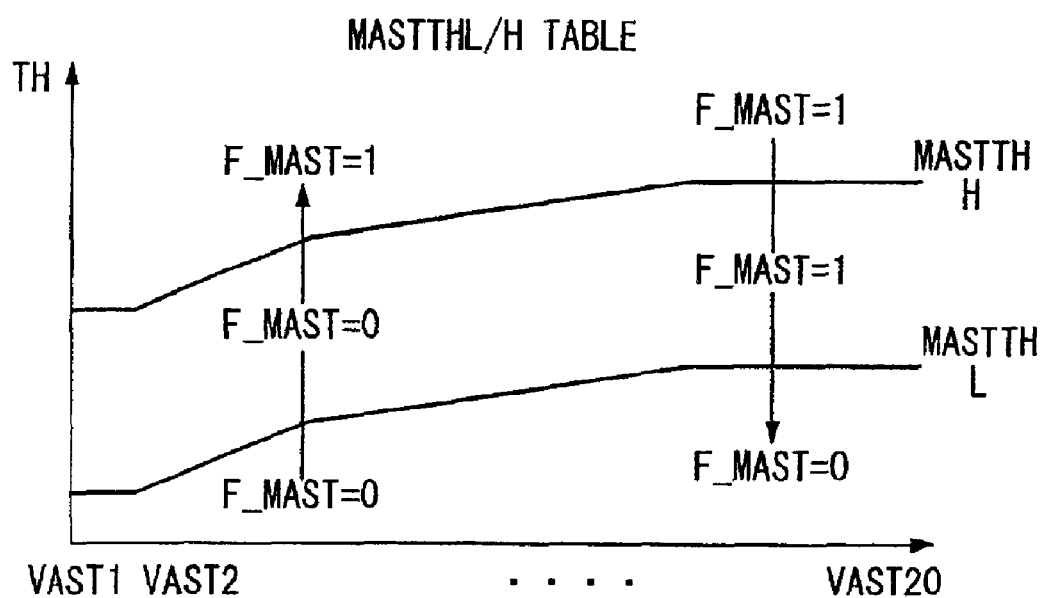
FIG. 42 is a graph showing the threshold value of the CVT vehicle in the PB assist mode.

Next, in step S524, a threshold value MATTHL/H of the suction pipe negative pressure assist trigger is obtained by a table search in a suction pipe negative pressure assist trigger table. This suction pipe negative pressure assist trigger table determines, as shown by two solid lines in FIG. 42, the high suction pipe negative pressure assist trigger threshold value MASTTHH and the low suction pipe negative pressure assist trigger threshold value MASTTHL for the engine controlling vehicle speed VP. In the search processing in step S127, when the high threshold value MASTTHH line is crossed from the lower side to the upper side in response to the increase of the degree of the throttle opening TH or in response to the decrease of the engine controlling vehicle speed VP, the motor assist judgement flag F_MAST is set from "0" to "1", and in contrast, when the low threshold value line MASTTHL is crossed from the upper side to the lower side in response to the decrease of the throttle openings TH or in response to the increase of the engine controlling vehicle speed VP, the setting of the motor assist judgement flag F_MAST is changed from "1" to "0". Here, a plurality of figures are prepared for various stoichiometric/lean burn conditions as FIG. 42, and the appropriate value is selected from those figures depending on the present stoichiometric/lean burn conditions.

In the next step S525, it is determined whether the motor assist determination flag F_MAST is "1", and when the result is "1", the flow proceeds to step S526, and when the result is not "1", the flow proceeds to step S527. In step S526, the suction pipe assist trigger threshold value MASTTH is calculated by addition of the corrected value DPBASTTH obtained in step S523 to the low threshold value MASTTHL of the suction pipe negative pressure trigger, which is retrievably obtained in S524. In step S528, it is determined whether the present value THEM of the throttle opening is higher than the suction pipe assist trigger threshold value MASTTH obtained in step S526. When the result is "YES", the flow proceeds to step S534, and when the result is "NO", the flow proceeds to step S531.

Subsequently, in step S531, the final suction pipe negative pressure assist trigger lowest threshold value MASTTHFL is obtained by subtracting the delta value #DCRSTHV of the predetermined throttle opening from the above-described suction pipe negative pressure assist trigger threshold value MASTTH, as shown in FIG. 40. In step S532, the cruise generation amount subtraction factor table value KPBRGTH is calculated by interpolating the final suction pipe negative pressure assist trigger lower limit threshold value MASTTHL and the suction pipe negative pressure assist trigger threshold value MASTTH by use of the present value THEM of the throttle opening, shown in FIG. 41, and the cruise generation amount subtraction factor table value KPBRGTH is assigned to the cruise generation quantity subtraction factor KTRGRGN in step S533, and the flow is returned after setting the motor assist determination flag F_MAST to "0".

Figure 44:
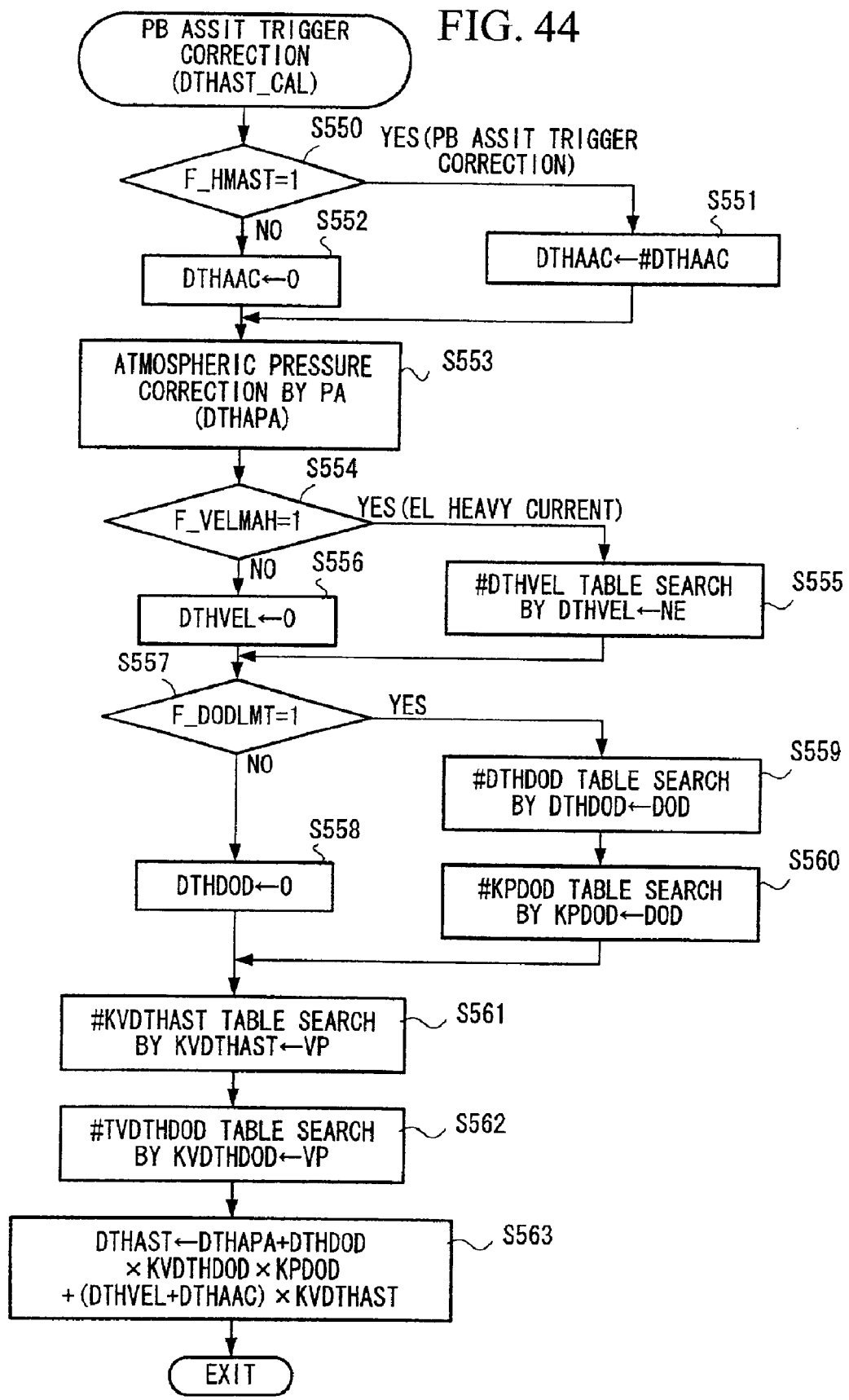
FIG. 44 is a flowchart for the TH assist trigger compensation.
Figure 45:
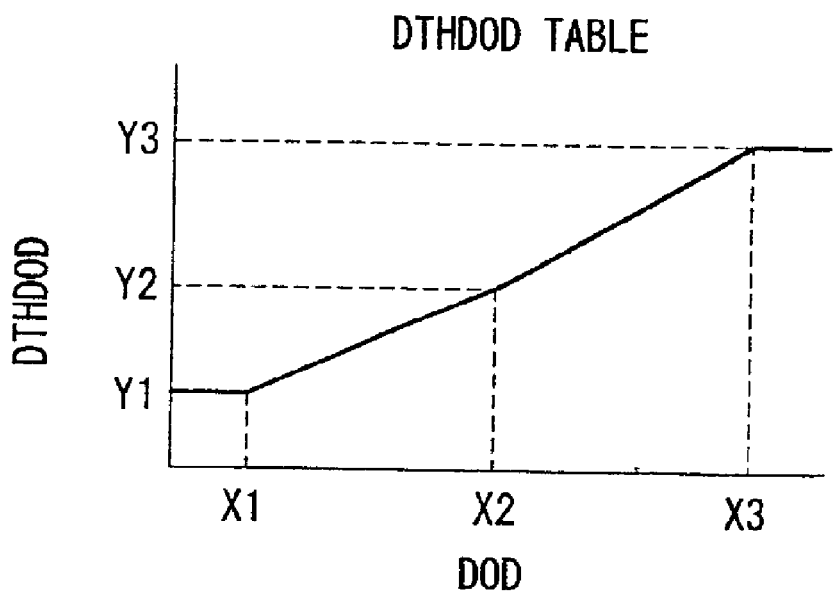
FIG. 45 is a graph showing a compensation table according to the DOD of the discharge depth limit control.
Figure 46:
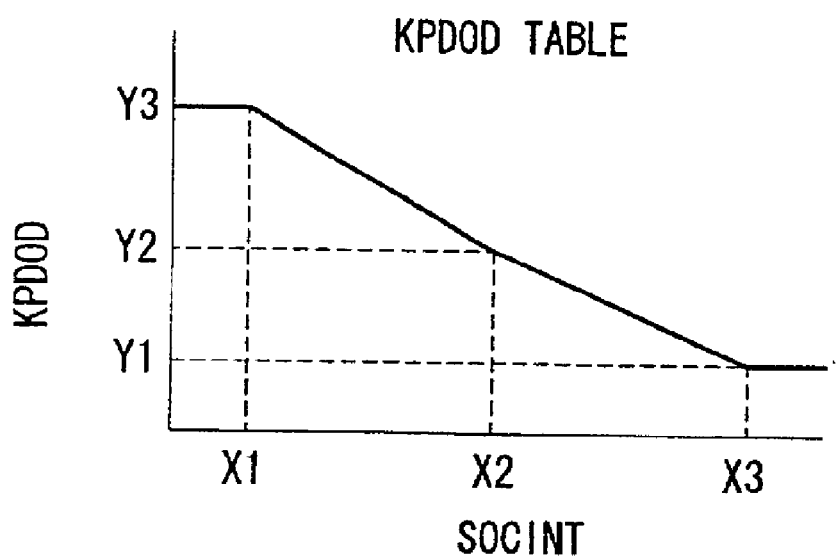
FIG. 46 is a graph showing compensation coefficient according to the state of charge of the battery device.

FIG. 44 shows a flow-chart of the throttle assist trigger correction in step S501.

In step S550, it is determined whether the air-conditioner ON flag F_HMAST is "1". When the result is "YES, that is, when the air-conditioner is ON, the flow proceeds to step 551 for assigning a predetermined value #DTHAAC (for example, 20 degrees) to the air-conditioner correction value DTHACC and the flow further proceeds to step S553.

When the result in step S550 is "NO", that is, when the air conditioner clutch is OFF, the flow proceeds to step S553 after setting the air-conditioner correction value DTHAAC to "0". The above processing raises the threshold value for the motor assist.

In step S553, a table search of the atmospheric pressure correction value (DTHAPA) in response to the atmospheric pressure is executed. In this correction, a correction value is obtained by a table search in the throttle assist trigger PA correction table, which contains corrected values which decrease as the vehicle's altitude decreases. The atmospheric correction value DTHAPA is obtained by this table search.

In step S554, it is determined whether the flag value of the heavy current flag F_VELMAH is "1". The setting of this heavy current flag will be described later. If the power consumption for the 12V type battery is high, it is possible to prevent the reduction of the state of charge of the battery by raising the assist trigger threshold value for decreasing the frequency of entering into the acceleration mode and for increasing the frequency of travelling in the cruise mode. When the result in step S550 indicates that a heavy current is flowing, a heavy current correction value DTHVEL, which decreases as the engine rotation speed NE increases, is obtained by table search in step S555, and the flow proceeds to step S557. When it is determined that a heavy current is not flowing, the flow proceeds to step S557 after setting the heavy current correction value DTHVEL to "0" in step S556.

Figure 14:
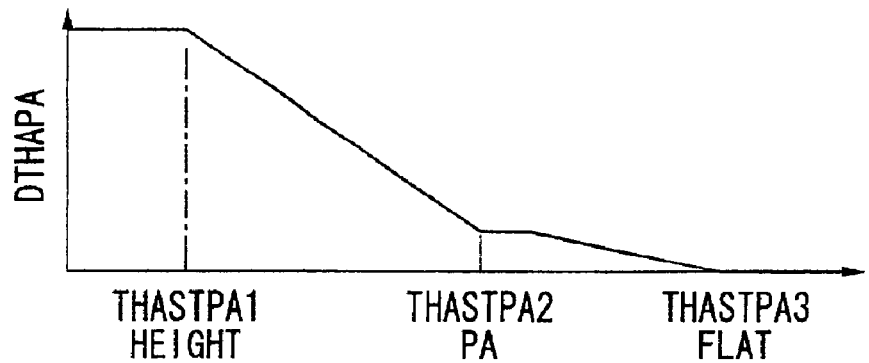
FIG. 14 is a graph for a table for atmospheric pressure correction.
Figure 15:
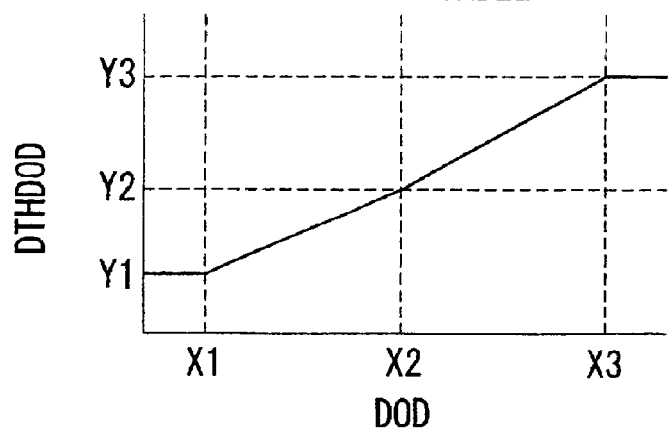
FIG. 15 is a graph showing a correction table for the discharge depth limit control.

In step S557, it is determined whether the limit processing for the battery discharge depth DOD is executed by determining whether the DOD limit determination flag is "1". When it is determined that the mode is the discharge depth limit control mode, the DOD limit control mode correction value #DTHADOD, obtained by a table search in step S559 based on FIG. 14, is assigned to the DOD limit control mode correction value DTHADOD, and the flow proceeds to step S561.

In contrast, when it is determined in step 557 that the discharge depth limit control mode is released, the flow proceeds to the subsequent step S556, wherein the DOD limit control correction value DTHDOD is set to "0".

In this case, an increased value is set as the predetermined value #DTHADOD in order to raise the determination value for the motor assist so as to reduce the frequency of the motor assist when the control operation is in the discharge depth limit control mode. Thus, since the frequency of entering the assist operation can be reduced when the control operation is in the discharge depth limit control mode, the battery residual capacity can be restored rapidly.

Figure 47:
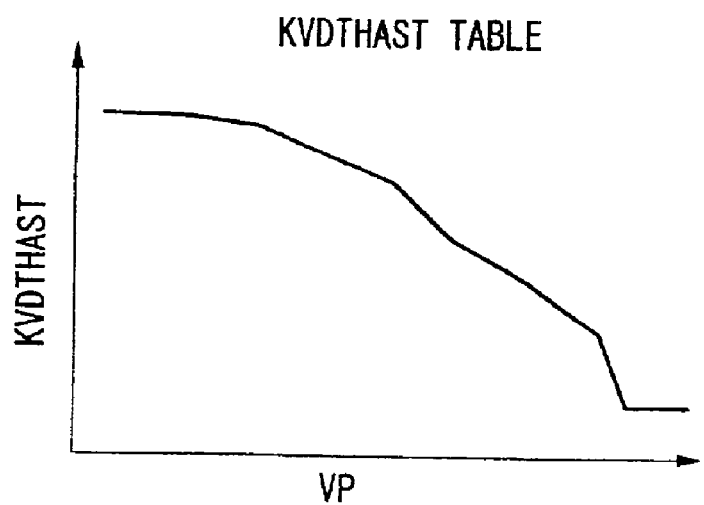
FIG. 47 is a graph showing the compensation coefficients according to the controlling vehicle speed.
Figure 48:
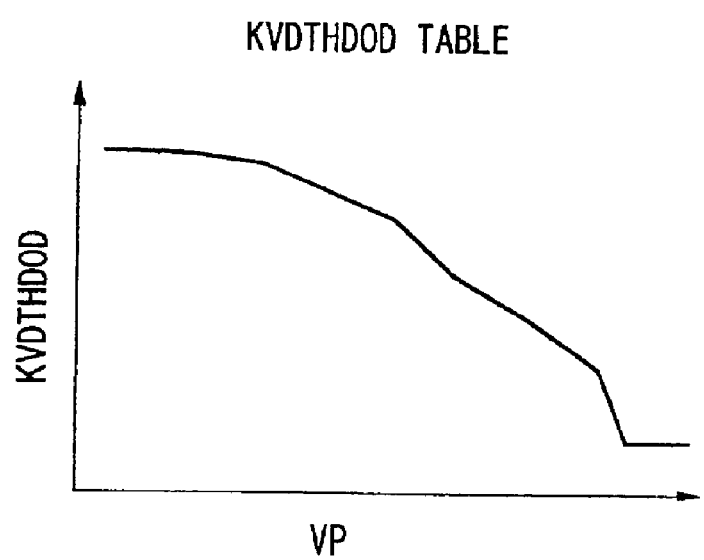
FIG. 48 is a graph showing the compensation coefficients according to the controlling vehicle speed.

Subsequently, in step S561, a throttle assist trigger load correction value vehicle speed correction coefficient KVDTHAST is obtained by a table search of the table shown in FIG. 47. The larger the engine controlling vehicle speed VP, the smaller the throttle assist trigger load correction value vehicle speed correction coefficient KVDTHAST. Accordingly, the increased value increases further as the engine controlling vehicle speed VP becomes low.

In the subsequent step S563, the throttle assist trigger correction value is obtained by use of the air-conditioner correction value DTHAAC obtained in step S551 or in step S552, the atmospheric pressure correction value DTHAPA obtained in step S553, the heavy current correction value DTHVEL obtained in step S555 or in step S556, the DOD limit control mode correction value DTHDOD obtained in step 558 or in steep S559, the DOD limit control mode state of charge correction value KPDOD obtained in step S560, the throttle assist trigger load correction amount vehicle speed correction coefficient KVDTHAST obtained in step S561, the throttle assist trigger DOD correction amount vehicle speed correction coefficient KVDTHDOD obtained in step S562, and the flow is completed.

When being in the DOD limit control mode, the assist trigger correction value is raised according to the DOD limit control mode correction value DTHDOD obtained in step S559 or the throttle assist trigger DOD correction amount vehicle speed correction coefficient KVDTHDOD. However, when the state of charge of the battery is sufficient, since the raised value of the assist trigger threshold value can be reduced following the DOD limit control mode state of charge correction value KPDOD which is determined by the initial value SOCINT of the state of charge SOC, the reduction in frequency of entering into the acceleration mode can be discontinued when the state of charge is sufficient. In other words, when the state of charge is sufficient, that is, when the state of charge is higher than the initial value SOCINT, since the assist trigger threshold value can be raised by only a smaller amount than the case of the deficient state of charge, it is possible to enter into the acceleration mode more frequently, which results in improving the drivability.

Figure 49:
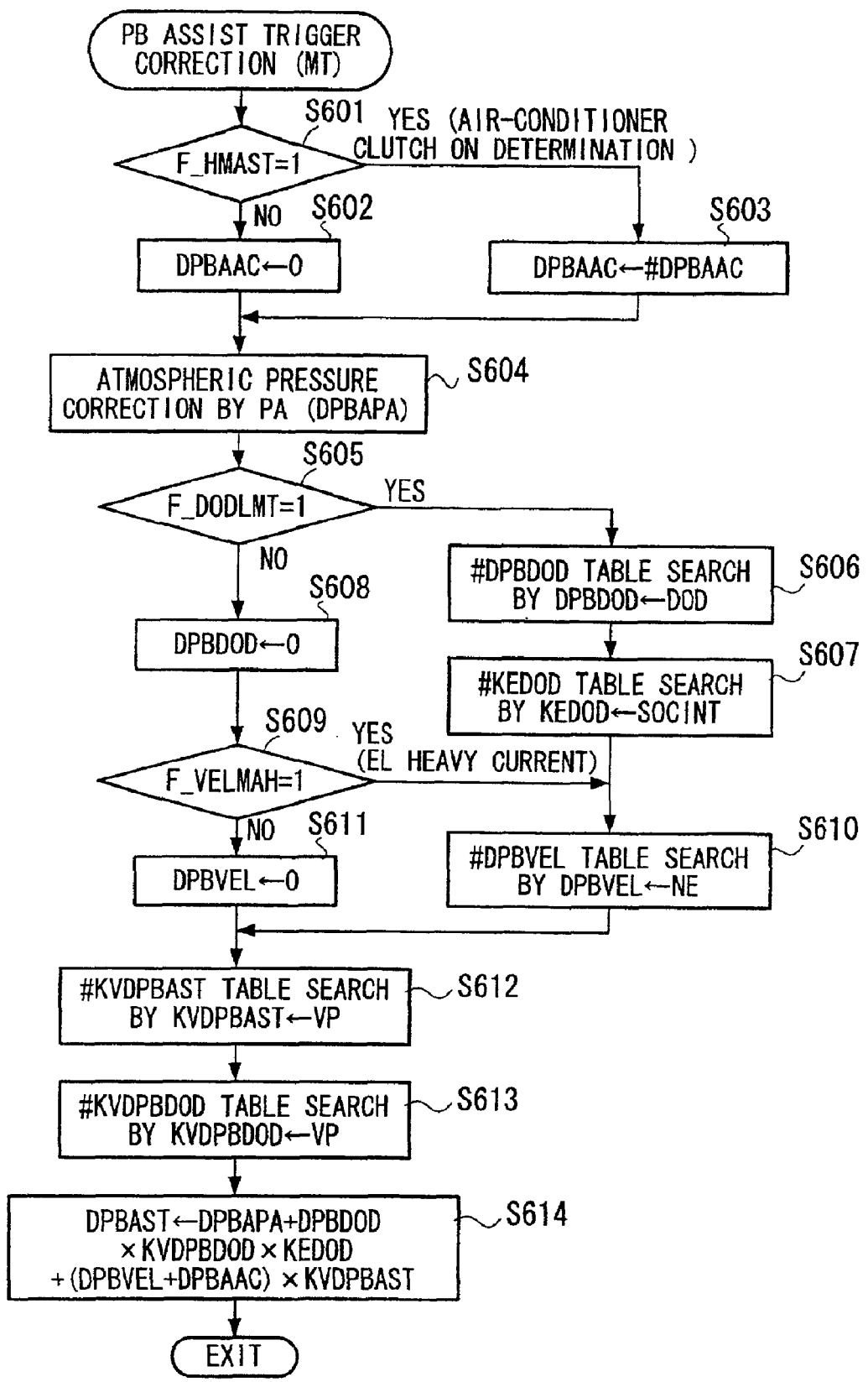
FIG. 49 is a flowchart for carrying out the PB assist trigger compensation (MT vehicle).
Figure 50:
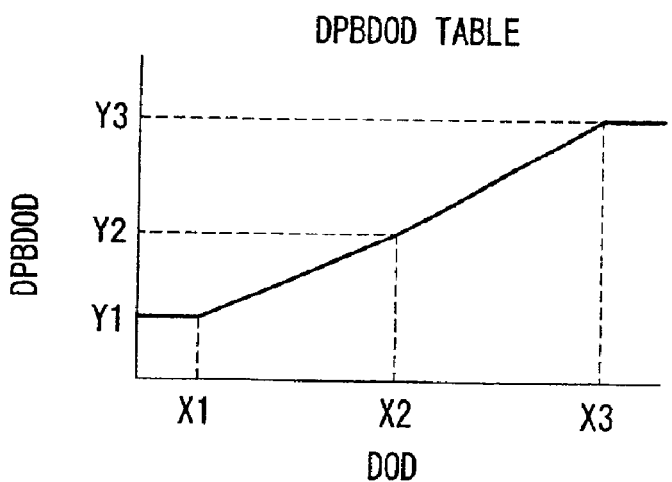
FIG. 50 is a graph showing the compensation table of the discharge depth limit control.

FIG. 49 shows a flow-chart of the suction pipe negative pressure throttle assist trigger correction.

In step S601, it is determined whether the air-conditioner ON flag F_HMAST is "1". When the result is "YES, that is, when the air-conditioner is ON, the flow proceeds to step S604 after assigning a predetermined value #DPBAAC to the air-conditioning correction value DPBAAC in step S603. If the result in step S601 is "NO", that is, the air-conditioner is OFF, the routine goes to step S604 after setting the air-conditioner correction value DPBAAC to "0". In such a manner, the threshold value for the motor assist is raised.

In step S604, the atmospheric pressure correction value (DPBAPA) is obtained by a table search according to the atmospheric pressure. This correction value is looked up in the table in which correction values are established so as to decrease as the location moves from the heights to the flat. The atmospheric pressure correction value DPBAPA is thus obtained by such a table search.

Figure 51:
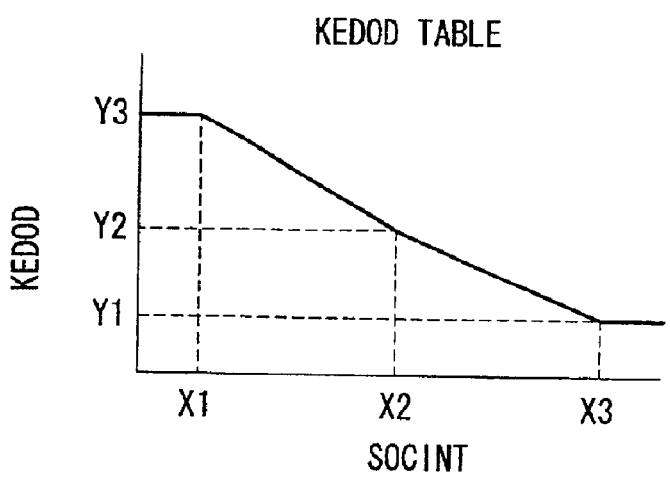
FIG. 51 is a graph showing the compensation table for the discharge depth limit control.
Figure 52:
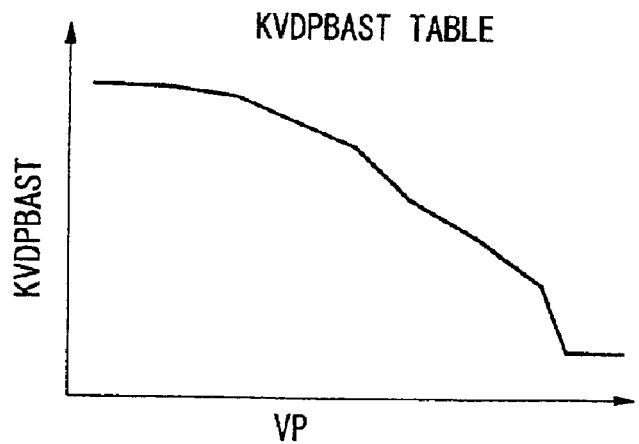
FIG. 52 is a graph showing the compensation coefficients according to the vehicle speed.
Figure 53:
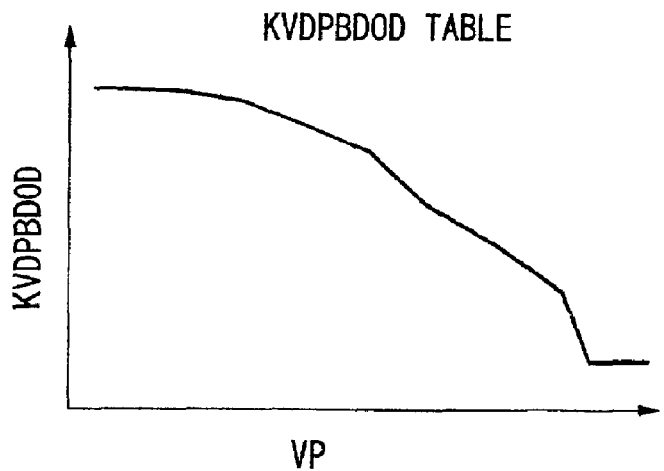
FIG. 53 is as graph showing the compensation coefficients according the vehicle speed.

Next, in step S605, it is determined whether the limit processing for the battery discharge depth DOD is executed by determining whether the DOD limit judgement flag F_DODLMT is "1". When control operation is in the discharge depth limit control mode, the DOD limit control mode correction value #DPBDOD is looked up in a table shown in Table 50, and the flow proceeds to step 607 after the correction value #DPBDODTH is assigned to the DOD limit control mode correction value DPBDODTH in step S606. In step S607, the DOD limit mode state of charge correction value #KEDOD according to the initial value SOCINT is obtained from the table shown in FIG. 51, and the flow proceeds to step S610 after assigning the DOD limit mode state of charge correction value #KEDOD to the DOD limit mode state of charge correction value KEDOD.

In contrast, when the discharge depth limit control mode is released, the flow proceeds to step S609 after setting the DOD limit control mode correction value DPBDODTH to "0" in step S608.

In this case, an increased value is set for the predetermined value #DPBDODTH in order to raise the judgement value for the motor assist operation and in order to make a correction so as to reduce the frequency of the motor assist operation when the control operation is in the discharge depth limit control mode. Thus, since it is possible to reduce the frequency of the motor assist operation when the control operation is in the discharge depth limit control mode, the battery residual value can be restored rapidly.

In the subsequent step S609, it is determined whether the heavy currect flag F_VELMAH is "1". The details of setting the heavy current flag are described later. As explained in step S554, this processing is executed since it is necessary to raise the assist trigger threshold value in the case of a large current consumption. When it is determined that a heavy current is flowing, the flow proceeds to step S612 after obtaining the heavy current correction value DPBVEL at an engine rotation speed NE by lookup in a table in step S610.

Next, in step S612, the suction pipe negative pressure assist trigger load correction amount vehicle correction coefficient KVDPBAST according to the controlling vehicle speed VP is obtained by searching a table. For the same reason as that described in step S561, the suction pipe negative pressure assist trigger load correction amount vehicle correction coefficient KVDPBAST according to the controlling vehicle speed VP increases as the controlling vehicle speed VP decreases.

Subsequently, in step S613, the throttle assist trigger DOD correction amount vehicle speed correction coefficient KVDPBDOD according to the controlling vehicle speed VP is obtained by looking up a table.

In the next step S614, the suction pipe negative pressure assist trigger load correction amount vehicle speed correction coefficient KVDPBDOD is obtained by use of the air-conditioner correction value DPBAAC obtained in step S602 or in step S603, the atmospheric pressure correction value DPBAPA obtained in step S604, the DOD limit control mode correction value DPBDOD obtained in step S606 or in step S608, the DOD limit control mode state of charge correction value KEDOD obtained in step S607, the heavy current correction value DPBVEL obtained in step S610 or in step S611, the suction pipe negative pressure assist trigger load correction amount vehicle speed correction coefficient KVDPBAST obtained in step S612, and the throttle assist trigger DOD correction amount vehicle speed correction coefficient KVDPBDOD, and the flow is completed.

Therefore, when the control operation is in the DOD limit control mode, although the assist trigger threshold value is raised by using the DOD limit control mode correction value DPBDOD obtained in step 606 and the throttle assist trigger DOD correction amount vehicle speed correction coefficient KVDPBDOD obtained in step S608, since the amount of increase of the assist trigger threshold value can be reduced according to the DOD limit control mode state of charge correction value KEDOD, when the state of charge of the battery is sufficient, the problem of not frequently entering into the acceleration mode can be overcome. In other words, when the state of charge is sufficient, that is, when the state of charge is higher than the initial value SOCINT, since the assist trigger threshold value can be raised by only a smaller amount than the case of a deficient state of charge, it is possible to enter into the acceleration mode more frequently, which results in improving the drivability.

Figure 54:
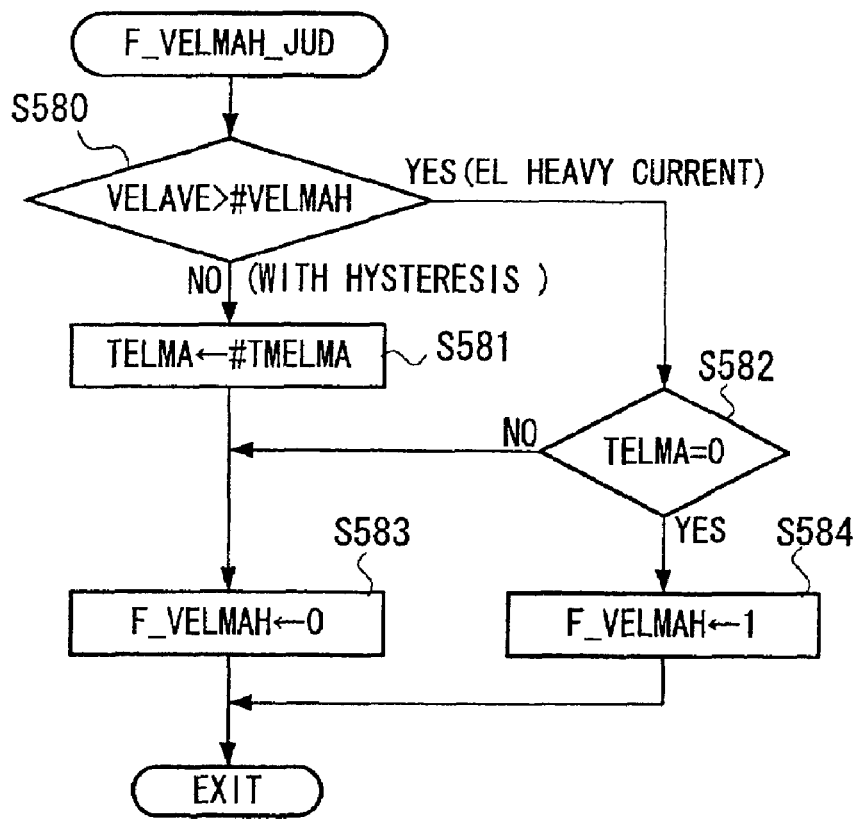
FIG. 54 is a flowchart for setting a large current determination flag.
Figure 55:
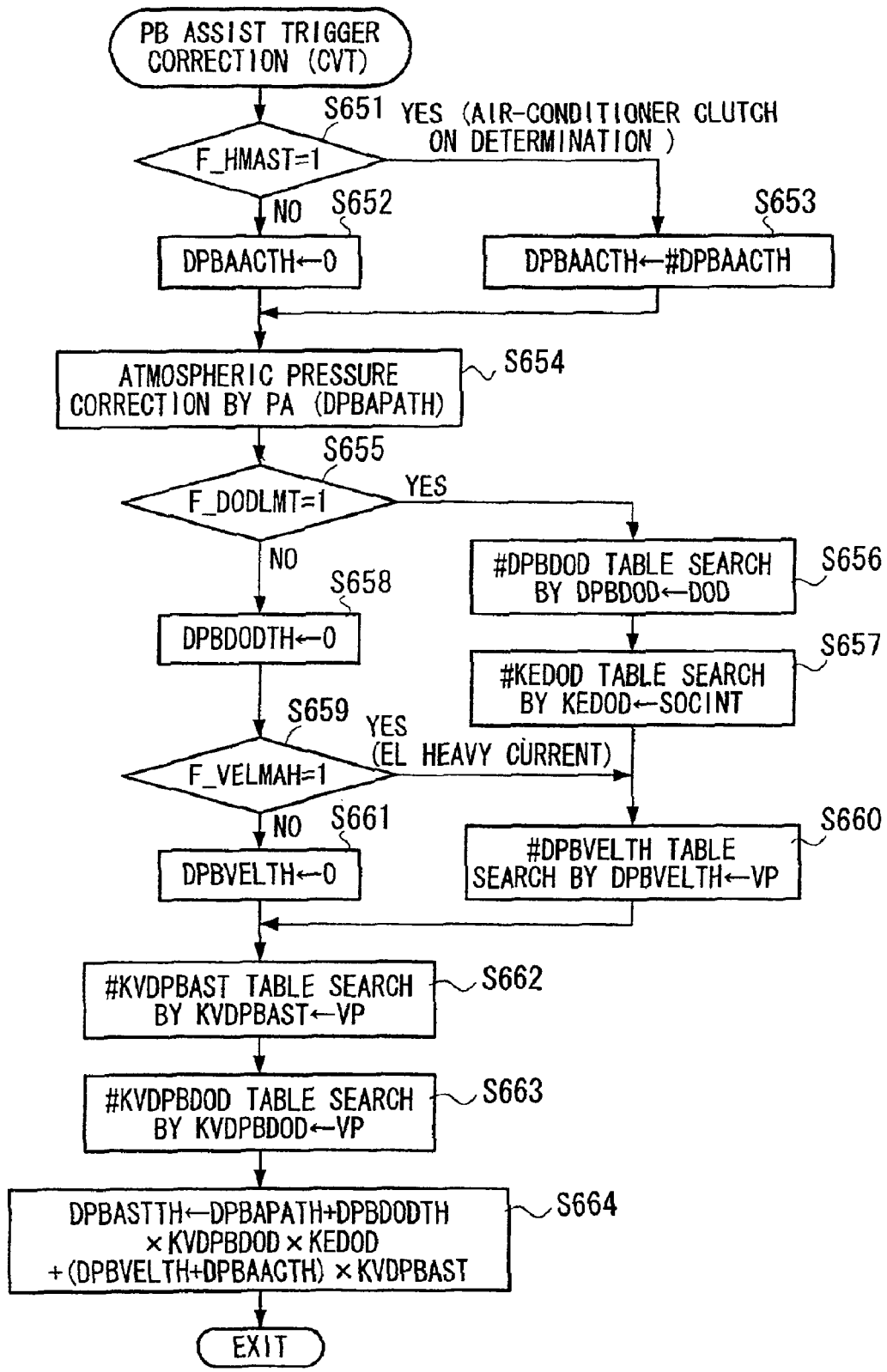
FIG. 55 is a flowchart for PF assist trigger (CVT vehicle).
Figure 56:
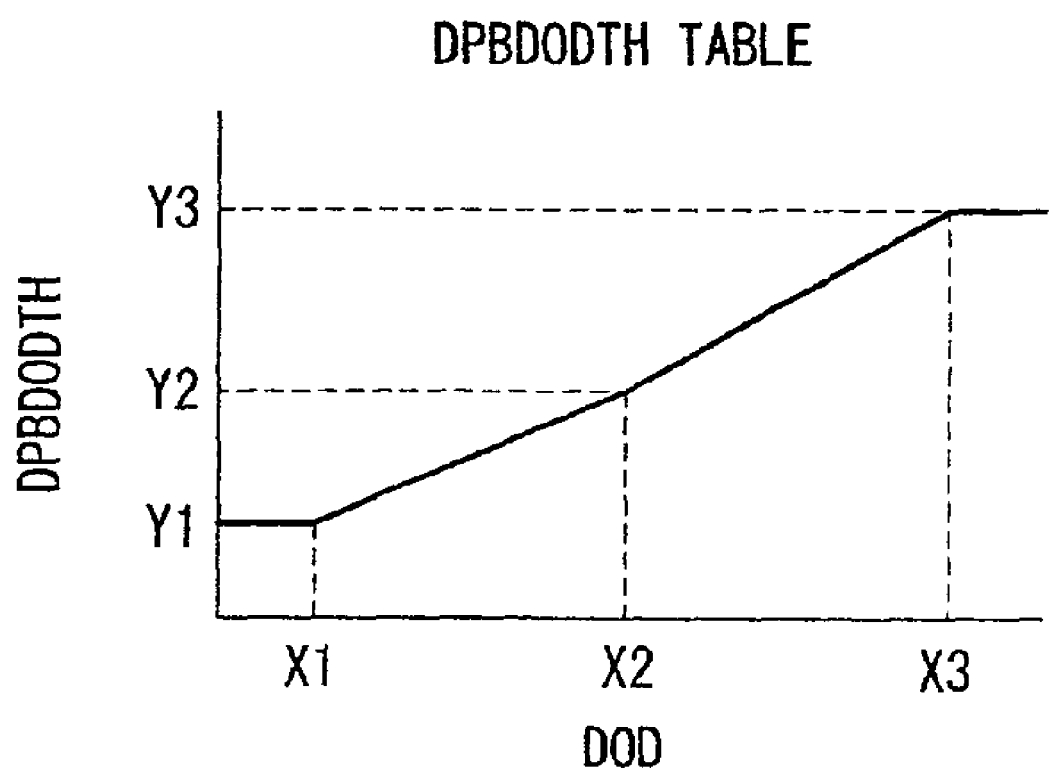
FIG. 56 is a graph showing the compensation table for the discharge depth limit control.

The flowchart for setting the heavy current flag is described below with reference to FIG. 54. In step 580, it is determined whether the current value is higher than the predetermined value #VELMAH (for example, 20A). When the result is "YES", that is, a large current is flowing in the 12V lines, it is determined in step S582 whether a delay timer TELMA is "0", and the flow is returned after setting the heavy current flag F_VELMAH to "1" in step S584.

When the result in step S582 determines that the delay timer TELMA is not "0", indicating that a heavy current is not flowing, the flow proceeds to step S583 after setting a predetermined value #TMELMA to the delay timer TELMA. The flow is completed after setting the heavy current flag F_VELMAH to "0" in step S583. The heavy current flag described here is determined in steps S554, S609, and S659.

Since the heavy current state is limited within a certain period of time by a delay timer TELMA, a particular heavy current state during the raising and lowering of the power window; or while turning on the interior lights are excluded from the control operation using the delay timer TELMA.

In the next step S664, the suction pipe negative pressure assist trigger correction value DPBASTTH is obtained by use of the air-conditioner correction value DPBAACTH obtained in step S652 or in step S653, the atmospheric pressure correction value DPBAPATH obtained in step S654, the DOD limit control mode correction value DPBDODTH obtained in step S656 or in step S658, the DOD limit control mode state of charge correction value KEDOD obtained in step S657, the heavy current correction value DPBVELTH obtained in step S660 or in step S661, the suction pipe negative pressure assist trigger load correction amount vehicle speed correction coefficient KVDPBAST obtained in step S662, and the throttle assist trigger DOD correction amount vehicle speed correction coefficient KVDPBDOD, and the flow is completed.

Next, in step S655, it is determined whether limit processing for the battery discharge depth DOD is in effect by determining whether the DOD limit determining flag F_DODLMT is "1". When it is in the discharge depth limit control mode, the DOD limit control mode correction value #DPBDODTH is obtained from the table shown in Table 56, and the flow proceeds to step S657 after assigning the correction value #DPBDODTH to the DOD limit control mode correction value DPBDODTH in step S656. The flow proceeds to step S660 after obtaining the DOD limit mode state of charge correction value #KEDOD depeding on the initial value SOCINT of the state of charge SOC.

In contrast, when it is determined in step S655 that the discharge depth limit control mode is released, the flow proceeds to step S659 after setting "0" to the DOD limit control mode correction value DPBDODTH in step S658.

In this case, an increased value is set for the predetermined value #DPBDODTH in order to raise the judgement value for the motor assist operation and in order to make a correction so as to reduce the frequency of the motor assist operation when the control operation is in the discharge depth limit control mode. Thus, since it is possible to to reduce the frequency of the motor assist operation when the control operation is in the discharge depth limit control mode, the battery residual value can be restored rapidly.

In the subsequent step S659, it is determined whether the heavy current flag F_VELMAH is "1". The details of setting the heavy current flag are described later. As explained in step S554, this processing is executed since it is necessary to raise the assist trigger threshold value if a heavy current is flowing in the 12V battery lines. When it is determined in step S659 that a heavy current is flowing, the flow proceeds to step S662 after obtaining the heavy current correction value DPBVELTH according to the engine rotation speed NE by looking up in a table in step S660. When it is determined that no large current is flowing, the flow proceeds to step S662 after setting the heavy current correction value DPBVELTH to "0".

Next, in step S612, the suction pipe negative pressure assist trigger load correction amount vehicle correction coefficient KVDPBAST according to the controlling vehicle speed VP is obtained by retrieving a table. For the same reason as described in step S561, the suction pipe negative pressure assist trigger load correction amount vehicle correction coefficient KVDPBAST according to the controlling vehicle speed VP increases as the controlling vehicle speed VP decreases.

Subsequently, in step S613, the throttle assist trigger DOD correction amount vehicle speed correction coefficient KVDPBDOD according to the controlling vehicle speed VP is obtained by looking up in a table.

In the next step S614, the suction pipe negative pressure assist trigger load correction amount vehicle speed correction coefficient KVDPBDOD is obtained by use of the air-conditioner correction value DPBAAC obtained in step S602 or in step S603, the atmospheric pressure correction value DPBAPA obtained in step S604, the DOD limit control mode correction value DPBDOD obtained in step S606 or in step S608, the DOD limit control mode state of charge correction value KEDOD obtained in step S607, the heavy current correction value DPBVEL obtained in step S610 or in step S6611, the suction pipe negative pressure assist trigger load correction amount vehicle speed correction coefficient KVDPBAST obtained in step S612, and the throttle assist trigger DOD correction amount vehicle speed correction coefficient KVDPBDOD.

Therefore, when the control operation is in the DOD limit control mode, although the assist trigger threshold value is raised by using the DOD limit control mode correction value DPBDOD obtained in step 656 and the throttle assist trigger DOD correction amount vehicle speed correction coefficient KVDPBDOD obtained in step 663, since the raising amount of the assist trigger threshold value can be reduced according to the DOD limit control mode state of charge correction value KEDOD, when the state of charge of the battery is sufficient, the problem of not frequently entering into the acceleration mode can be overcome. In other words, when the state of charge is sufficient, that is, when the state of charge is higher than the initial value SOCINT, since the assist trigger threshold value can be raised by only a smaller amount than the case of a deficient state of charge, it is possible to enter into the acceleration mode more frequently, which results in improving the drivability.

Accordingly, in the above embodiment, since the assist trigger threshold value can be raised depending on the discharge depth DOD, the state of charge of the battery can be restored rapidly by increasing the frequency of entering into the cruise mode. Furthermore, since it is possible to set the assist trigger correction value corresponding to the controlling vehicle speed VP (the assist trigger threshold value becomes higher as the vehicle speed becomes lower), it is possible to restore the state of charge of the battery SOC even when the travel conditions do not allow preservation of the regeneration, such as the travel in congested traffic or high speed travel.

Since it is possible to change various factors such as the additional amount to the initial value SOCINT of the state of charge SOC, the throttle assist trigger correction value DTHAST, the correction value DPBAST, various coefficients (DOD limit control mode state of charge correction value KPDOD, and KEDOD etc.) for multiplying the suction pipe negative pressure assist trigger correction value DPBASTTH, excessive control can be suppressed effectively when the state of charge of the battery is relatively high. That is, it is possible to improve the drivability for the driver by avoiding difficulties in frequently entering the acceleration mode. This effect is obtained by reducing the increasing amount of the assist trigger threshold value when the initial value SOCINT of the state of charge SOC is high.

The present invention is not limited to the embodiments described above, and it is possible to control the vehicle so as to decrease the discharge amount of the battery by increasing the charge amount more than usual by reducing the assist amount less than usual, or by suppressing the discharge and increasing the charge of the battery. It is also possible to adjust the charging amount or the assisting amount depending on the initial battery charge SOCINIT, or to reduce the target state of charge when the initial battery charge is high, or to increase the assisting amount.

What is claimed is:

1. A control apparatus for a hybrid vehicle propelled only by a single engine and a single motor, in which said single engine and said single motor are directly connected, comprising:

the single engine for outputting a driving force of the hybrid vehicle;

the single motor for generating an auxiliary driving force for assisting the engine output;

a battery device for supplying electric power to the single motor and for storing regenerative energy obtained by a regenerative operation of the single motor during deceleration of the vehicle;

an assist determination device for determining whether it is necessary for the single motor to assist the engine output in response to a driving condition of the vehicle;

wherein said control apparatus of the hybrid vehicle comprises:

a start of travel detecting device for detecting the start of travel of the vehicle;

a state of charge detecting device for detecting only the initial state of charge of said battery device at the time of starting the travel;

a discharge depth detecting device for detecting a charge amount and a discharge amount including a discharge depth value of the present state of charge from the initial state of charge detected at the time of starting the travel;

a lower limit threshold value setting device for setting the lower limit threshold value of the discharge amount based on said initial state of charge;

an upper limit threshold value setting device for setting the upper limit threshold value of the discharge amount based on said initial state of charge;

a mode setting device for changing a control mode of said single motor to a discharge limiting motor control mode when the discharge depth value of the battery device is reduced to said lower limit threshold value;

a mode setting release device for releasing the setting of the discharge limiting control mode set by said mode setting device after the charge amount of the battery device reaches said upper limit threshold value from the lower limit threshold value;

a determination threshold value correction device for correcting the determination threshold value used as the standard for determination by said assist determination device in response to said discharge depth detecting device when the control mode of the single motor is changed by said mode setting device; and a determination threshold value discharge depth value correction device for further correcting the determination threshold value corrected by said determination threshold value correction device in response to said initial state of charge of said battery device;

wherein the state of charge of the battery device is determined based on the initial state of charge, the charge amount, and discharge amount including the discharge depth value.

2. A control apparatus according to claim 1, wherein said determination threshold state of charge correction device decreases the correction amount of the determination threshold state of charge correction as the initial state of charge of the battery device increases.

3. A control apparatus for a hybrid vehicle propelled only by a single engine and a single motor, in which said single engine and said single motor are directly connected, comprising:

the single engine for outputting a driving force of the hybrid vehicle;

the single motor for generating an auxiliary driving force for assisting the engine output;

a battery device for supplying electric power to the single motor and for storing regenerative energy obtained by a regenerative operation of the single motor during deceleration of the vehicle;

an assist determination device for determining whether it is necessary for the single motor to assist the engine output in response to a driving condition of said vehicle;

wherein said control apparatus of the hybrid vehicle comprises:

a start of travel detecting device for detecting the start of travel of the vehicle;

a state of charge detecting device for detecting only the initial state of charge of said battery device at the time of starting the travel;

a discharge depth detecting device for detecting a charge amount and a discharge amount including a discharge depth value of the present state of charge from the initial state of charge detected at the time of starting the travel;

the control apparatus for setting a lower limit discharge amount for said initial state of charge;

the control apparatus for setting an upper limit charge amount for said initial state of charge;

a mode setting device for changing a control mode of said single motor to a discharge control mode when the discharge depth value of the battery device is reduced to said lower limit threshold value;

a mode setting release device for releasing the setting of the motor control mode set by said mode setting device when the charge amount of the battery device reaches said upper limit threshold value;

a determination threshold value correction device for correcting the determination threshold value used as the standard for determination by said assist determination device in response to said discharge depth detecting device when the control mode of the single motor is changed by said mode setting device; and a determination threshold value state of charge correction device for further correcting the determination threshold value corrected by said determination threshold value correction device in response to said initial state of charge of said battery device;

wherein the state of charge of said battery device is determined based on the initial state of charge, the charge amount, and the discharge depth value.

4. A control apparatus for a hybrid vehicle according to claim 3, wherein said determination threshold value state of charge correction device decreases said determination threshold value as said initial state of charge of said battery device increases.

* * * * *